United States Patent
Zhou et al.

(10) Patent No.: US 11,799,616 B2
(45) Date of Patent: *Oct. 24, 2023

(54) BANDWIDTH PART MANAGEMENT IN A WIRELESS SYSTEM

(71) Applicant: Ofinno, LLC, Reston, VA (US)

(72) Inventors: Hua Zhou, Vienna, VA (US); Esmael Hejazi Dinan, McLean, VA (US); Hyoungsuk Jeon, Centreville, VA (US); Alireza Babaei, Fairfax, VA (US); Kyungmin Park, Vienna, VA (US); Ali Cagatay Cirik, Chantilly, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,147

(22) Filed: Jul. 28, 2022

(65) Prior Publication Data

US 2022/0368508 A1   Nov. 17, 2022

Related U.S. Application Data

(63) Continuation of application No. 16/857,632, filed on Apr. 24, 2020, now Pat. No. 11,405,166, which is a
(Continued)

(51) Int. Cl.
*H04L 5/00* (2006.01)
*H04B 7/06* (2006.01)
(Continued)

(52) U.S. Cl.
CPC ......... *H04L 5/0092* (2013.01); *H04B 7/0626* (2013.01); *H04B 17/318* (2015.01);
(Continued)

(58) Field of Classification Search
CPC ... H04L 5/0092; H04L 5/0051; H04L 5/0094; H04L 5/0098; H04L 5/0055; H04L 5/001;
(Continued)

(56) References Cited

U.S. PATENT DOCUMENTS 8,982,822 B2    3/2015  Ogawa
2015/0288490 A1  10/2015  Sun et al.
(Continued)

OTHER PUBLICATIONS

R2-1708766; 3GPP TSG-RAN WG2 #99; Berlin, Germany, Aug. 21-25, 2017; Agenda item: 10.3.1.5; Source: Nokia, Nokia Shanghai Bell; Title: Details on multiple SR configurations; WID/SID: NR_newRAT-Core-Release 15; Document for: Discussion and Decision.

(Continued)

*Primary Examiner* — Farid Seyedvosoghi
(74) *Attorney, Agent, or Firm* — Brett Gardner; Kavon Nasabzadeh; Philip R. Smith

(57) ABSTRACT

A method may include transmitting, by a base station to a wireless device via a physical downlink control channel (PDCCH), a downlink control information (DCI) indicating for the wireless device to switch from a second bandwidth part (BWP) to a first BWP as an active BWP. The method may include receiving, in response to the first BWP being activated, a reference signal received power (RSRP) report for the first BWP. The RSRP report may include a reference signal index indicating a reference signal of the first BWP, and a value of an RSRP of the reference signal.

20 Claims, 48 Drawing Sheets

Related U.S. Application Data continuation of application No. PCT/US2018/058395, filed on Oct. 31, 2018.

(60) Provisional application No. 62/577,800, filed on Oct. 27, 2017, provisional application No. 62/577,542, filed on Oct. 26, 2017.

(51) Int. Cl.

| | |
|---|---|
| H04W 76/28 | (2018.01) |
| H04W 76/27 | (2018.01) |
| H04L 27/26 | (2006.01) |
| H04B 17/318 | (2015.01) |
| H04W 24/08 | (2009.01) |
| H04W 72/23 | (2023.01) |

(52) U.S. Cl.
CPC .......... *H04L 5/0051* (2013.01); *H04L 5/0094* (2013.01); *H04L 5/0098* (2013.01); *H04L 27/2607* (2013.01); *H04W 24/08* (2013.01); *H04W 72/23* (2023.01); *H04W 76/27* (2018.02); *H04W 76/28* (2018.02)

(58) Field of Classification Search
CPC . H04L 5/0048; H04L 5/0053; H04L 27/2607; H04L 27/0006; H04B 7/0626; H04B 17/318; H04W 24/08; H04W 72/23; H04W 76/27; H04W 76/28; Y02D 30/70
See application file for complete search history.

(56) References Cited

U.S. PATENT DOCUMENTS

| | | | |
|---|---|---|---|
| 2019/0090299 | A1 | 3/2019 | Ang et al. |
| 2019/0103954 | A1* | 4/2019 | Lee ................. H04L 5/0098 |
| 2019/0124558 | A1 | 4/2019 | Ang et al. |
| 2020/0059345 | A1 | 2/2020 | Pelletier et al. |
| 2020/0077432 | A1* | 3/2020 | Xiong .............. H04L 5/0092 |
| 2021/0076445 | A1* | 3/2021 | Tsai ................. H04L 5/003 |

OTHER PUBLICATIONS

R2-1708789; 3GPP TSG RAN WG2 Meeting #99; Berlin, Germany, Aug. 21-25, 2017 (Revision R2-1707024); Agenda item:10.3.1.5; Source: Intel Corporation; Title: Handling of multiple SR configurations; Document for: Discussion and Decision.

R2-1708865; 3GPP TSG-RAN WG2 Meeting #99; Berlin, Germany, Aug. 21-25, 2017; Agenda Item: 10.3.1.5; Source: Fujitsu; Title: SR procedure with multiple SR configurations; Document for: Decision.

R2-1709083; 3GPP TSG-RAN WG2 #99; Berlin, Germany, Aug. 21-25, 2017; Agenda Item:10.3.1.5; Source: ITRI; Title: Consideration on the SR in NR.

R2-1709121; 3GPP TSG-RAN WG2 Meeting RAN2 #99; Berlin, Germany Aug. 21-25, 2017; Agenda item: 10.3.1.5; Source: Qualcomm; Title: SR configuration for URLLC service.

R2-1709151; 3GPP TSG-RAN WG2 Meeting #99; Berlin, Germany, Aug. 21-25, 2017 (revision of R2-1707221): Agenda Item: 10.3.1.5 (NR_newRAT-Core); Source: LG Electronics Inc.; Document for: Discussion and Decision.

R2-1709173; 3GPP TSG RAN WG2 #99; Berlin, Germany, Aug. 21-25, 2017; Agenda Item: 10.3.1.5; Source: Huawei, HiSilicon; Title: Text Proposal for Scheduling Request in NR (Option 1).

R2-1709176; 3GPP TSG RAN WG2 #99; Berlin, Germany, Aug. 21-25, 2017; Agenda Item: 10.3.1.5; Source: Huawei, HiSilicon; Title: Text Proposal for Scheduling Request in NR (Option 2).

R2-1709328; 3GPP TSG-RAN WG2 Meeting #99; Berlin, Germany, Aug. 21-25, 2017 (Revision of R2-1706932); Agenda Item: 10.3.1.5; Source: ASUSTeK; Title: Consideration on multiple SR configurations; Document for: Discussion and Decision.

R2-1709419; 3GPP TSG-RAN WG2 #99 ; Berlin, Germany, Aug. 21-25, 2017; Agenda Item: 10.3.1.5; Title: Discussion on details of SR procedures; Source: HTC.

R2-1709420; 3GPP TSG-RAN WG2 #99; Berlin, Germany, Aug. 21-25, 2017; Agenda Item: 10.3.1.5; Title: Discussion on LCG and SR configuration; Source: HTC.

R2-1709450; 3GPP TSG-RAN WG2 #99; Berlin, Germany, Jun. 27-29, 2017; Agenda item: 10.3.1.5; Source: Samsung Electronics R&D Institute UK; Title: SR timers.

R2-1709466; 3GPP TSG-RAN WG2 #99; Berlin, Germany, Aug. 21-25, 2017 (resubmission of R2-1706640); Agenda item:10.3.1.5; Source: Samsung Electronics R&D Institute UK; Title: Behaviour in case of multiple SR triggers and collision resolution; Document for: Discussion.

R2-1710130; 3GPP TSG RAN WG2 #99-Bis; Prague, Czech Republic, Oct. 9-13, 2017; Agenda Item: 10.3.1.5; Source: OPPO; Title: SR configuration for BWP; Document for: Discussion, Decision.

R2-1710134; 3GPP TSG RAN WG2 #99-Bis; Prague, Czech Republic, Oct. 9-13, 2017; Agenda Item: 10.3.1.8; Source: OPPO; Title: SPS operations for BWP switching; Document for: Discussion, Decision.

R2-1710198; 3GPP TSG-RAN WG2 #99bisTdoc ; Prague, Czech Republic, Oct. 9-13, 2017 (Revision of R2-1707804); Agenda Item: 10.2.14; Source: Ericsson; Title: Key refresh at handover in NR.

R2-1710207; 3GPP TSG RAN WG2 #99bis; Prague, CZ, Oct. 9-13, 2017 (Revision of R2-1707727); Agenda item:10.3.1.10; Source: Huawei, HiSilicon; Title: Units of DRX timers; Document for: Discussion, Decision.

R2-1710208; 3GPP TSG RAN WG2 NR #99bis; Prague, CZ, Oct. 9-13, 2017; Agenda item: 10.3.1.10; Source: Huawei, HiSilicon; Title: Impacts of BWP on DRX.

R2-1710295; 3GPP TSG-RAN WG2 #99bis; Prague, Czech Republic, Oct. 9-13, 2017 ; Source: CATT; Title: Further details on the SR procedure; Agenda Item: 10.3.1.5.

R2-1710296; 3GPP TSG-RAN WG2 #99bis; Prague, Czech Republic, Oct. 9 -13, 2017; Source: CATT; Title: SR configuration, mapping and transmission for CA and BWPs cases; Agenda Item: 10.3.1.5.

R2-1710319; 3GPP TSG-RAN WG2 Meeting#99bis; Prague, Czech Republic, Oct. 9-13, 2017; Agenda item: 10.3.1.5; Source: ZTE; Title: Consideration on the SR in NR; Document for: Discussion and Decision.

R2-1710336; 3GPP TSG-RAN WG2 #99-Bis; Prague, Czech Republic, Oct. 9-13, 2017 (revision of R2-1709683); Agenda item: 10.3.1.5; Source: Samsung Electronics R&D Institute UK; Title: Text Proposal for TS 38.321 covering SR operation in NR.

R2-1710341; 3GPP TSG-RAN WG2 #99-Bis; Prague, Czech Republic, Oct. 9-13, 2017; Agenda item: 10.3.1.5; Source: Samsung Electronics R&D Institute UK; Title: On LCH-to-SR-configuration mapping within the multi-BWP framework.

R2-1710357; 3GPP TSG-RAN WG2 Meeting #99bis; Prague, Czech Republic, Oct. 9-13, 2017; Agenda Item: 10.3.1.4.3; Source: Fujitsu; Title: RA-RNTI calculation; Document for: Decision.

R2-1710605; 3GPP TSG RAN WG2 Meeting #99bis; Prague, Czech Republic, Oct. 9-13, 2017 (Revision R2-1708789); Agenda item: 10.3.1.5; Source: Intel Corporation; Title:Handling of multiple SR configurations.

R2-1710607; 3GPP TSG RAN WG2 Meeting #99bis; Prague, Czech Republic, Oct. 9-13, 2017; Agenda item: 10.3.1.10; Source: Intel Corporation; Title:C-DRX enhancement in NR.

R2-1710610; 3GPP TSG-RAN WG2 Meeting #99bis; Prague, Czech, Oct. 9-13, 2017; Agenda item: 10.3.1.12; Source:Intel Corporation; Title: Impact of BWP on PHR.

R2-1710658; 3GPP TSG-RAN WG2 #99bis; Prague, Czech Republic, Oct. 9-13, 2017; Agenda Item: 10.3.1.5; Source: InterDigital Inc.; Title: Multiple SR Configurations in NR; Document for: Discussion, Decision.

R2-1710662; 3GPP TSG-RAN WG2 #99bis; Prague, Czech Republic, Oct. 9-13, 2017 (Update of R2-1708732); Agenda Item: 10.3. 1.8; Source: InterDigital; Title: SPS and grant free operation; Document for: Discussion, Decision.

(56) References Cited

OTHER PUBLICATIONS

R2-1710735; 3GPP TSG-RAN2 Meeting #99bis; Prague, Czech Republic, Oct. 9-13, 2017; Agenda Item: 9.13.5 RRC Connection Release Enhancements; Source: Ericsson; Document for: Discussion and Decision.
R2-1710824; 3GPP TSG RAN WG2 #99-Bis; Prague, Czech, Oct. 9-13, 2017; Agenda Item: 10.3.1.5; Source: Potevio; Title: Discussion on SR_Counter; Document for: Discussion and Decision.
R2-1710958; 3GPP TSG-RAN WG2 Meeting #99bis; Prague, Czech Republic, Oct. 9-13, 2017 (Revision of R2-1708489); Source: vivo; Title: Duplication deactivation due to Scell or BWP deactivation; Agenda Item: 10.3.1.11; Document for: Discussion and Decision.
R2-1710971; 3GPP TSG-RAN WG2 Meeting #99bis; Prague, Czech Republic, Oct. 9-13, 2017; Source: vivo; Title: Discussion on the SR configurations for CA case; Agenda Item: 10.3.1.5; Document for: Discussion and Decision.
R2-1710974; 3GPP TSG-RAN WG2 Meeting #99bis; Prague, Czech Republic, Oct. 9-13, 2017; Source: vivo; Title: Discussion on the SR cancellation and failure handling; Agenda Item: 10.3.1.5; Document for: Discussion and Decision.
R2-1711178; 3GPP TSG-RAN WG2 #99bisTdoc; Prague, Czech Republic, Oct. 9-13, 2017; Agenda Item: 10.3.1.5; Source: Ericsson; Title: Remaining issues for Scheduling Request.
R2-1711182; 3GPP TSG-RAN WG2 #99bis; Prague, Czech Republic, Oct. 9-13, 2017 (Revision of R2-1708199); Agenda Item: 10.3.1.12; Source: Ericsson; Title: Power headroom reporting in NR; Document for: Discussion and Decision.
R2-1711198; 3GPP TSG-RAN WG2 NR #99bis; Prague, Czech, Oct. 9-13, 2017 (Update of R2-1708087); Agenda item: 10.3.1.10; Source: Samsung; Title: Power saving for wideband carrier in NR; Document for: Discussion and Decision.
R2-1711199; 3GPP TSG-RAN WG2 NR #99bis Meeting; Prague, Czech, Oct. 9-13, 2017; Agenda item: 10.3.1.10; Source: Samsung; Title: Timer-based BWP switching.
R2-1711441; 3GPP TSG-RAN WG2#99bis Meeting; Prague, Czech Republic, Oct. 9-13, 2017; Agenda item: 10.3.1.13; Source: Huawei, HiSilicon; Title: MAC impact of bandwidth part activation/deactivation.
R2-1711613; 3GPP TSG-RAN WG2 Meeting #99bis; Prague, Czech Republic, Oct. 9-13, 2017; Agenda Item: 10.3.1.12 (NR_newRAT-Core); Source: LG Electronics Inc.; Document for: Discussion and Decision.
R2-1711643; 3GPP TSG-RAN WG2 Meeting #99bis ; Prague, Czech, Oct. 9-13, 2017 ; Agenda item: 10.3.1.13; Source: Intel Corporation; Title: Activation of SCell containing BWPs.
R2-1711704; 3GPP TSG RAN WG2 NR #99bis; Prague, Czech, Oct. 9-13, 2017 (Revision of R2-1709117); Agenda item: 10.3.1.10; Source: Qualcomm Incorporated; Title: UE Power Saving during Active State.
R2-1711729; 3GPP TSG-RAN WG2 Meeting #99bis; Prague, Czech Republic, Oct. 9-13, 2017; in revision of R2-1709151; Agenda Item: 10.3.1.5 (NR_newRAT-Core); Source: LG Electronics Inc.; Document for: Discussion and Decision.
International Search Report and Written Opinion of the International Searching Authority, dated Mar. 8, 2019, in corresponding International application No. PCT/US2018/058395.
3GPP TS 38.214 V15.3.0 (Sep. 2018); Technical Specification; 3rd Generation Partnership Project; Technical Specification Group Radio Access Network; NR; Physical layer procedures for data (Release 15).
3GPP TS 38.213 V15.0.1 (Feb. 2018); Technical Specification; 3rd Generation Partnership Project; Technical Specification Group Radio Access Network; NR; Physical layer procedures tor control (Release 15).
R1-1717932; 3GPP TSG RAN WG1 Meeting #90bis; Prague, Czech Republic Oct. 9-13, 2017; Agenda Item: 7.1.5.1; Source: LG Electronics; Title: Remaining details on L3 measurement and mobility management; Document for: Discussion and Decision.
R1-1718511; 3GPP TSG RAN WG1 Meeting #90bis R1-1718511; Prague, Czech Republic, Oct. 9-13, 2017 Agenda item: 7.2.2.3; Source: Nokia, Nokia Shanghai Bell; Title: Beam Indication, Measurements and Reporting.
R1-1718901; 3GPP TSG RAN WG1 Meeting 90bis R1-1718901; Prague, CZ, Oct. 9-13, 2017; Agenda Item: 7.3.4.1; Source: MediaTek Inc.; Title: Summary of Bandwidth Part Operation.
R2-1710959; 3GPP TSG-RAN WG2 Meeting #99bis R2-1710959; Prague, Czech Republic, Oct. 9-13, 2017 (Revision of R2-1708487 and R2-1708492); Source: vivo; Title: HARQ process ID and timer for SPS.
R1-1715425; 3GPP TSG RAN WG1 Meeting NR#3; Nagoya, Japan, Sep. 18-21, 2017; Agenda Item: 6.3.4; Source:Huawei, HiSilicon; Title: Overview of bandwidth part, CA, and DC operation including SRS switching.
R1-1715492; 3GPP Tsg Ran WG1 Meeting NR#3; Nagoya, Japan, Sep. 18-21, 2017; Agenda Item: 3.3.4; Source: Fujitsu; Title: Considerations on UCI feedback for carrier aggregation.
R1-1715517; 3GPP TSG RAN WG1 Meeting AdHoc #3; Nagoya, Japan, Sep. 18-21, 2017; Agenda Item: 6.3.4; Source: Spreadtrum Communications; Title: Consideration on monitoring preemption indication in bandwidth parts.
R1-1715535; 3GPP TSG RAN WG1 Meeting NR#3; Nagoya, Japan, Sep. 18-21, 2017; Agenda Item: 6.3.4; Source: Lenovo, Motorola Mobility; Title: HARQ-ACK codebook size determination for CA with different numerologies.
R1-1715648; 3GPP TSG RAN WG1 NR AH#3; Nagoya, Japan, Sep. 18-21, 2017; Source: vivo; Title: Remaining details for bandwidth part operation; Agenda Item: 6.3.4.
R1-1715692; 3GPP TSG RAN WG1 Meeting NR#3; Nagoya, Japan, Sep. 18-21, 2017; Source: Guangdong OPPO Mobile Telecom; Title: Remaining issues on bandwidth part configuration and activation; Agenda Item:: 6.3.4.
R1-1715755; 3GPP TSG-RAN WG1 Meeting NRAH#3; Nagoya, Japan, Sep. 18-21, 2017; Source: Nokia, Nokia Shanghai Bell; Title: On remaining aspects of NR CA/DC and BWPs; Agenda item: 6.3.4; Document for: Discussion and Decision.
R1-1715770; 3GPP TSG RAN WG1 Meeting NR Ad-Hoc #3; Nagoya, Japan, Sep. 18-21, 2017; Source: ETRI; Title: Remaining details of bandwidth part for initial access; Agenda Item: 6.3.4 Other aspects on carrier aggregation and bandwidth.
R1-1715774; 3GPP TSG-RAN WG1 Meeting AH_NR#3; Nagoya, Japan, Sep. 18-21, 2017; Source: Panasonic; Title: Combining DRX with BWP adaptation; Agenda Item: 6.3 4.
R1-1715830; 3GPP TSG RAN WG1 Meeting NR#3; Nagoya, Japan, Sep. 18-21, 2017; Agenda item: 6.3.4; Source: CATT; Title: Remaining aspects of CA and wider bandwidth operation.
R1-1715892; 3GPP TSG RAN WG1 Meeting NR#3; Nagoya, Japan, Sep. 18-21, 2017; Agenda item: 6.3.4; Source: LG Electronics; Title: Discussion on carrier aggregation and bandwidth parts; Document for: Discussion and decision.
R1-1716019; 3GPP TSG RAN WG1 NR Ad-Hoc#3; Nagoya, Japan, Sep. 18-21, 2017; Agenda item: 6.3.4; Source: Samsung; Title: On Bandwidth Part Operation; Document for: Discussion and decision.
R1-1716192; 3GPP TSG RAN WG1 Meeting NR#3; Nagoya, Japan, Sep. 18-21, 2017; Agenda Item: 6.3.4; Source: AT&T; Title: Remaining Details of Carrier Aggregation and Bandwidth Parts.
R1-1716202; 3GPP TSG RAN WG1 Meeting NR#3; Nagoya, Japan, Sep. 18-21, 2017; Agenda Item: 6.3.4; Source: MediaTek Inc.; Title: Remaining Details on Bandwidth Part Operation in NR; Document for: Discussion.
R1-1716258; 3GPP TSG RAN WG1 Meeting AH_NR#3; Nagoya, Japan, Sep. 18-21, 2017; Source: InterDigital, Inc.; Title: Remaining details of BWP; Agenda Item: 6.3.4; Document for: Discussion, Decision.
R1-1716327; 3GPP TSG RAN WG1 Meeting NR#3; Nagoya, Japan, Sep. 18-21, 2017; Source: Intel Corporation; Title: Remaining aspects for carrier aggregation and bandwidth parts; Agenda item: 6.3.4.
R1-1716440; 3GPP TSG RAN WG1 NR AdHoc#3; Nagoya, Japan, Sep. 18-21, 2017; Agenda item: 6.3.4; Source: Qualcomm Incorporated; Title: CA and BWP.

(56) References Cited

OTHER PUBLICATIONS

R1-1716601; 3GPP TSG RAN WG1 NR AH#3; Nagoya, Japan, Sep. 18-21, 2017; Source: Ericsson; Title: On CA related aspects and BWP related aspects; Agenda Item: 6.3.4.
R1-1716647; 3GPP TSG RAN WG1 Meeting NR#3; Nagoya, Japan, Sep. 18-21, 2017; Title: Discussion an BWP Design; Source: Convida Wireless; Agenda Item: 6.3.4.
R1-1717077; 3GPP TSG RAN WG1 Meeting #90bis; Prague, Czech Republic, Oct. 9-13, 2017; Agenda Item: 7.3.4.1; Source: Huawei, HiSilicon; Title: Remaining issues on bandwidth part.
R1-1717400; 3GPP TSG RAN WG1 Meeting 90bis; Prague, CZ, Oct. 9-13, 2017; Agenda Item: 7.3.4.1; Source: Intel Corporation; Title: Remaining details for bandwidth parts.
R1-1717504; 3GPP TSG RAN WG1 Meeting 90bis; Prague, CZ, Oct. 9-13, 2017; Source: vivo; Title: Remaining details for bandwidth part operation; Agenda Item: 7.3.4.1.
R1-1717675; 3GPP TSG RAN WG1 NR 90bis; Prague, Czech Republic, Oct. 9-13, 2017; Agenda item: 7.3.4.1; Source:Samsung; Title: On Bandwidth Part Operation; Document for: Discussion and decision.
R1-1717839; 3GPP TSG RAN WG1 Meeting #90bis; Prague, Czechia, Oct. 9-13, 2017; Source: CATT; Title: Remaining aspects of BWP operation; Agenda Item: 7.3.4.1.
R1-1717972; 3GPP TSG RAN WG1 Meeting 90bis; Prague, CZ, Oct. 9-13, 2017; Agenda item: 7.3.4.1; Source: LG Electronics; Title: Remaining issues on bandwidth parts; Document for: Discussion and decision.
R1-1718050; 3GPP TSG RAN WG1 Meeting 90bis; Prague, CZ, Oct. 9-13, 2017; Source: OPPO; Title: Remaining issues on bandwidth part configuration and activation; Agenda Item: 7.3.4.1.
R1-1718223; Prague, CZ, Oct. 9-13, 2017; Source: NTT Docomo, Inc.; Title: Remaing issues on bandwidth parts for NR; Agenda Item: 7.3.4.1.
R1-1718327; 3GPP TSG RAN WG1 Meeting 90bis; Prague, CZ, Oct. 9-13, 2017; Agenda Item: 7.3.4.1; Source: MediaTek Inc.; Title: Remaining Details on Bandwidth Part Operation in NR; Document for: Discussion.
R1-1718365 (R1-1716258); 3GPP TSG RAN WG1 Meeting AH_NR#3; Prague, CZ, Oct. 9-13, 2017; Source: InterDigital, Inc.; Title: Remaining details of BWP; Agenda Item: 7.3.4.1; Document for: Discussion, Decision.
R1-1718404; 3GPP TSG RAN WG1 Meeting 90bis; Prague, CZ, Oct. 9-13, 2017; Agenda Item: 7.3.4.1 Source: AT&T; Title: Remaining details for bandwidth parts.
R1-1718523; 3GPP TSG-RAN WG1 90bis; Prague, Czech Republic, Oct. 9-13, 2017; Source: Ericsson; Title: On bandwidth parties; Agenda Item: 7.3.4.1.
R1-1718580; 3GPP TSG RAN WG1 #90bis; Prague, Czech Republic, Oct. 9-13, 2017; Agenda item: 7.3.4.1; Source: Qualcomm Incorporated; Title: Open Issues on BWP.
R1-1718607; 3GPP TSG-RAN WG1 Meeting #90bis; Prague, CZ, Oct. 9-13, 2017; Source: Nokia, Nokia Shanghai Bell; Title: On remaining aspects of BWPs; Agenda item: 7.3.4.1; Document for: Discussion and Decision.
R2-1707736; 3GPP TSG RAN WG2 #99; Berlin, Germany, Aug. 21-25, 2017; Agenda Item: 10.3.1.5; Source: OPPO; Title: Details of SR procedure.
R2-1707737; 3GPP TSG RAN WG2 #99; Berlin, Germany, Aug. 21-25, 2017; Agenda Item:10.3.1.5; Source: OPPO; Title: Mapping logical channel to SR configuration.
R2-1707915; 3GPP TSG-RAN WG2 Meeting #99; Berlin, Germany, Aug. 21-25, 2017; Source: CATT; Title: Discussion on SR; Agenda Item: 10.3.1.5.
R2-1708006; 3GPP TSG-RAN WG2 #99; Berlin, Germany, Aug. 21-25, 2017; Agenda item: 10.3.1.5; Source: Samsung Electronics R&D Institute UK; Title: Handling absence of SR resource in NR.
R2-1708009; 3GPP TSG-RAN WG2 #99; Berlin, Germany, Jun. 27-29, 2017; Agenda item: 10.3.1.5; Source: Samsung Electronics R&D Institute UK; Title: On LCH-to-SR configurations mapping.
R2-1708726; 3GPP TSG-RAN WG2 #99; Berlin, Germany, Aug. 21-25, 2017; Agenda Item: 10.3.1.5; Source: InterDigital Inc.; Title: SR Resource Configuration in NR; Document for: Discussion, Decision.
R2-1708146; 3GPP TSG-RAN WG2#99; Berlin, Germany, Aug. 21-25, 2017; Agenda item: 10.3.1.5; Source: ZTE; Title: Consideration on the SR in NR.
R2-1708196; 3GPP TSG-RAN WG2 #99; Berlin, Germany, Aug. 21-25, 2017; Agenda Item: 10.3.1.5; Source: Ericsson; Title: Open questions for Scheduling Request.
R2-1708197; 3GPP TSG-RAN WG2#99; Berlin, Germany, Aug. 21-25, 2017; Agenda Item: 10.3.1.5; Source: Ericsson; Title: SR failure handling.
R2-1708198; 3GPP TSG-RAN WG2 #99; Berlin, Germany, Aug. 21-25, 2017; Agenda Item: 10.3.1.5; Source: Ericsson; Title: Text proposal for SR.
R2-1708265; 3GPP TSG-RAN2 Meeting #99; Berlin, Germany, Aug. 21-25, 2017; Agenda Item: 10.3.1.5; Source: Huawei, HiSilicon; Title: Details on multiple SR configurations; Document for: Discussion and decision.
R2-1708266; 3GPP TSG-RAN2 Meeting #99; Berlin, Germany, Aug. 21-25, 2017; Agenda item: 10.3.1.5; Source: Huawei, HiSilicon; Title: SR procedure in NR.
R2-1708267; 3GPP TSG-RAN2 Meeting #99; Berlin, Germany, Aug. 21-25, 2017; Agenda Item: 10.3.1.5; Source: Huawei, HiSilicon; Title: UE behaviour with none SR configuration; Document for: Discussion and decision.
R2-1708490; 3GPP TSG-RAN WG2 Meeting#99; Berlin, Germany, Aug. 21-25, 2017; Source:vivo ; Title: BSR and SR and BSR cancel due to deactivation of LCH; Agenda Item: 10.3.1.6.
R2-1708495; 3GPP TSG-RAN WG2 Meeting #99; Berlin, Germany, Aug. 21-25, 2017 (revision of R2-1707072); Source:vivo; Title: Enhanced SR in NR; Agenda Item: 10.3.1.5.
R2-1708496; 3GPP TSG-RAN WG2 Meeting #99; Berlin, Germany, Aug. 21-25, 2017; Source: vivo; Title: Discussion on the mapping between SR configuration and LCH; Agenda Item: 10.3.1.5.
R2-1711971; 3GPP TSG-RAN WG2 #99-bis; Prague, Czech, Oct. 9-13, 2017; Agenda Item: 10.4.1.4.1; Source: Ericsson; Title: Initial ASN.1 TP on RRM.
Office Action, dated Sep. 15, 2022, in EP Patent Application No. 19191834.1.
R1-1718008; 3GPP TSG RAN WG1 Meeting #90bis; Prague, CZ, Oct. 9-13, 2017; Source: ETRI; Title: Discussion on beam measurement and reporting; Agenda item: 7.2.2.6; Document for: Discussion/Decision.

* cited by examiner

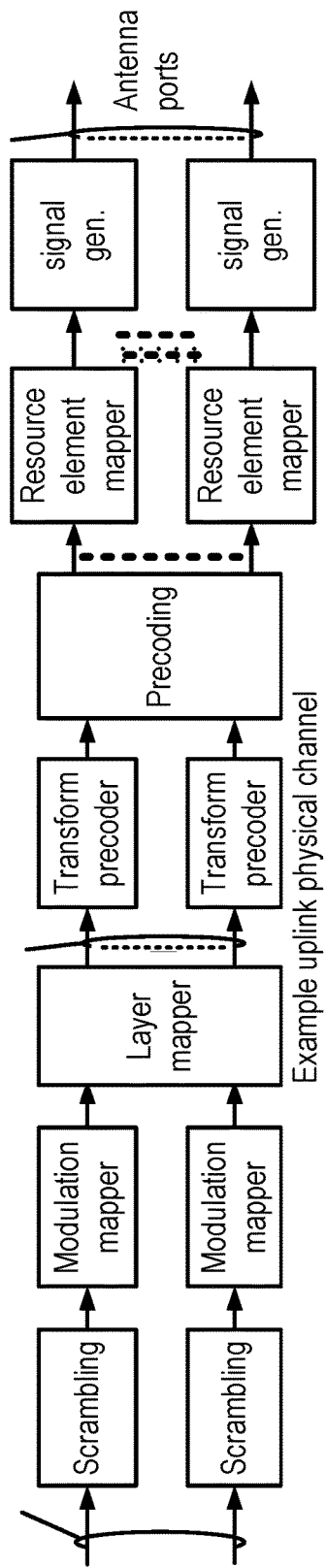
FIG. 5A
Example uplink physical channel
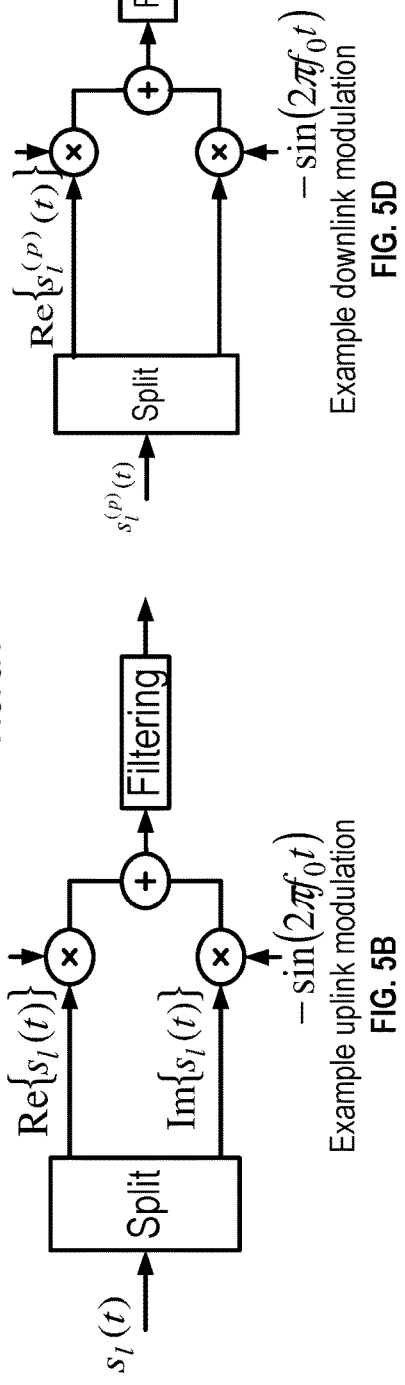
FIG. 5B
Example uplink modulation
FIG. 5D
Example downlink modulation
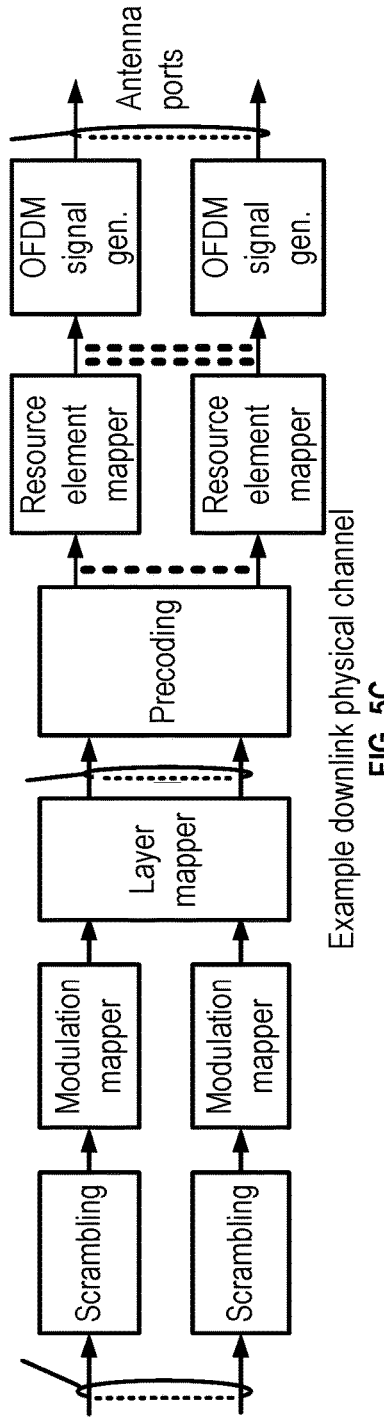
FIG. 5C
Example downlink physical channel

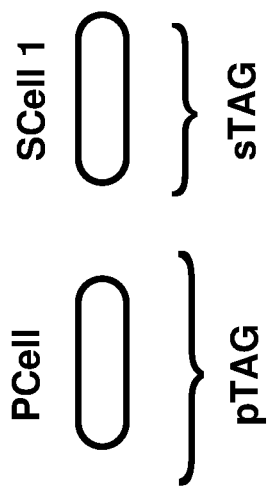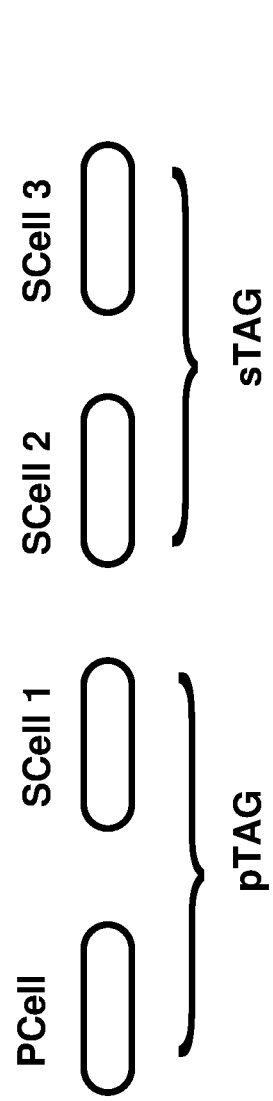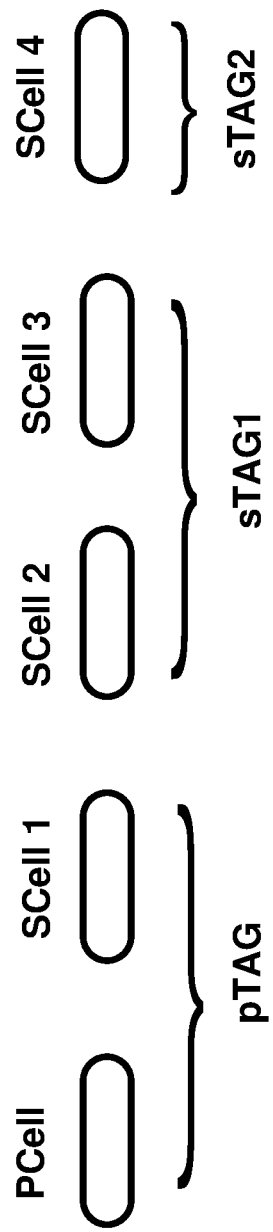
FIG. 8 gNB connected to NGC eLTE eNB connected to NGC

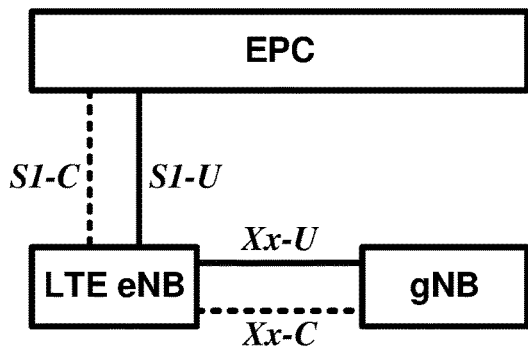

LTE eNB connected to EPC with non-standalone gNB. gNB user plane connected to EPC via LTE eNB.
FIG. 11A

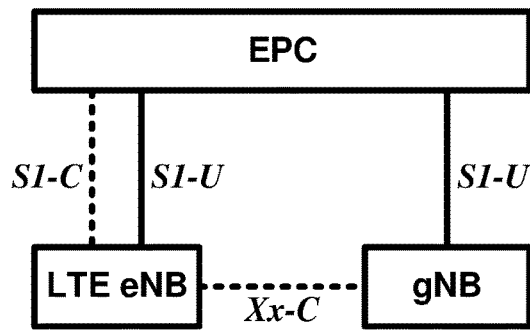

LTE eNB connected to EPC with non-standalone gNB. gNB user plane connected to EPC directly.
FIG. 11B

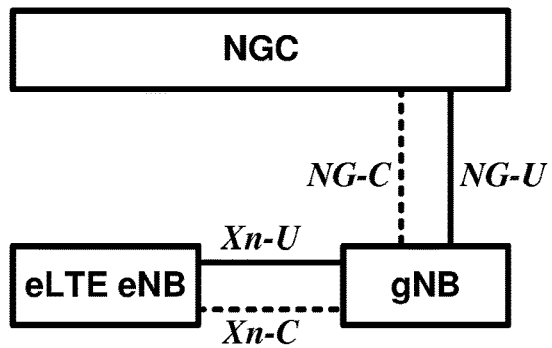

gNB connected to NGC with non-standalone eLTE eNB. eLTE eNB user plane connected to NGC via gNB.
FIG. 11C

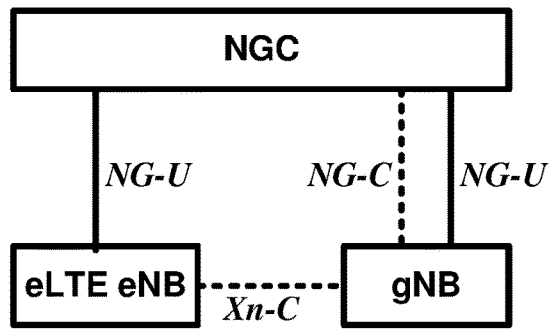

gNB connected to NGC with non-standalone eLTE eNB. eLTE eNB user plane connected to NGC directly.
FIG. 11D

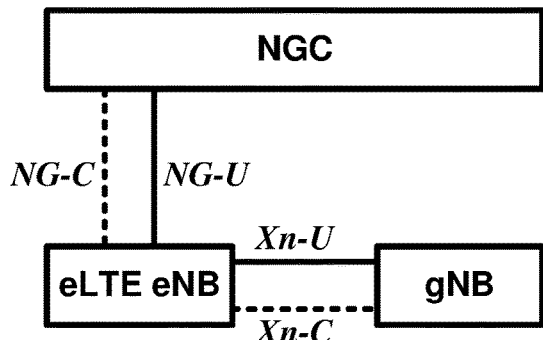

eLTE eNB connected to NGC with non-standalone gNB. gNB user plane connected to NGC via eLTE eNB.
FIG. 11E

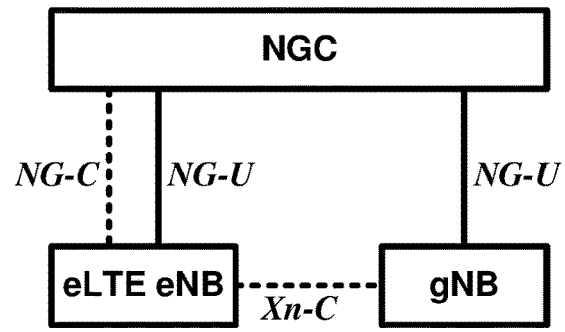

eLTE eNB connected to NGC with non-standalone gNB. gNB user plane connected to NGC directly.
FIG. 11F Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

Beam failure in one TRP

Beam failure in multiple TRPs

| $C_7$ | $C_6$ | $C_5$ | $C_4$ | $C_3$ | $C_2$ | $C_1$ | R | Oct 1 |

FIG. 21A

| $C_7$ | $C_6$ | $C_5$ | $C_4$ | $C_3$ | $C_2$ | $C_1$ | R | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

FIG. 21B

|  | DCI format | Example size (Bits) | Usage |
|---|---|---|---|
| Uplink | 0 | 45 | Uplink scheduling grant |
|  | 4 | 53 | Uplink scheduling grant with spatial multiplexing |
|  | 6-0A, 6-0B | 46, 36 | Uplink scheduling grant for eMTC devices |
|  |  |  |  |
| Downlink | 1C | 31 | Special purpose compact assignment |
|  | 1A | 45 | Contiguous allocation only |
|  | 1B | 46 | Codebook-based beamforming using CRS |
|  | 1D | 46 | MU-MIMO using CRS |
|  | 1 | 55 | Flexible allocations |
|  | 2A | 64 | Open-loop spatial multiplexing using CRS |
|  | 2B | 64 | Dual-layer transmission using DM-RS (TM8) |
|  | 2C | 66 | Multi-layer transmission using DM-RS (TM9) |
|  | 2D | 68 | Multi-layer transmission using DM-RS (TM9) |
|  | 2 | 67 | Closed-loop spatial multiplexing using CRS |
|  | 6-1A, 6-1B | 46, 36 | Downlink scheduling grants for eMTC devices |
|  |  |  |  |
| Special | 3, 3A | 45 | Power control commands |
|  | 5 |  | Sidelink operation |
|  | 6-2 |  | Paging/direct indication for eMTC devices |

FIG. 23

Receive, by a wireless device from a base station, message(s) comprising configuration parameters indicating periodic resources of a configured grant, the configured grant configured for an uplink bandwidth part
3710

Start a bandwidth part inactivity timer in response to activation of a downlink bandwidth part
3720

Transmit data packet(s) via a 1st transmission interval of a 1st resource of the periodic resources of the uplink bandwidth part
3730

Restart the bandwidth part inactivity timer at a time based on the 1st transmission interval
3740

FIG. 37

Start, by a base station, a bandwidth part inactivity timer for a wireless device in response to a downlink bandwidth part being an active bandwidth part for the wireless device
3910

Receive, by the base station from the wireless device, data packet(s) via a 1st transmission interval of periodic resources indicated by a configured grant of an uplink bandwidth part
3920

Restart the bandwidth part inactivity timer at a time based on the 1st transmission interval
3930

FIG. 39

Receive, by a wireless device from a base station, radio resource control messages comprising configuration parameters of a cell, the configuration parameters comprising: 1st radio resource parameters of bandwidth parts (BWPs) comprising a 1st BWP; and 2nd radio resource parameters of reference signals
4510

Receive a downlink control information indicating switching to the 1st BWP as an active BWP
4520

Activate the 1st BWP in response to the downlink control information
4530

Transmit, in response to activating the 1st BWP, reference signal received power (RSRP) report(s) for the 1st BWP, wherein the RSRP report(s) comprise a reference signal index indicating one of the reference signals
4540

FIG. 45

Activate, by a wireless device, a 1st bandwidth part in response to switching to the 1st bandwidth part as an active bandwidth part
4610

Transmit, in response to the activating the 1st bandwidth part, reference signal received power report(s) for the 1st bandwidth part, wherein the reference signal received power report(s) comprise: a reference signal index indicating reference signals; and a value of reference signal received power of the reference signals
4620

FIG. 46

Switch, by a base station, a 1st bandwidth part to an active state for a wireless device
4810

Receive, from the wireless device in response to the switching to the 1st bandwidth part, reference signal received power report(s) for the 1st bandwidth part, wherein the reference signal received power report(s) comprise: a reference signal index indicating reference signals; and a value of reference signal received power of the reference signals
4820

FIG. 48

BANDWIDTH PART MANAGEMENT IN A WIRELESS SYSTEM

CROSS-REFERENCE TO RELATED APPLICATIONS

This application is a continuation of U.S. patent application Ser. No. 16/857,632, filed Apr. 24, 2020, which is a continuation of International Application No. PCT/US2018/058395, filed Oct. 31, 2018, which claims the benefit of U.S. Provisional Application No. 62/577,542, filed Oct. 26, 2017, and U.S. Provisional Application No. 62/577,800, filed Oct. 27, 2017, all of which are hereby incorporated by reference in their entireties.

BRIEF DESCRIPTION OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present disclosure.

FIG. 21A is an example diagram for a secondary activation/deactivation medium access control control element (MAC CE) as per an aspect of an embodiment of the present disclosure.

FIG. 21B is an example diagram for a secondary activation/deactivation medium access control control element (MAC CE) as per an aspect of an embodiment of the present disclosure.

FIG. 23 is an example diagram for downlink control information (DCI) formats as per an aspect of an embodiment of the present disclosure.

FIG. 37 may be an example flow diagram as per an aspect of an embodiment of the present disclosure.

FIG. 39 may be an example flow diagram as per an aspect of an embodiment of the present disclosure.

FIG. 45 may be an example flow diagram as per an aspect of an embodiment of the present disclosure.

FIG. 46 may be an example flow diagram as per an aspect of an embodiment of the present disclosure.

FIG. 48 may be an example flow diagram as per an aspect of an embodiment of the present disclosure.

DETAILED DESCRIPTION

Figure 1:
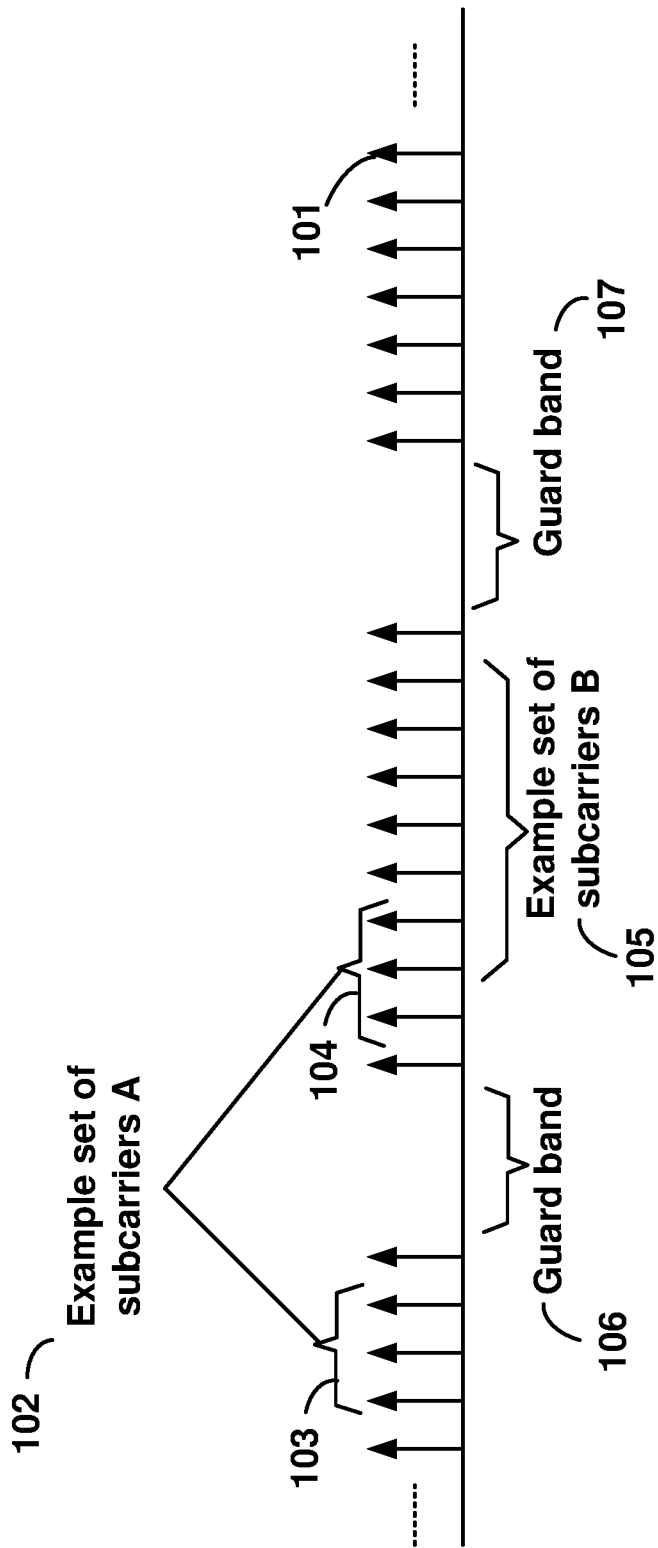
FIG. 1 is a diagram depicting example sets of OFDM subcarriers as per an aspect of an embodiment of the present disclosure.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in a multicarrier communication system.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time interval
TB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, 1024-QAM and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
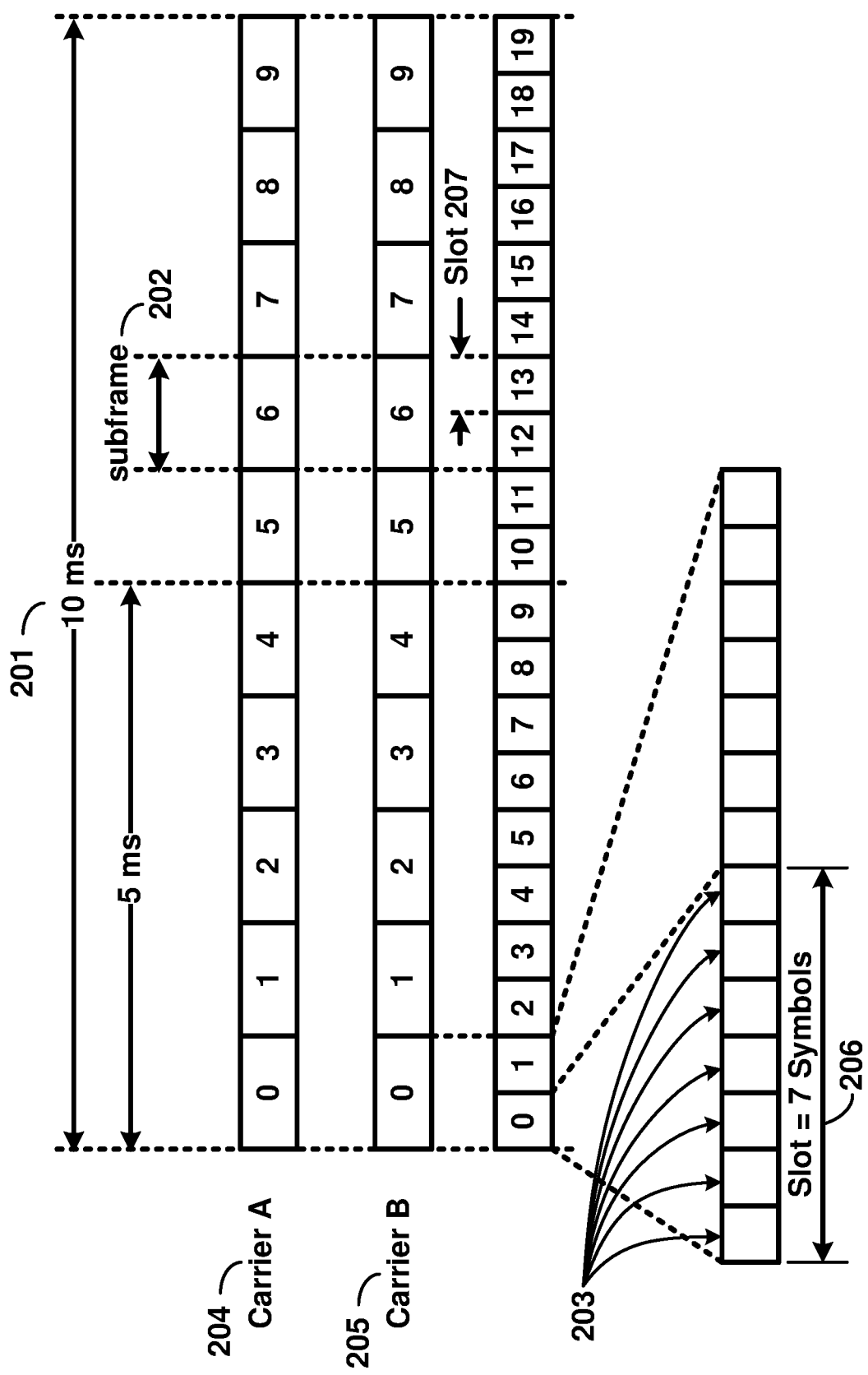
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may comprise of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
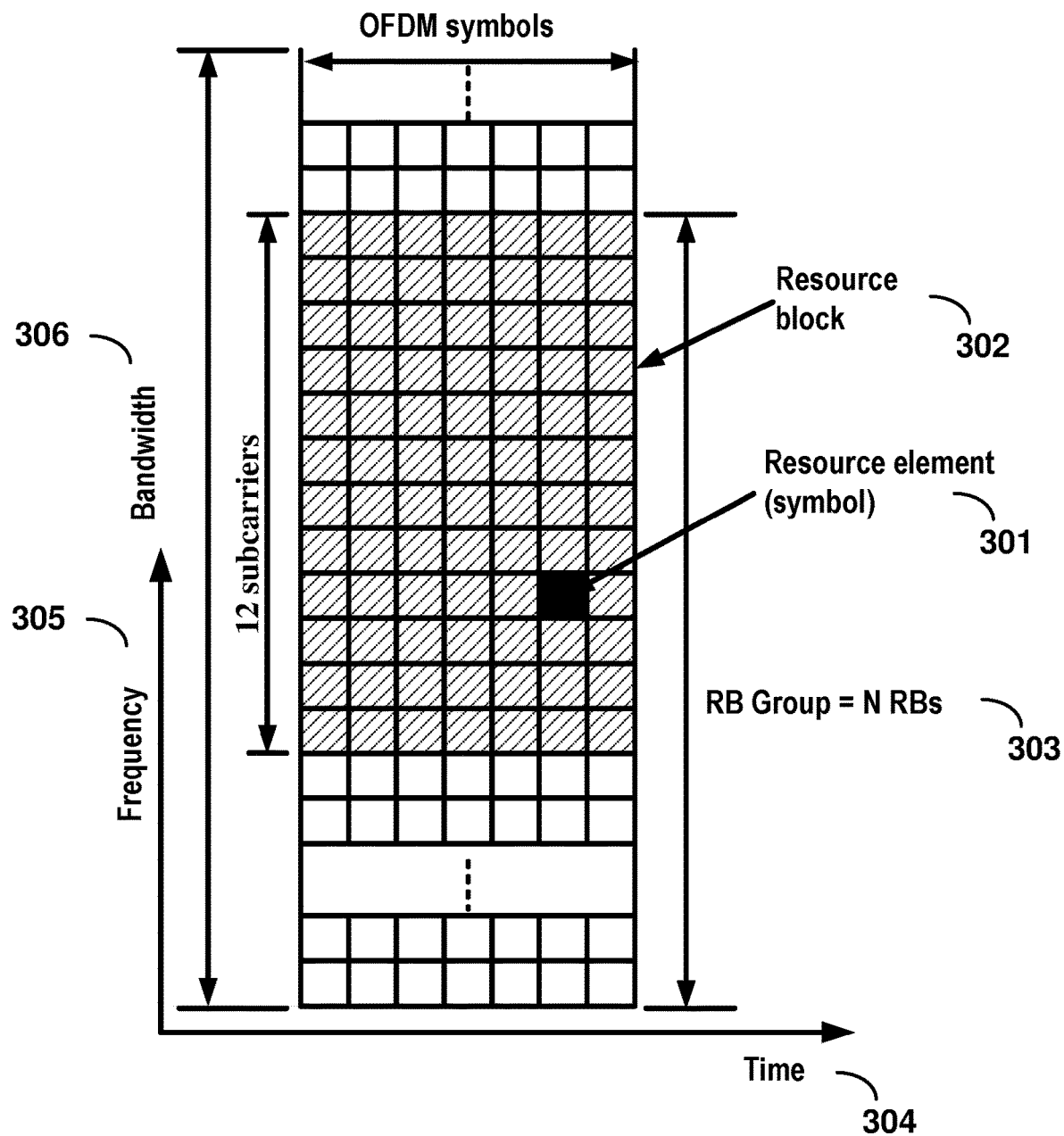
FIG. 3 is a diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for an antenna port, and/or the like.

Example modulation and up-conversion to the carrier frequency of the complex-valued DFTS-OFDM/SC-FDMA baseband signal for an antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port, and/or the like.

Example modulation and up-conversion to the carrier frequency of the complex-valued OFDM baseband signal for an antenna port is shown in FIG. 5D. Filtering may be employed prior to transmission.

Figure 4:
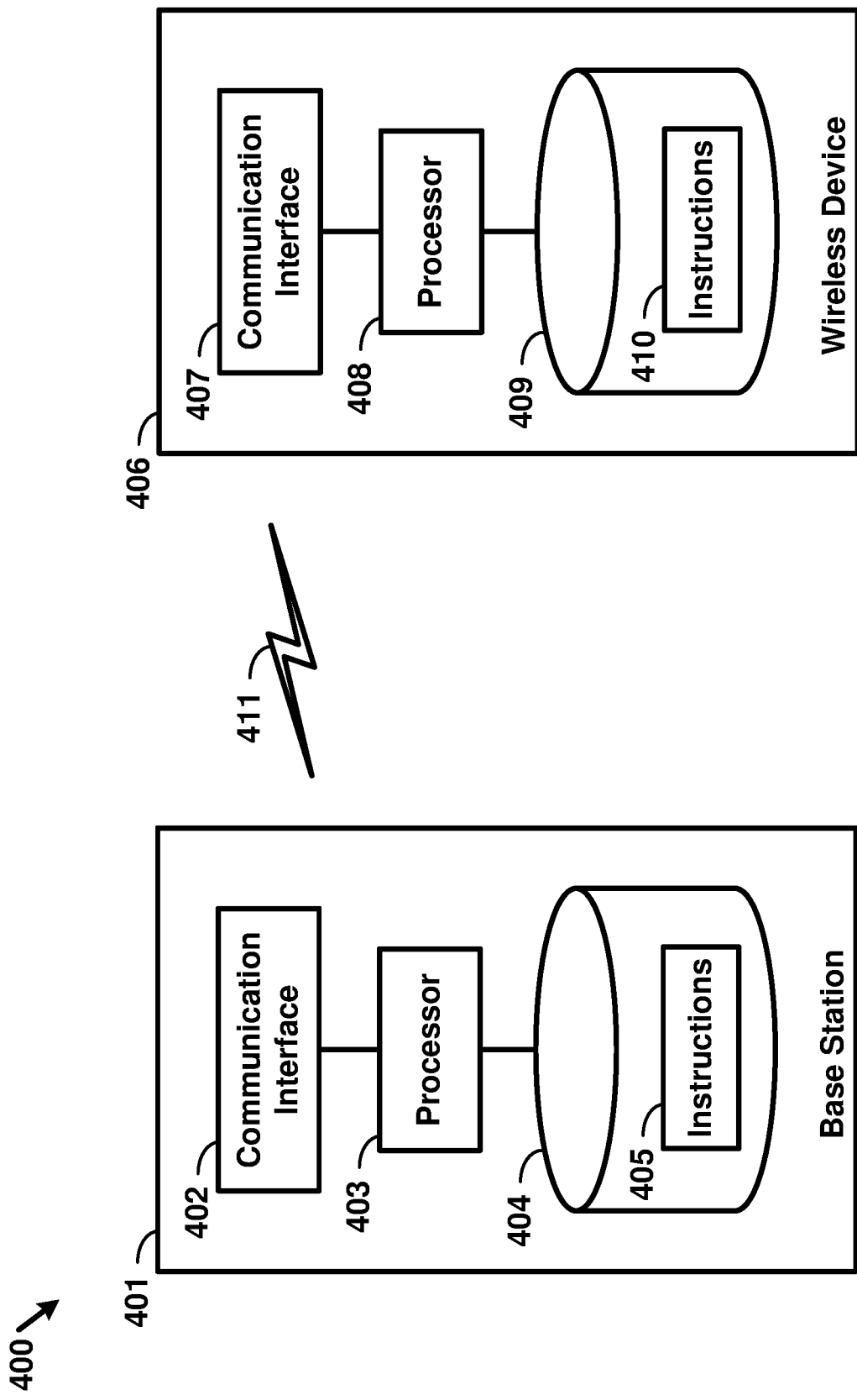
FIG. 4 is a block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
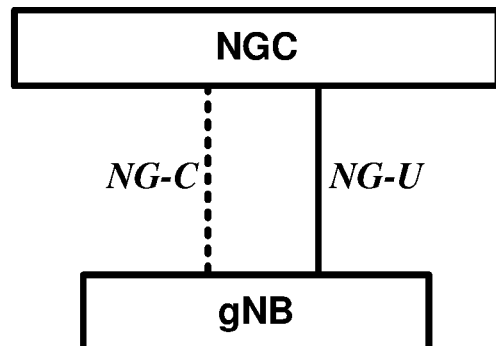
FIG. 10A and FIG. 10B are example diagrams for interfaces between a 5G core network (e.g. NGC) and base stations (e.g. gNB and eLTE eNB) as per an aspect of an embodiment of the present disclosure.
Figure 10B:
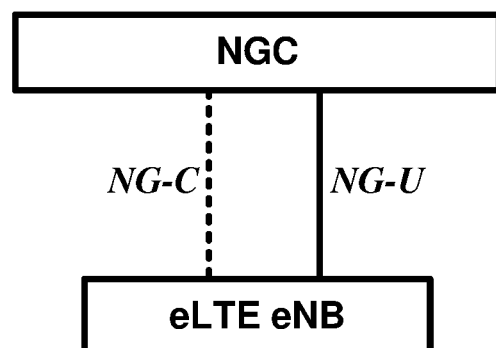

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present disclosure. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
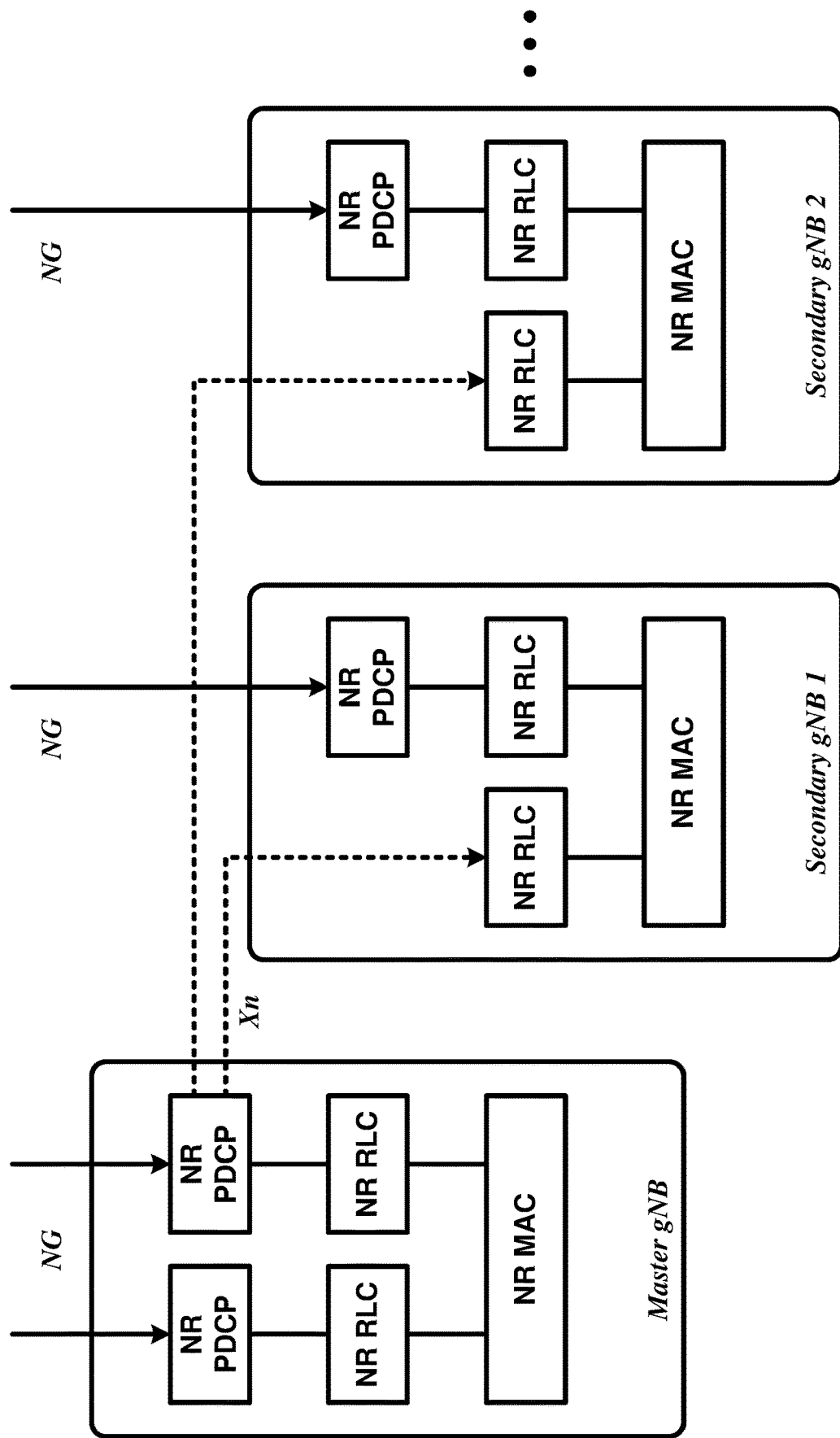
FIG. 6 is an example diagram for a protocol structure with multi-connectivity as per an aspect of an embodiment of the present disclosure.
Figure 7:
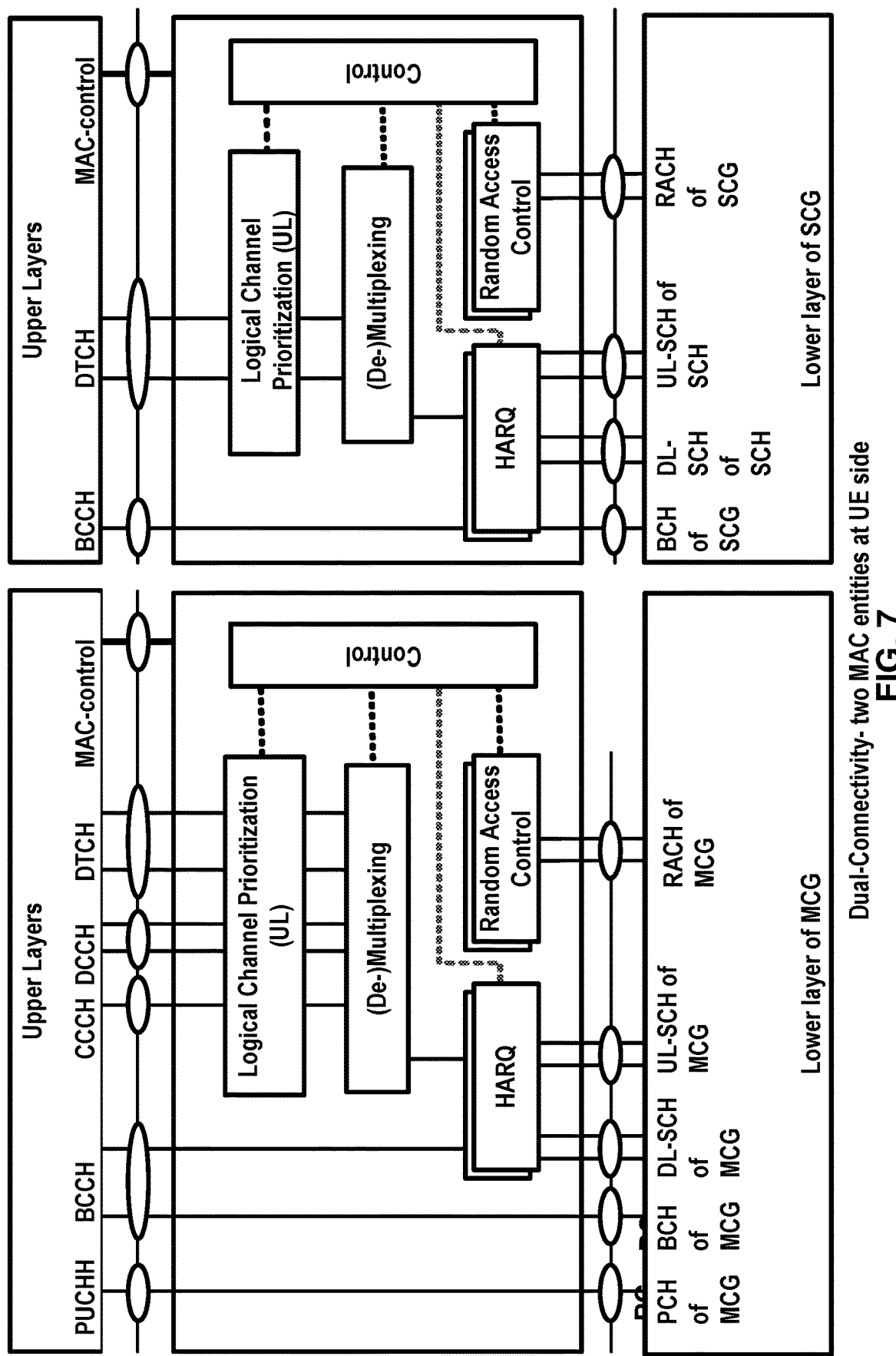
FIG. 7 is an example diagram for a protocol structure with CA and DC as per an aspect of an embodiment of the present disclosure.

FIG. 6 and FIG. 7 are example diagrams for protocol structure with CA and multi-connectivity as per an aspect of an embodiment of the present disclosure. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three examples of bearers, including, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the disclosure.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not be supported.

With respect to the interaction between a master gNB and secondary gNBs for multi-connectivity, one or more of the following principles may be applied: the master gNB may maintain the RRM measurement configuration of the UE and may, (e.g., based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
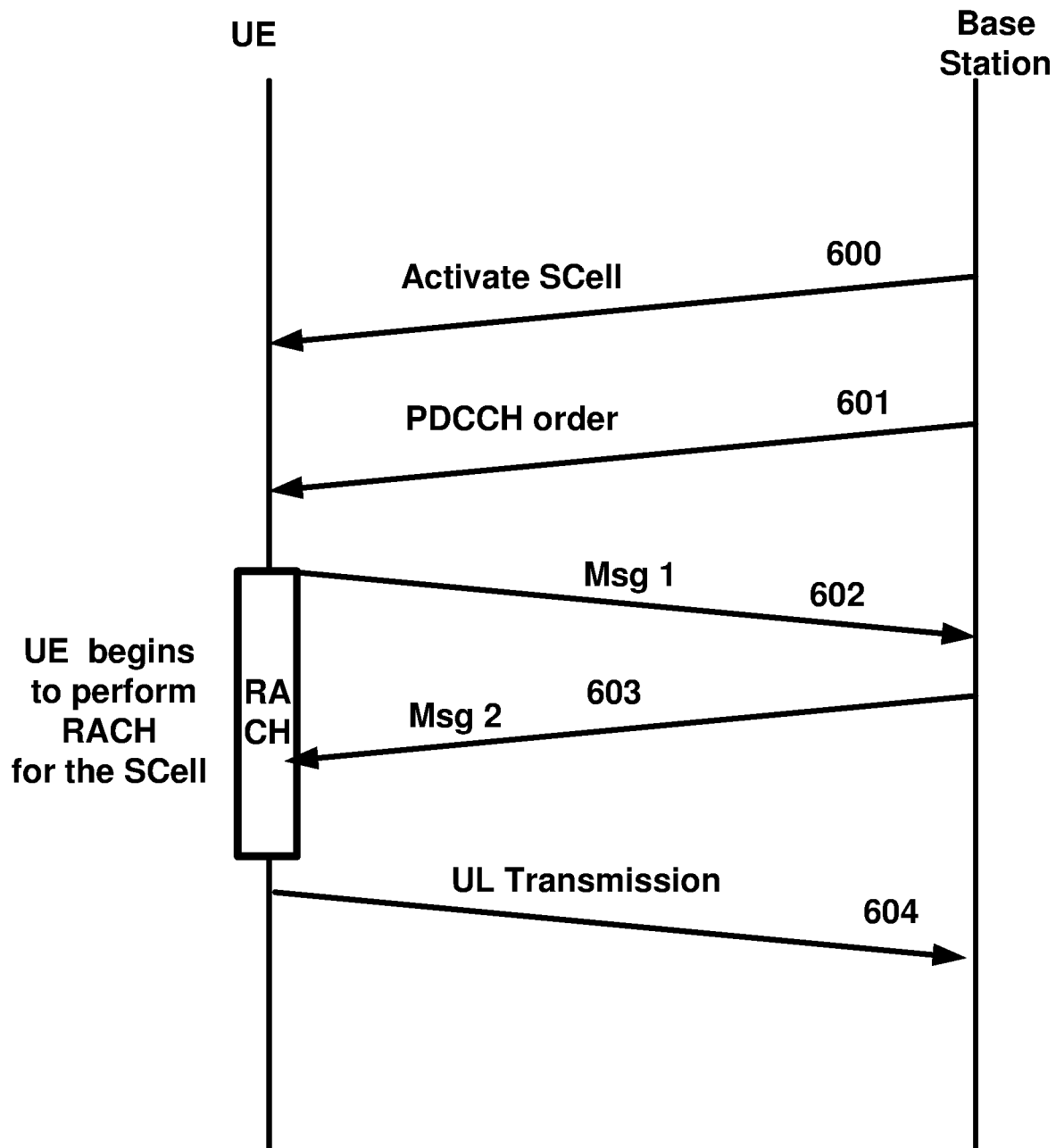
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 900 to activate an SCell. A preamble 902 (Msg1) may be sent by a UE in response to a PDCCH order 901 on an SCell belonging to an sTAG. In an example embodiment, preamble transmission for SCells may be controlled by the network using PDCCH format 1A. Msg2 message 903 (RAR: random access response) in response to the preamble transmission on the SCell may be addressed to RA-RNTI in a PCell common search space (CSS). Uplink packets 904 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present disclosure. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
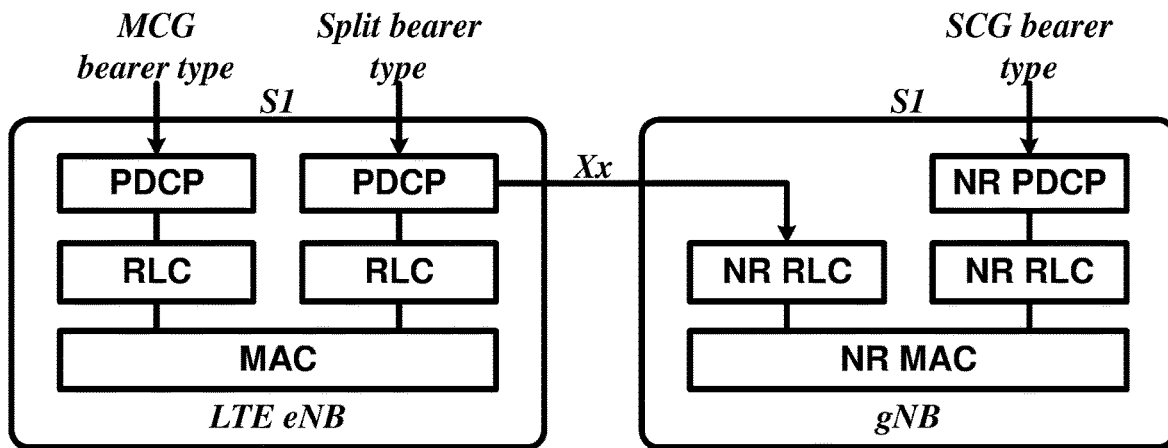
FIG. 12A, FIG. 12B, and FIG. 12C are example diagrams for radio protocol structures of tight interworking bearers as per an aspect of an embodiment of the present disclosure.
Figure 12B:
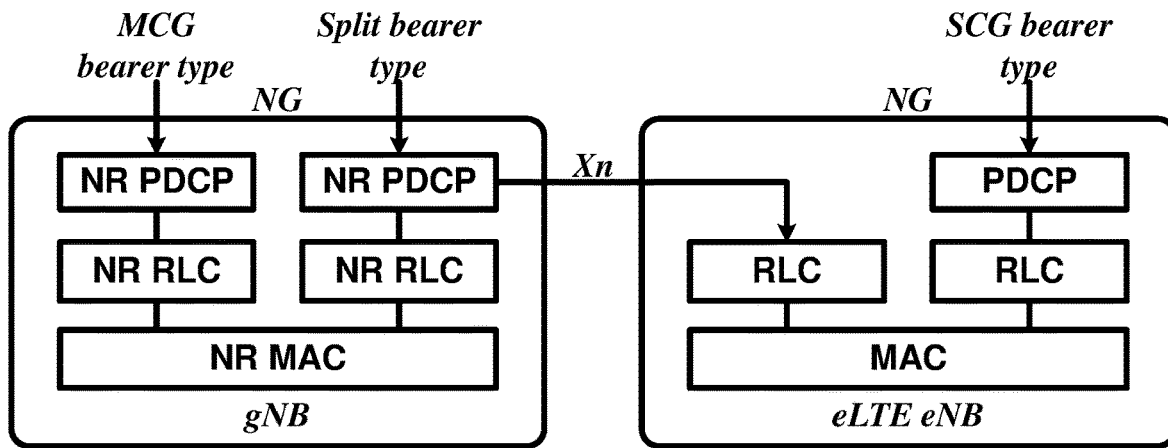
Figure 12C:
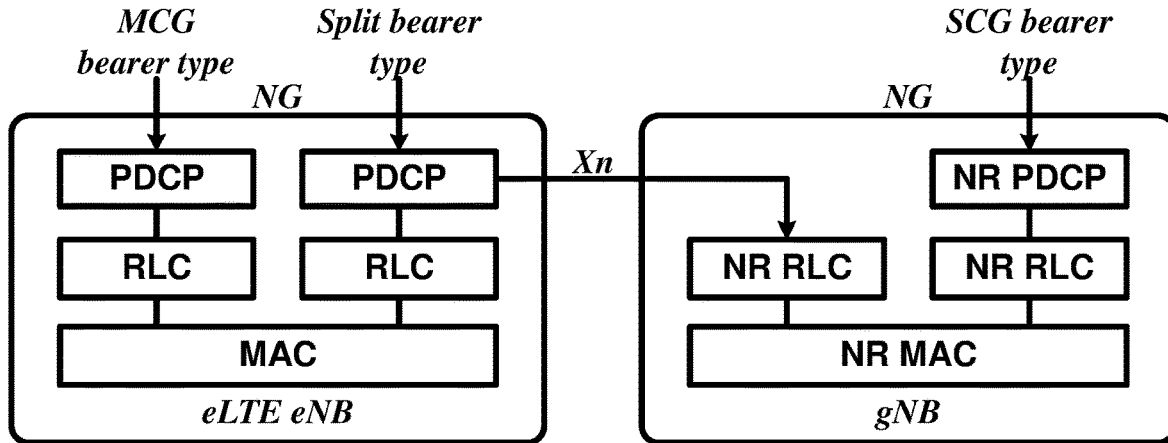

FIG. 12A, FIG. 12B, and FIG. 12C are example diagrams for radio protocol structures of tight interworking bearers as per an aspect of an embodiment of the present disclosure. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three example bearers including an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the disclosure.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g., based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
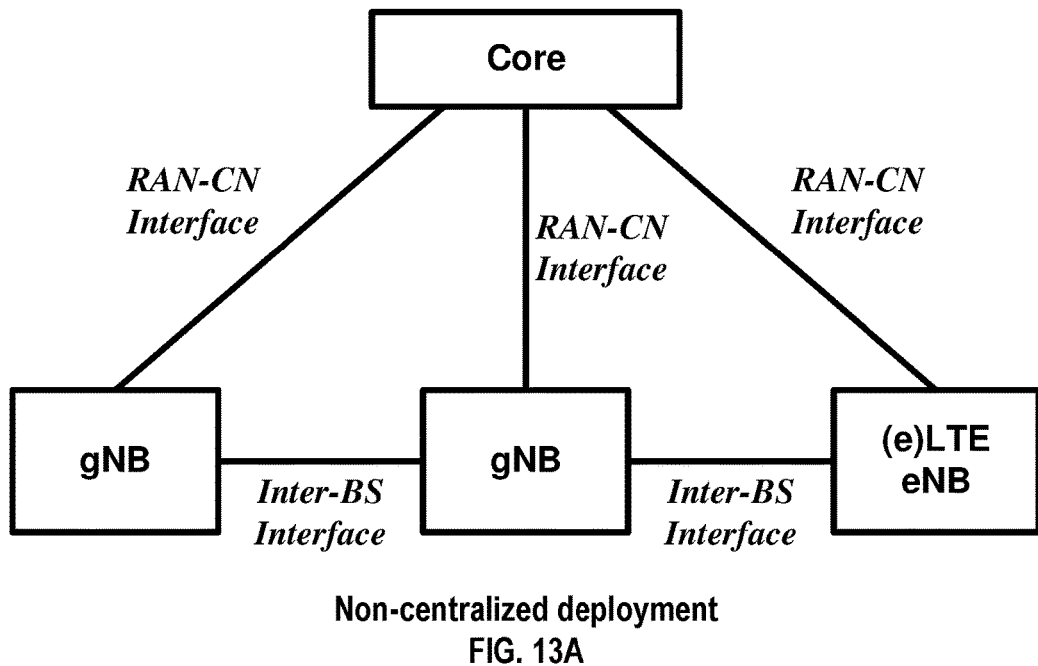
FIG. 13A and FIG. 13B are example diagrams for gNB deployment scenarios as per an aspect of an embodiment of the present disclosure.
Figure 13B:
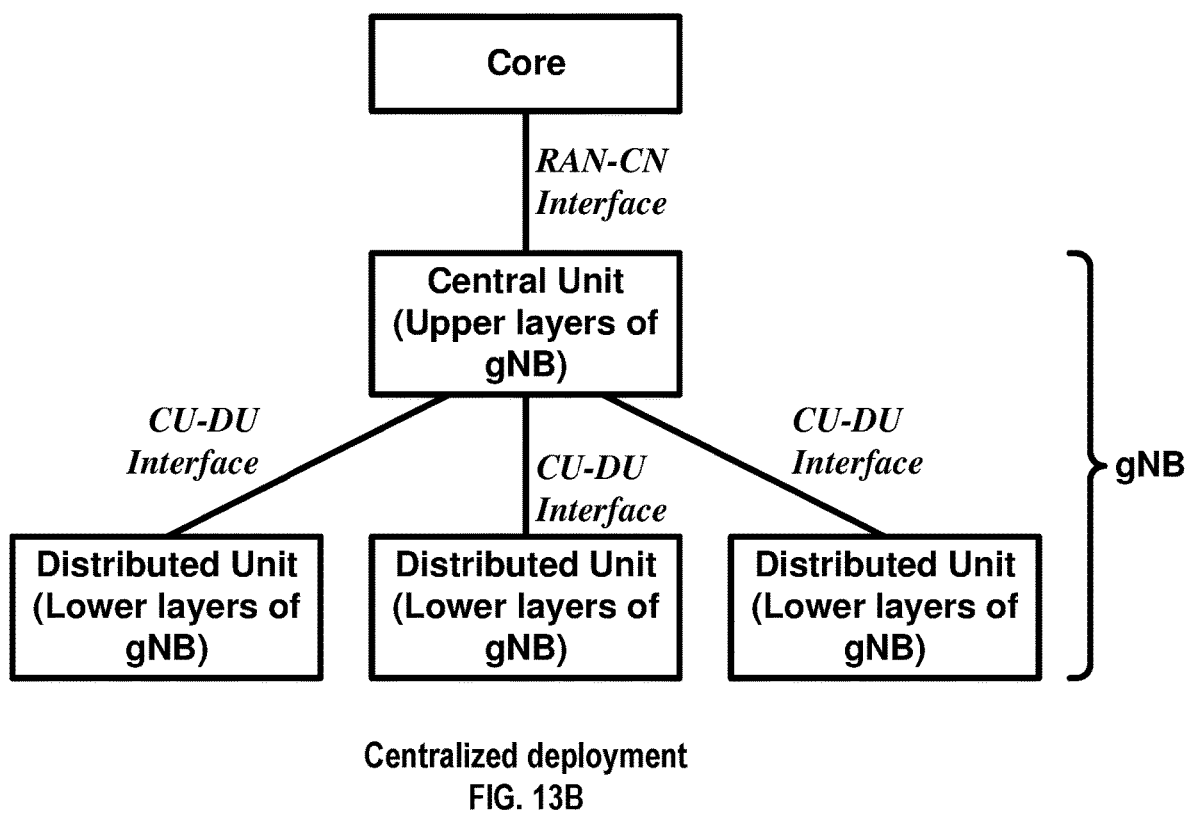

FIG. 13A and FIG. 13B are example diagrams for gNB deployment scenarios as per an aspect of an embodiment of the present disclosure. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
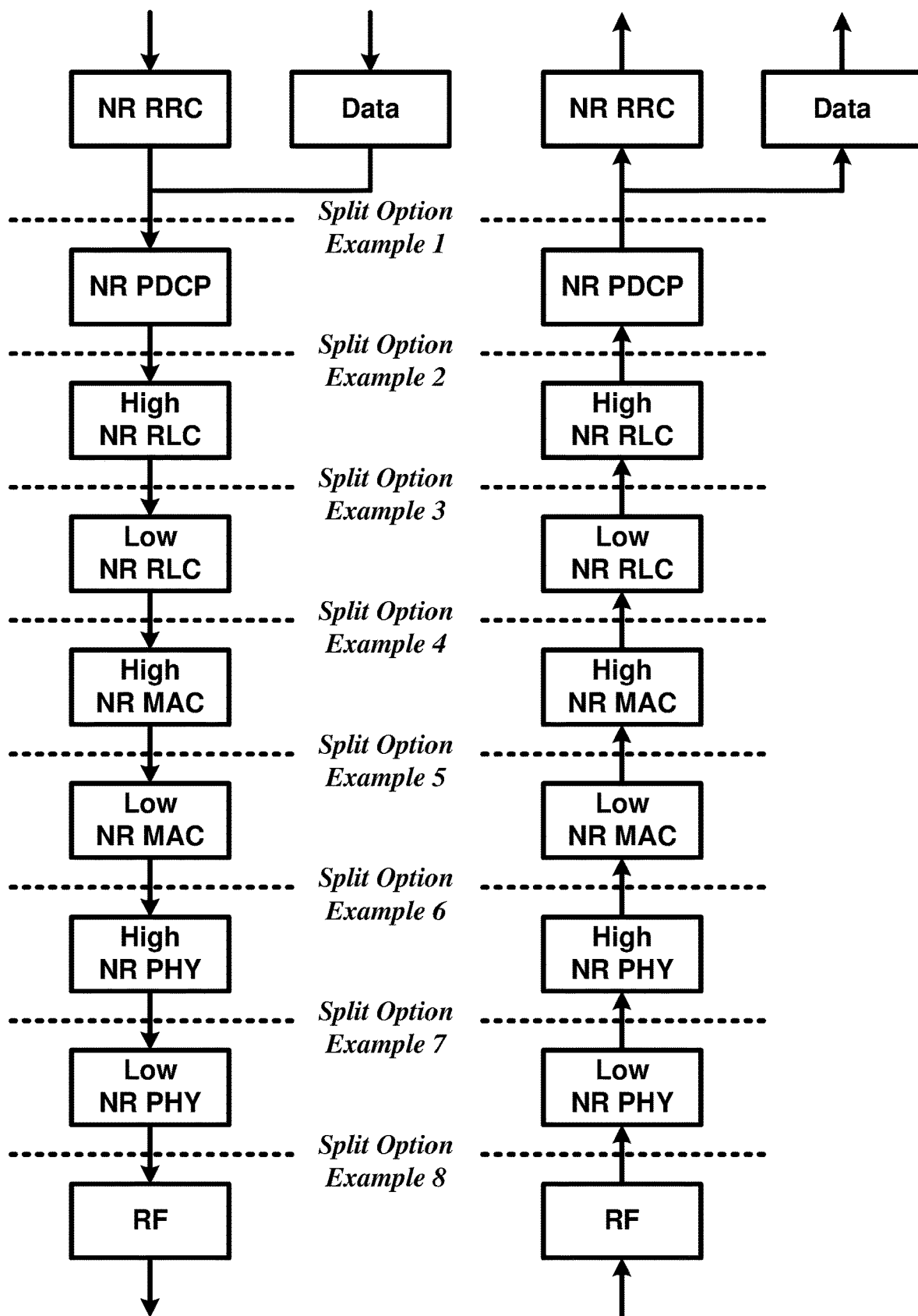
FIG. 14 is an example diagram for functional split option examples of the centralized gNB deployment scenario as per an aspect of an embodiment of the present disclosure.

FIG. 14 is an example diagram for different functional split option examples of the centralized gNB deployment scenario as per an aspect of an embodiment of the present disclosure. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, a DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices; time & frequency synchronization of wireless devices.

In an example embodiment, DL LAA design may employ subframe boundary alignment according to LTE-A carrier aggregation timing relationships across serving cells aggregated by CA. This may not imply that the base station transmissions may start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the wireless device. The UL LBT scheme may be different from the DL LBT scheme (e.g. by using different LBT mechanisms or parameters) for example, since the LAA UL is based on scheduled access which affects a wireless device's channel contention opportunities. Other considerations motivating a different UL LBT scheme include, but are not limited to, multiplexing of multiple wireless devices in a single subframe.

In an example, a DL transmission burst may be a continuous transmission from a DL transmitting node with no transmission immediately before or after from the same node on the same CC. An UL transmission burst from a wireless device perspective may be a continuous transmission from a wireless device with no transmission immediately before or after from the same wireless device on the same CC. In an example, UL transmission burst is defined from a wireless device perspective. In an example, an UL transmission burst may be defined from a base station perspective. In an example, in case of a base station operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

A New Radio (NR) system may support both single beam and multi-beam operations. In a multi-beam system, a base station (e.g., gNB) may perform a downlink beam sweeping to provide coverage for downlink Synchronization Signals (SSs) and common control channels. A User Equipment (UE) may perform an uplink beam sweeping for uplink direction to access a cell. In a single beam scenario, a gNB may configure time-repetition transmission for one SS block, which may comprise at least Primary Synchronization Signal (PSS), Secondary Synchronization Signal (SSS), and Physical Broadcast Channel (PBCH), with a wide beam. In a multi-beam scenario, a gNB may configure at least some of these signals and physical channels in multiple beams. A UE may identify at least OFDM symbol index, slot index in a radio frame and radio frame number from an SS block.

Figure 15:
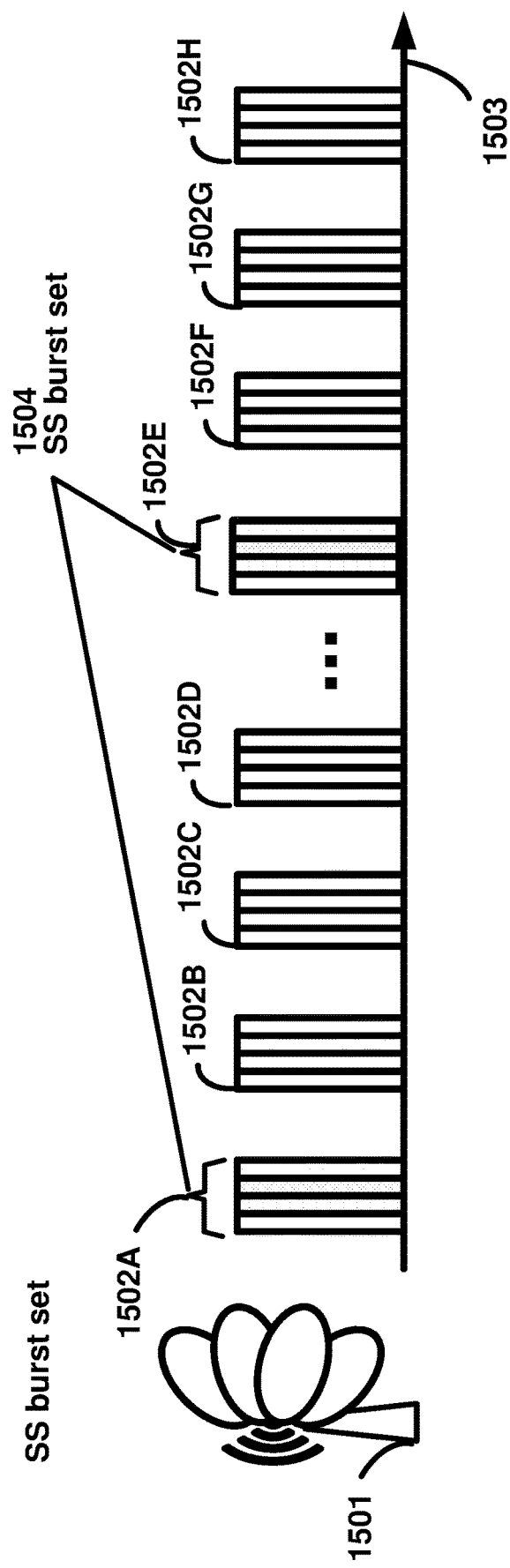
FIG. 15 is an example diagram for synchronization signal block transmissions as per an aspect of an embodiment of the present disclosure.

In an example, in an RRC_INACTIVE state or RRC_IDLE state, a UE may assume that SS blocks form an SS burst, and an SS burst set. An SS burst set may have a given periodicity. In multi-beam scenarios, SS blocks may be transmitted in multiple beams, together forming an SS burst. One or more SS blocks may be transmitted on one beam. A beam has a steering direction. If multiple SS bursts are transmitted with beams, these SS bursts together may form an SS burst set as shown in FIG. 15. A base station 1501 (e.g., a gNB in NR) may transmit SS bursts 1502A to 1502H during time periods 1503. A plurality of these SS bursts may comprise an SS burst set, such as an SS burst set 1504 (e.g., SS bursts 1502A and 1502E). An SS burst set may comprise any number of a plurality of SS bursts 1502A to 1502H. Each SS burst within an SS burst set may transmitted at a fixed or variable periodicity during time periods 1503.

An SS may be based on Cyclic Prefix-Orthogonal Frequency Division Multiplexing (CP-OFDM). The SS may comprise at least two types of synchronization signals; NR-PSS (Primary synchronization signal) and NR-SSS (Secondary synchronization signal). NR-PSS may be defined at least for initial symbol boundary synchronization to the NR cell. NR-SSS may be defined for detection of NR cell ID or at least part of NR cell ID. NR-SSS detection may be based on the fixed time/frequency relationship with NR-PSS resource position irrespective of duplex mode and beam operation type at least within a given frequency range and CP overhead. Normal CP may be supported for NR-PSS and NR-SSS.

The NR may comprise at least one physical broadcast channel (NR-PBCH). When a gNB transmit (or broadcast) the NR-PBCH, a UE may decode the NR-PBCH based on the fixed relationship with NR-PSS and/or NR-SSS resource position irrespective of duplex mode and beam operation type at least within a given frequency range and CP overhead. NR-PBCH may be a non-scheduled broadcast channel carrying at least a part of minimum system information with fixed payload size and periodicity predefined in the specification depending on carrier frequency range.

In single beam and multi-beam scenarios, NR may comprise an SS block that may support time (frequency, and/or spatial) division multiplexing of NR-PSS, NR-SSS, and NR-PBCH. A gNB may transmit NR-PSS, NR-SSS and/or NR-PBCH within an SS block. For a given frequency band, an SS block may correspond to N OFDM symbols based on the default subcarrier spacing, and N may be a constant. The signal multiplexing structure may be fixed in NR. A wireless device may identify, e.g., from an SS block, an OFDM symbol index, a slot index in a radio frame, and a radio frame number from an SS block.

A NR may support an SS burst comprising one or more SS blocks. An SS burst set may comprise one or more SS bursts. For example, a number of SS bursts within a SS burst set may be finite. From physical layer specification perspective, NR may support at least one periodicity of SS burst set. From UE perspective, SS burst set transmission may be periodic, and UE may assume that a given SS block is repeated with an SS burst set periodicity.

Within an SS burst set periodicity, NR-PBCH repeated in one or more SS blocks may change. A set of possible SS block time locations may be specified per frequency band in an RRC message. The maximum number of SS-blocks within SS burst set may be carrier frequency dependent. The position(s) of actual transmitted SS-blocks may be informed at least for helping CONNECTED/IDLE mode measurement, for helping CONNECTED mode UE to receive downlink (DL) data/control in one or more SS-blocks, or for helping IDLE mode UE to receive DL data/control in one or more SS-blocks. A UE may not assume that the gNB transmits the same number of physical beam(s). A UE may not assume the same physical beam(s) across different SS-blocks within an SS burst set. For an initial cell selection, UE may assume default SS burst set periodicity which may be broadcast via an RRC message and frequency band-dependent. At least for multi-beams operation case, the time index of SS-block may be indicated to the UE.

For CONNECTED and IDLE mode UEs, NR may support network indication of SS burst set periodicity and information to derive measurement timing/duration (e.g., time window for NR-SS detection). A gNB may provide (e.g., via broadcasting an RRC message) one SS burst set periodicity information per frequency carrier to UE and information to derive measurement timing/duration if possible. In case that one SS burst set periodicity and one information regarding timing/duration are indicated, a UE may assume the periodicity and timing/duration for all cells on the same carrier. If a gNB does not provide indication of SS burst set periodicity and information to derive measurement timing/duration, a UE may assume a predefined periodicity, e.g., 5 ms, as the SS burst set periodicity. NR may support set of SS burst set periodicity values for adaptation and network indication.

For initial access, a UE may assume a signal corresponding to a specific subcarrier spacing of NR-PSS/SSS in a given frequency band given by a NR specification. For NR-PSS, a Zadoff-Chu (ZC) sequence may be employed as a sequence for NR-PSS. NR may define at least one basic sequence length for a SS in case of sequence-based SS design. The number of antenna port of NR-PSS may be 1. For NR-PBCH transmission, NR may support a fixed number of antenna port(s). A UE may not be required for a blind detection of NR-PBCH transmission scheme or number of antenna ports. A UE may assume the same PBCH numerology as that of NR-SS. For the minimum system information delivery, NR-PBCH may comprise a part of minimum system information. NR-PBCH contents may comprise at least a part of the SFN (system frame number) or CRC. A gNB may transmit the remaining minimum system information in shared downlink channel via NR-PDSCH.

In a multi-beam example, one or more of PSS, SSS, or PBCH signals may be repeated for a cell, e.g., to support cell selection, cell reselection, and/or initial access procedures. For an SS burst, an associated PBCH or a physical downlink shared channel (PDSCH) scheduling system information may be broadcasted by a base station to multiple wireless devices. The PDSCH may be indicated by a physical downlink control channel (PDCCH) in a common search space. The system information may comprise a physical random access channel (PRACH) configuration for a beam. For a beam, a base station (e.g., a gNB in NR) may have a RACH configuration which may include a PRACH preamble pool, time and/or frequency radio resources, and other power related parameters. A wireless device may use a PRACH preamble from a RACH configuration to initiate a contention-based RACH procedure or a contention-free RACH procedure. A wireless device may perform a 4-step RACH procedure, which may be a contention-based RACH procedure or a contention-free RACH procedure. The wireless device may select a beam associated with an SS block that may have the best receiving signal quality. The wireless device may successfully detect a cell identifier associated with the cell and decode system information with a RACH configuration. The wireless device may use one PRACH preamble and select one PRACH resource from RACH resources indicated by the system information associated with the selected beam. A PRACH resource may comprise at least one of: a PRACH index indicating a PRACH preamble, a PRACH format, a PRACH numerology, time and/or frequency radio resource allocation, power setting of a PRACH transmission, and/or other radio resource parameters. For a contention-free RACH procedure, the PRACH preamble and resource may be indicated in a DCI or other high layer signaling.

Figure 16:
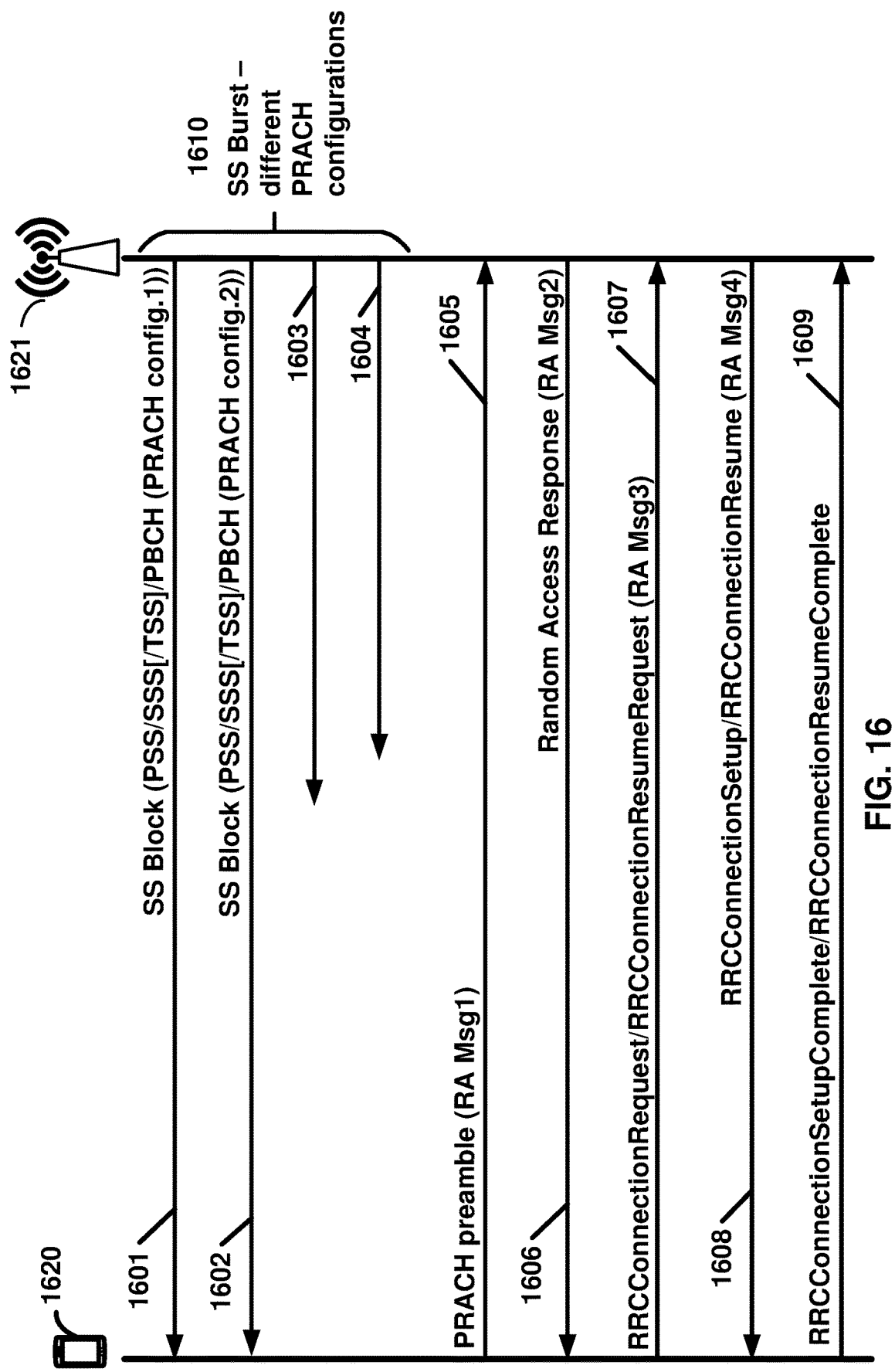
FIG. 16 is an example diagram of random access procedure when configured with multiple beam as per an aspect of an embodiment of the present disclosure.

FIG. 16 shows an example of a random access procedure (e.g., via a RACH) that may include sending, by a base station, one or more SS blocks. A wireless device 1620 (e.g., a UE) may transmit one or more preambles to a base station 1621 (e.g., a gNB in NR). Each preamble transmission by the wireless device may be associated with a separate random access procedure, such as shown in FIG. 16. The random access procedure may begin at step 1601 with a base station 1621 (e.g., a gNB in NR) sending a first SS block to a wireless device 1621 (e.g., a UE). Any of the SS blocks may comprise one or more of a PSS, SSS, tertiary synchronization signal (TSS), or PBCH signal. The first SS block in step 1601 may be associated with a first PRACH configuration. At step 1602, the base station 1621 may send to the wireless device 1620 a second SS block that may be associated with a second PRACH configuration. At step 1603, the base station 1621 may send to the wireless device 1620 a third SS block that may be associated with a third PRACH configuration. At step 1604, the base station 1621 may send to the wireless device 1620 a fourth SS block that may be associated with a fourth PRACH configuration. Any number of SS blocks may be sent in the same manner in addition to, or replacing, steps 1603 and 1604. An SS burst may comprise any number of SS blocks. For example, SS burst 1610 comprises the three SS blocks sent during steps 1602-1604.

The wireless device 1620 may send to the base station 1621 a preamble, at step 1605, e.g., after or in response to receiving one or more SS blocks or SS bursts. The preamble may comprise a PRACH preamble, and may be referred to as RA Msg 1. The PRACH preamble may be transmitted in step 1605 according to or based on a PRACH configuration that may be received in an SS block (e.g., one of the SS blocks from steps 1601-1604) that may be determined to be the best SS block beam. The wireless device 1620 may determine a best SS block beam from among SS blocks it may receive prior to sending the PRACH preamble. The base station 1621 may send a random access response (RAR), which may be referred to as RA Msg2, at step 1606, e.g., after or in response to receiving the PRACH preamble. The RAR may be transmitted in step 1606 via a DL beam that corresponds to the SS block beam associated with the PRACH configuration. The base station 1621 may determine the best SS block beam from among SS blocks it previously sent prior to receiving the PRACH preamble. The base station 1621 may receive the PRACH preamble according to or based on the PRACH configuration associated with the best SS block beam.

The wireless device 1620 may send to the base station 1621 an RRCConnectionRequest and/or RRCConnectionResumeRequest message, which may be referred to as RA Msg3, at step 1607, e.g., after or in response to receiving the RAR. The base station 1621 may send to the wireless device 1620 an RRCConnectionSetup and/or RRCConnectionResume message, which may be referred to as RA Msg4, at step 1608, e.g., after or in response to receiving the RRCConnectionRequest and/or RRCConnectionResumeRequest message. The wireless device 1620 may send to the base station 1621 an RRCConnectionSetupComplete and/or RRCConnectionResumeComplete message, which may be referred to as RA Msg5, at step 1609, e.g., after or in response to receiving the RRCConnectionSetup and/or RRCConnectionResume. An RRC connection may be established between the wireless device 1620 and the base station 1621, and the random access procedure may end, e.g., after or in response to receiving the RRCConnectionSetupComplete and/or RRCConnectionResumeComplete message.

A best beam, including but not limited to a best SS block beam, may be determined based on a channel state information reference signal (CSI-RS). A wireless device may use a CSI-RS in a multi-beam system for estimating the beam quality of the links between the wireless device and a base station. For example, based on a measurement of a CSI-RS, a wireless device may report CSI for downlink channel adaption. A CSI parameter may include a precoding matrix index (PMI), a channel quality index (CQI) value, and/or a rank indicator (RI). A wireless device may report a beam index based on a reference signal received power (RSRP) measurement on a CSI-RS. The wireless device may report the beam index in a CSI resource indication (CRI) for downlink beam selection. A base station may transmit a CSI-RS via a CSI-RS resource, such as via one or more antenna ports, or via one or more time and/or frequency radio resources. A beam may be associated with a CSI-RS. A CSI-RS may comprise an indication of a beam direction. Each of a plurality of beams may be associated with one of a plurality of CSI-RSs. A CSI-RS resource may be configured in a cell-specific way, e.g., via common RRC signaling. Additionally or alternatively, a CSI-RS resource may be configured in a wireless device-specific way, e.g., via dedicated RRC signaling and/or layer 1 and/or layer 2 (L1/L2) signaling. Multiple wireless devices in or served by a cell may measure a cell-specific CSI-RS resource. A dedicated subset of wireless devices in or served by a cell may measure a wireless device-specific CSI-RS resource. A base station may transmit a CSI-RS resource periodically, using aperiodic transmission, or using a multi-shot or semi-persistent transmission. In a periodic transmission, a base station may transmit the configured CSI-RS resource using a configured periodicity in the time domain. In an aperiodic transmission, a base station may transmit the configured CSI-RS resource in a dedicated time slot. In a multi-shot or semi-persistent transmission, a base station may transmit the configured CSI-RS resource in a configured period. A base station may configure different CSI-RS resources in different terms for different purposes. Different terms may include, e.g., cell-specific, device-specific, periodic, aperiodic, multi-shot, or other terms. Different purposes may include, e.g., beam management, CQI reporting, or other purposes.

Figure 17:
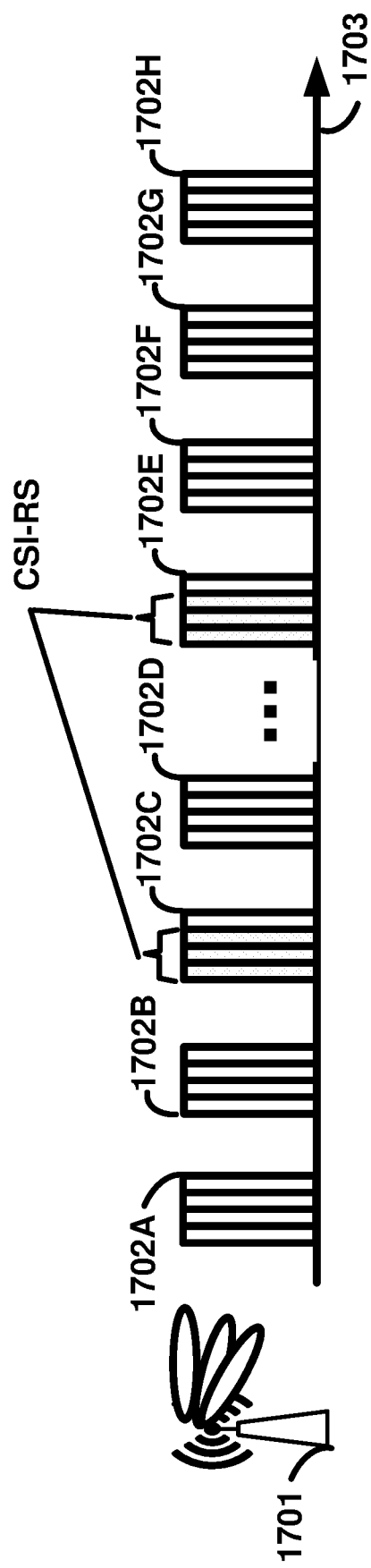
FIG. 17 is an example diagram for channel state information reference signal (CSI-RS) transmissions as per an aspect of an embodiment of the present disclosure.

FIG. 17 shows an example of transmitting CSI-RSs periodically for a beam. A base station 1701 may transmit a beam in a predefined order in the time domain, such as during time periods 1703. Beams used for a CSI-RS transmission, such as for CSI-RS 1704 in transmissions 1702C and/or 1703E, may have a different beam width relative to a beam width for SS-blocks transmission, such as for SS blocks 1702A, 1702B, 1702D, and 1702F-1702H. Additionally or alternatively, a beam width of a beam used for a CSI-RS transmission may have the same value as a beam width for an SS block. Some or all of one or more CSI-RSs may be included in one or more beams. An SS block may occupy a number of OFDM symbols (e.g., 4), and a number of subcarriers (e.g., 240), carrying a synchronization sequence signal. The synchronization sequence signal may identify a cell.

Figure 18:
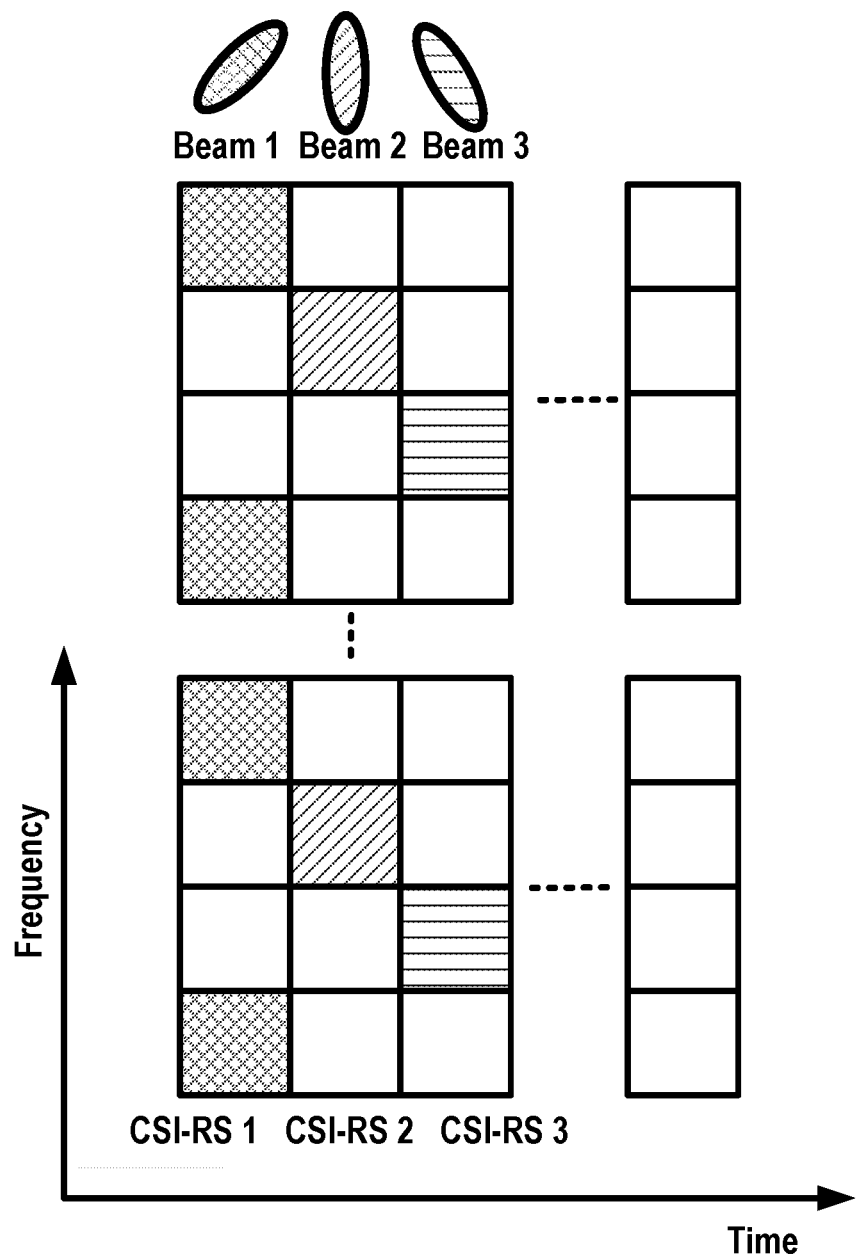
FIG. 18 is an example diagram for channel state information reference signal (CSI-RS) transmissions as per an aspect of an embodiment of the present disclosure.

FIG. 18 shows an example of a CSI-RS that may be mapped in time and frequency domains. Each square shown in FIG. 18 may represent a resource block within a bandwidth of a cell. Each resource block may comprise a number of subcarriers. A cell may have a bandwidth comprising a number of resource blocks. A base station (e.g., a gNB in NR) may transmit one or more Radio Resource Control (RRC) messages comprising CSI-RS resource configuration parameters for one or more CSI-RS. One or more of the following parameters may be configured by higher layer signaling for each CSI-RS resource configuration: CSI-RS resource configuration identity, number of CSI-RS ports, CSI-RS configuration (e.g., symbol and RE locations in a subframe), CSI-RS subframe configuration (e.g., subframe location, offset, and periodicity in a radio frame), CSI-RS power parameter, CSI-RS sequence parameter, CDM type parameter, frequency density, transmission comb, QCL parameters (e.g., QCL-scramblingidentity, crs-portscount, mbsfn-subframeconfiglist, csi-rs-configZPid, qcl-csi-rs-configNZPid), and/or other radio resource parameters.

FIG. 18 shows three beams that may be configured for a wireless device, e.g., in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in a RB of a second symbol. Beam 3 may be allocated with CSI-RS 3 that may be transmitted in some subcarriers in a RB of a third symbol. All subcarriers in a RB may not necessarily be used for transmitting a particular CSI-RS (e.g., CSI-RS 1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally or alternatively, by using time domain multiplexing (TDM), beams used for a wireless device may be configured such that different beams (e.g., beam 1, beam 2, and beam 3) for the wireless device may be transmitted using some symbols different from beams of other wireless devices.

Beam management may use a device-specific configured CSI-RS. In a beam management procedure, a wireless device may monitor a channel quality of a beam pair link comprising a transmitting beam by a base station (e.g., a gNB in NR) and a receiving beam by the wireless device (e.g., a UE). When multiple CSI-RSs associated with multiple beams are configured, a wireless device may monitor multiple beam pair links between the base station and the wireless device.

A wireless device may transmit one or more beam management reports to a base station. A beam management report may indicate one or more beam pair quality parameters, comprising, e.g., one or more beam identifications, RSRP, PMI, CQI, and/or RI, of a subset of configured beams.

Figure 20A:
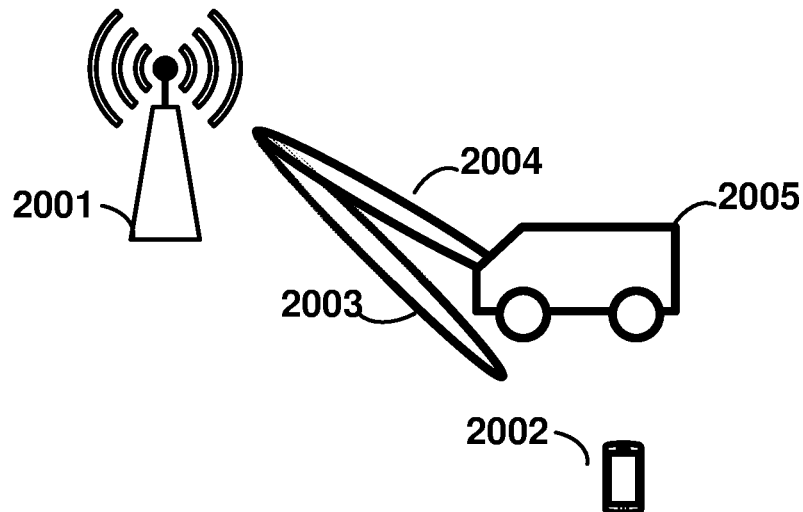
FIG. 20A is an example diagram for downlink beam failure scenario in a transmission receiving point (TRP) as per an aspect of an embodiment of the present disclosure.
Figure 20B:
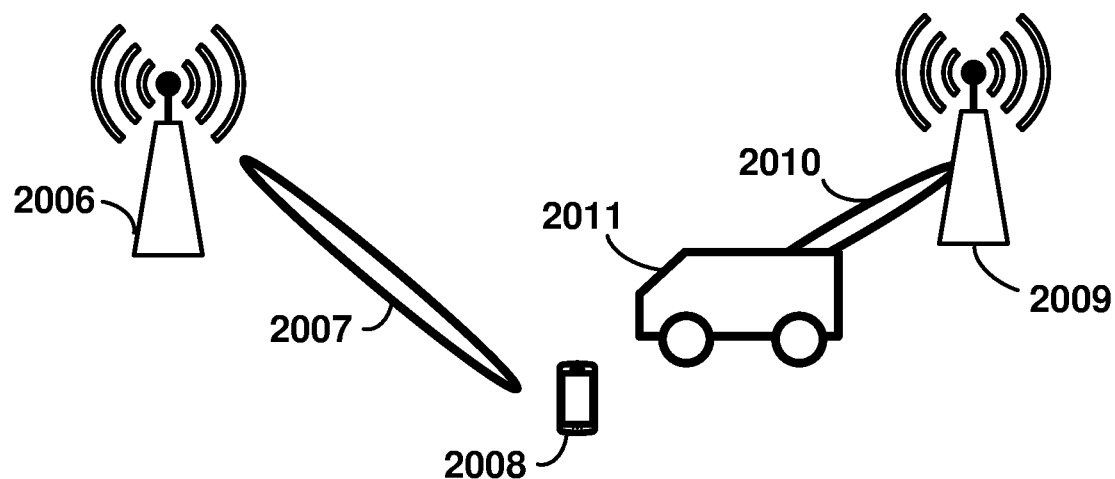
FIG. 20B is an example diagram for downlink beam failure scenario in multiple TRPs as per an aspect of an embodiment of the present disclosure.

A base station and/or a wireless device may perform a downlink L1/L2 beam management procedure. One or more downlink L1/L2 beam management procedures may be performed within one or multiple transmission and receiving points (TRPs), such as shown in FIG. 20A and FIG. 20B, respectively.

Figure 19:
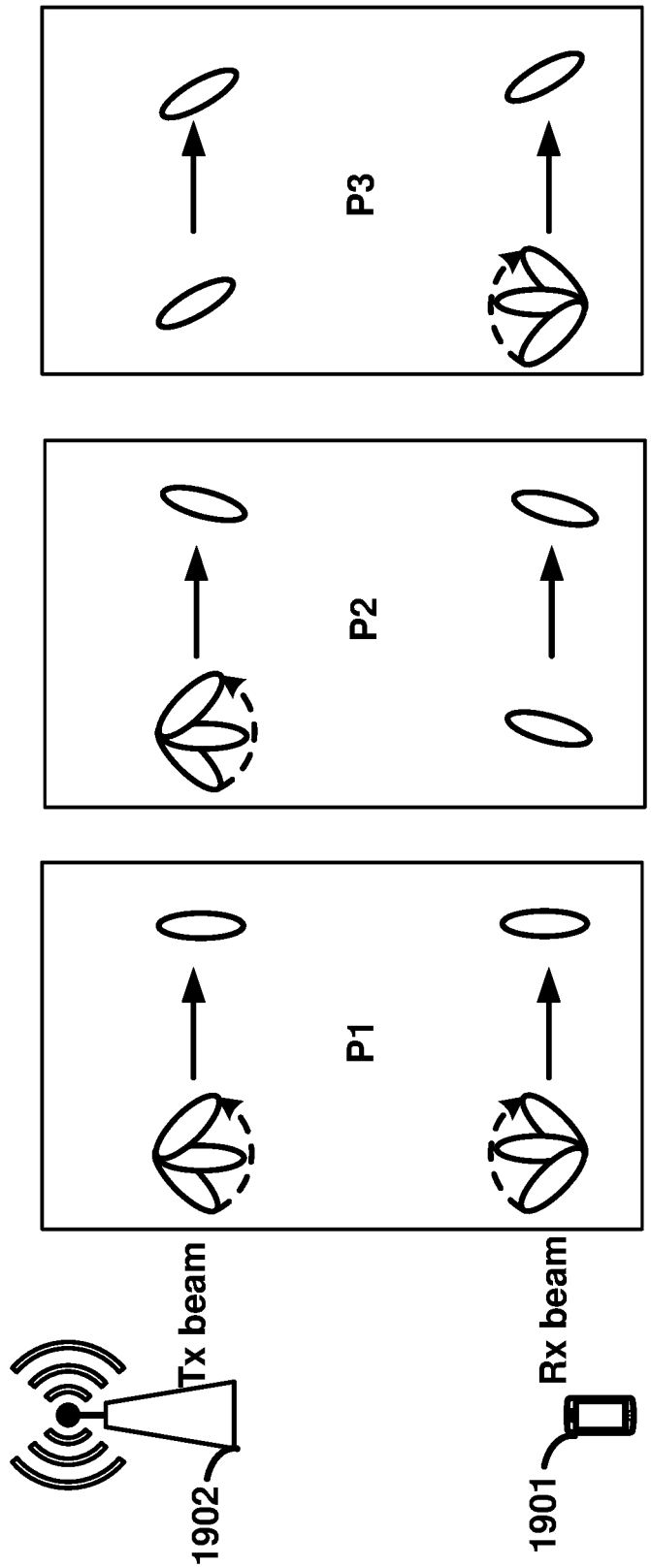
FIG. 19 is an example diagram for downlink beam management procedures as per an aspect of an embodiment of the present disclosure.

FIG. 19 shows examples of three beam management procedures, P1, P2, and P3. Procedure P1 may be used to enable a wireless device measurement on different transmit (Tx) beams of a TRP (or multiple TRPs), e.g., to support a selection of Tx beams and/or wireless device receive (Rx) beam(s) (shown as ovals in the top row and bottom row, respectively, of P1). Beamforming at a TRP (or multiple TRPs) may include, e.g., an intra-TRP and/or inter-TRP Tx beam sweep from a set of different beams (shown, in the top rows of P1 and P2, as ovals rotated in a counter-clockwise direction indicated by the dashed arrow). Beamforming at a wireless device 1901, may include, e.g., a wireless device Rx beam sweep from a set of different beams (shown, in the bottom rows of P1 and P3, as ovals rotated in a clockwise direction indicated by the dashed arrow). Procedure P2 may be used to enable a wireless device measurement on different Tx beams of a TRP (or multiple TRPs) (shown, in the top row of P2, as ovals rotated in a counter-clockwise direction indicated by the dashed arrow), e.g., which may change inter-TRP and/or intra-TRP Tx beam(s). Procedure P2 may be performed, e.g., on a smaller set of beams for beam refinement than in procedure P1. P2 may be a particular example of P1. Procedure P3 may be used to enable a wireless device measurement on the same Tx beam (shown as oval in P3), e.g., to change a wireless device Rx beam if the wireless device 1901 uses beamforming.

A wireless device 1901 (e.g., a UE) and/or a base station 1902 (e.g., a gNB) may trigger a beam failure recovery mechanism. The wireless device 1901 may trigger a beam failure recovery (BFR) request transmission, e.g., if a beam failure event occurs. A beam failure event may include, e.g., a determination that a quality of beam pair link(s) of an associated control channel is unsatisfactory. A determination of an unsatisfactory quality of beam pair link(s) of an associated channel may be based on the quality falling below a threshold and/or an expiration of a timer.

The wireless device 1901 may measure a quality of beam pair link(s) using one or more reference signals (RS). One or more SS blocks, one or more CSI-RS resources, and/or one or more demodulation reference signals (DM-RSs) of a PBCH may be used as a RS for measuring a quality of a beam pair link. Each of the one or more CSI-RS resources may be associated with a CSI-RS resource index (CRI). A quality of a beam pair link may be based on one or more of an RSRP value, reference signal received quality (RSRQ) value, and/or CSI value measured on RS resources. The base station 1902 may indicate that an RS resource, e.g., that may be used for measuring a beam pair link quality, is quasi-co-located (QCLed) with one or more DM-RSs of a control channel. The RS resource and the DM-RSs of the control channel may be QCLed when the channel characteristics from a transmission via an RS to the wireless device 1901, and the channel characteristics from a transmission via a control channel to the wireless device, are similar or the same under a configured criterion.

FIG. 20A shows an example of a beam failure event involving a single TRP. A single TRP such as at a base station 2001 may transmit, to a wireless device 2002, a first beam 2003 and a second beam 2004. A beam failure event may occur if, e.g., a serving beam, such as the second beam 2004, is blocked by a moving vehicle 2005 or other obstruction (e.g., building, tree, land, or any object) and configured beams (e.g., the first beam 2003 and/or the second beam 2004), including the serving beam, are received from the single TRP. The wireless device 2002 may trigger a mechanism to recover from beam failure when a beam failure occurs.

FIG. 20B shows an example of a beam failure event involving multiple TRPs. Multiple TRPs, such as at a first base station 2006 and at a second base station 2009, may transmit, to a wireless device 2008, a first beam 2007 (e.g., from the first base station 2006) and a second beam 2010 (e.g., from the second base station 2009). A beam failure event may occur when, e.g., a serving beam, such as the second beam 2010, is blocked by a moving vehicle 2011 or other obstruction (e.g., building, tree, land, or any object) and configured beams (e.g., the first beam 2007 and/or the second beam 2010) are received from multiple TRPs. The wireless device 2008 may trigger a mechanism to recover from beam failure when a beam failure occurs.

A wireless device may monitor a PDCCH, such as a New Radio PDCCH (NR-PDCCH), on M beam pair links simultaneously, where M≥1 and the maximum value of M may depend at least on the wireless device capability. Such monitoring may increase robustness against beam pair link blocking. A base station may transmit, and the wireless device may receive, one or more messages configured to cause the wireless device to monitor NR-PDCCH on different beam pair link(s) and/or in different NR-PDCCH OFDM symbol.

A base station may transmit higher layer signaling, and/or a MAC control element (MAC CE), that may comprise parameters related to a wireless device Rx beam setting for monitoring NR-PDCCH on multiple beam pair links. A base station may transmit one or more indications of a spatial QCL assumption between a first DL RS antenna port(s) and a second DL RS antenna port(s). The first DL RS antenna port(s) may be for one or more of a cell-specific CSI-RS, device-specific CSI-RS, SS block, PBCH with DM-RSs of PBCH, and/or PBCH without DM-RSs of PBCH. The second DL RS antenna port(s) may be for demodulation of a DL control channel. Signaling for a beam indication for a NR-PDCCH (e.g., configuration to monitor NR-PDCCH) may be via MAC CE signaling, RRC signaling, DCI signaling, or specification-transparent and/or an implicit method, and any combination thereof.

For reception of unicast DL data channel, a base station may indicate spatial QCL parameters between DL RS antenna port(s) and DM-RS antenna port(s) of DL data channel. A base station may transmit DCI (e.g., downlink grants) comprising information indicating the RS antenna port(s). The information may indicate the RS antenna port(s) which may be QCLed with DM-RS antenna port(s). A different set of DM-RS antenna port(s) for the DL data channel may be indicated as a QCL with a different set of RS antenna port(s).

If a base station transmits a signal indicating a spatial QCL parameters between CSI-RS and DM-RS for PDCCH, a wireless device may use CSI-RSs QCLed with DM-RS for a PDCCH to monitor beam pair link quality. If a beam failure event occurs, the wireless device may transmit a beam failure recovery request, such as by a determined configuration.

If a wireless device transmits a beam failure recovery request, e.g., via an uplink physical channel or signal, a base station may detect that there is a beam failure event, for the wireless device, by monitoring the uplink physical channel or signal. The base station may initiate a beam recovery mechanism to recover the beam pair link for transmitting PDCCH between the base station and the wireless device. The base station may transmit one or more control signals, to the wireless device, e.g., after or in response to receiving the beam failure recovery request. A beam recovery mechanism may be, e.g., an L1 scheme, or a higher layer scheme.

A base station may transmit one or more messages comprising, e.g., configuration parameters of an uplink physical channel and/or a signal for transmitting a beam failure recovery request. The uplink physical channel and/or signal may be based on at least one of the following: a non-contention based PRACH (e.g., a beam failure recovery PRACH or BFR-PRACH), which may use a resource orthogonal to resources of other PRACH transmissions; a PUCCH (e.g., beam failure recovery PUCCH or BFR-PUCCH); and/or a contention-based PRACH resource. Combinations of these candidate signal and/or channels may be configured by a base station.

A gNB may respond a confirmation message to a UE after receiving one or multiple BFR request. The confirmation message may include the CRI associated with the candidate beam the UE indicates in the one or multiple BFR request. The confirmation message may be a L1 control information.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

In an example, a wireless device may activate/deactivate an SCell in response to receiving an SCell Activation/Deactivation MAC CE.

In an example, a gNB may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising: SRS transmissions on the SCell; CQI/PMI/RI/CRI reporting for the SCell; PDCCH monitoring on the SCell; PDCCH monitoring for the SCell; and/or PUCCH transmissions on the SCell.

In an example, in response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

In an example, when an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell.

In an example, when at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell.

In an example, when an SCell is deactivated, if there is an ongoing random access procedure on the SCell, a wireless device may abort the ongoing random access procedure on the SCell.

FIG. 21A shows an example of an SCell Activation/Deactivation MAC CE of one octet. A first MAC PDU subheader with a first LCID (e.g., '111010') may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g., one).

FIG. 21B shows an example of an SCell Activation/Deactivation MAC CE of four octets. A second MAC PDU subheader with a second LCID (e.g., '111001') may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 21A and/or FIG. 21B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 21A and FIG. 21B, an R field may indicate a reserved bit. The R field may be set to zero.

Figure 22A:
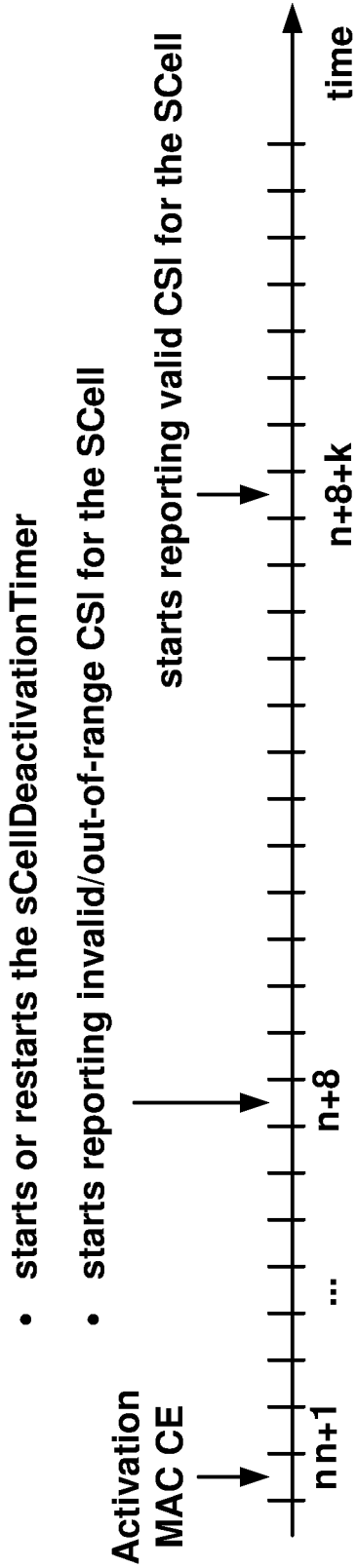
FIG. 22A is an example diagram for timing for CSI report when activation of a secondary cell as per an aspect of an embodiment of the present disclosure.
Figure 22B:
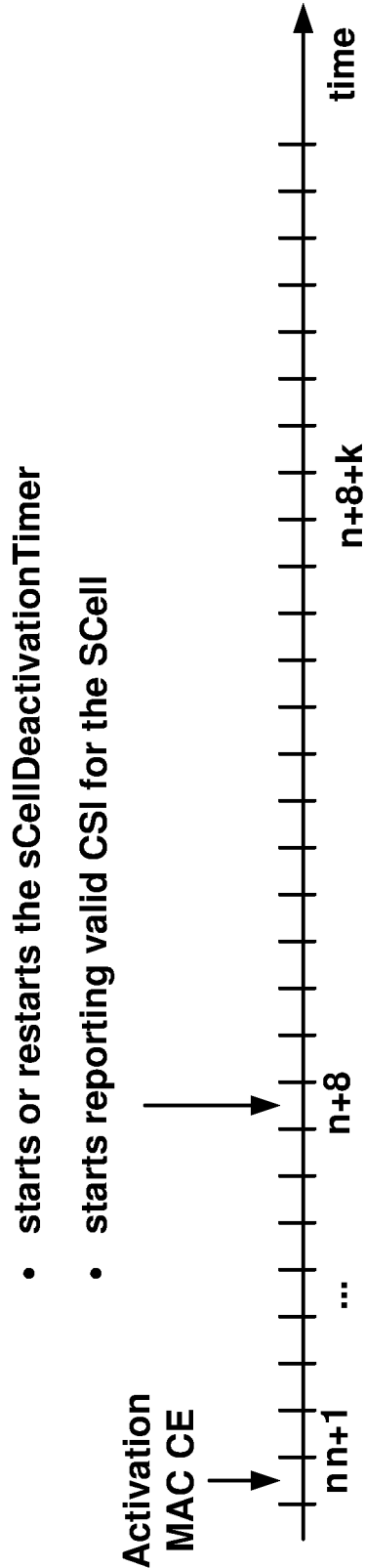
FIG. 22B is an example diagram for timing for CSI report when activation of a secondary cell as per an aspect of an embodiment of the present disclosure.

FIG. 22A and FIG. 22B show timeline when a UE receives a MAC activation command. When a UE receives a MAC activation command for a secondary cell in subframe n, the corresponding actions in the MAC layer shall be applied no later than the minimum requirement defined in 3GPP TS 36.133 or TS 38.133 and no earlier than subframe n+8, except for the following: the actions related to CSI reporting and the actions related to the sCellDeactivation-Timer associated with the secondary cell, which shall be applied in subframe n+8. When a UE receives a MAC deactivation command for a secondary cell or the sCellDeactivationTimer associated with the secondary cell expires in subframe n, the corresponding actions in the MAC layer shall apply no later than the minimum requirement defined in 3GPP TS 36.133 or TS 38.133, except for the actions related to CSI reporting which shall be applied in subframe n+8.

When a UE receives a MAC activation command for a secondary cell in subframe n, the actions related to CSI reporting and the actions related to the sCellDeactivation-Timer associated with the secondary cell, are applied in subframe n+8. When a UE receives a MAC deactivation command for a secondary cell or other deactivation conditions are met (e.g. the sCellDeactivationTimer associated with the secondary cell expires) in subframe n, the actions related to CSI reporting are applied in subframe n+8. The UE starts reporting invalid or valid CSI for the Scell at the $(n+8)^{th}$ subframe, and start or restart the sCellDeactivation-Timer when receiving the MAC CE activating the SCell in the $n^{th}$ subframe. For some UE having slow activation, it may report an invalid CSI (out-of-range CSI) at the $(n+8)^{th}$ subframe, for some UE having a quick activation, it may report a valid CSI at the $(n+8)^{th}$ subframe.

When a UE receives a MAC activation command for an SCell in subframe n, the UE starts reporting CQI/PMI/RI/PTI for the SCell at subframe n+8 and starts or restarts the sCellDeactivationTimer associated with the SCell at subframe n+8. It is important to define the timing of these actions for both UE and eNB. For example, sCellDeactivationTimer is maintained in both eNB and UE and it is important that both UE and eNB stop, start and/or restart this timer in the same TTI. Otherwise, the sCellDeactivation-Timer in the UE may not be in-sync with the corresponding sCellDeactivationTimer in the eNB. Also, eNB starts monitoring and receiving CSI (CQI/PMI/RI/PTI) according to the predefined timing in the same TTI and/or after UE starts transmitting the CSI. If the CSI timings in UE and eNB are not coordinated based on a common standard or air interface signaling the network operation may result in inefficient operations and/or errors.

FIG. 23 shows DCI formats for an example of 20 MHz FDD operation with 2 Tx antennas at the base station and no carrier aggregation in an LTE system. In an example, a gNB may transmit a DCI via a PDCCH for scheduling decision and power-control commends. More specifically, the DCI may comprise at least one of: downlink scheduling assignments, uplink scheduling grants, power-control commands. The downlink scheduling assignments may comprise at least one of: PDSCH resource indication, transport format, HARQ information, and control information related to multiple antenna schemes, a command for power control of the PUCCH used for transmission of ACK/NACK in response to downlink scheduling assignments. The uplink scheduling grants may comprise at least one of: PUSCH resource indication, transport format, and HARQ related information, a power control command of the PUSCH.

The different types of control information correspond to different DCI message sizes. For example, supporting spatial multiplexing with noncontiguous allocation of RBs in the frequency domain may require a larger scheduling message in comparison with an uplink grant allowing for frequency-contiguous allocation only. The DCI may be categorized into different DCI formats, where a format corresponds to a certain message size and usage.

In an example, a UE may monitor one or more PDCCH to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, the information in the DCI formats used for downlink scheduling can be organized into different groups, with the field present varying between the DCI formats, including at least one of: resource information, consisting of: carrier indicator (0 or 3 bits), RB allocation; HARQ process number; MCS, NDI, and RV (for the first TB); MCS, NDI and RV (for the second TB); MIMO related information; PDSCH resource-element mapping and QCI; Downlink assignment index (DAI); TPC for PUCCH; SRS request (1 bit), triggering one-shot SRS transmission; ACK/NACK offset; DCI format 0/1A indication, used to differentiate between DCI format 1A and 0; and padding if necessary. The MIMO related information may comprise at least one of: PMI, precoding information, transport block swap flag, power offset between PDSCH and reference signal, reference-signal scrambling sequence, number of layers, and/or antenna ports for the transmission.

In an example, the information in the DCI formats used for uplink scheduling can be organized into different groups, with the field present varying between the DCI formats, including at least one of: resource information, consisting of: carrier indicator, resource allocation type, RB allocation; MCS, NDI (for the first TB); MCS, NDI (for the second TB); phase rotation of the uplink DMRS; precoding information; CSI request, requesting an aperiodic CSI report; SRS request (2 bit), used to trigger aperiodic SRS transmission using one of up to three preconfigured settings; uplink index/DAI; TPC for PUSCH; DCI format 0/1A indication; and padding if necessary.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol; a number of consecutive OFDM symbols; a set of resource blocks; a CCE-to-REG mapping; and a REG bundle size, in case of interleaved CCE-to-REG mapping.

Example of Bandwidth Part Management

Figure 24:
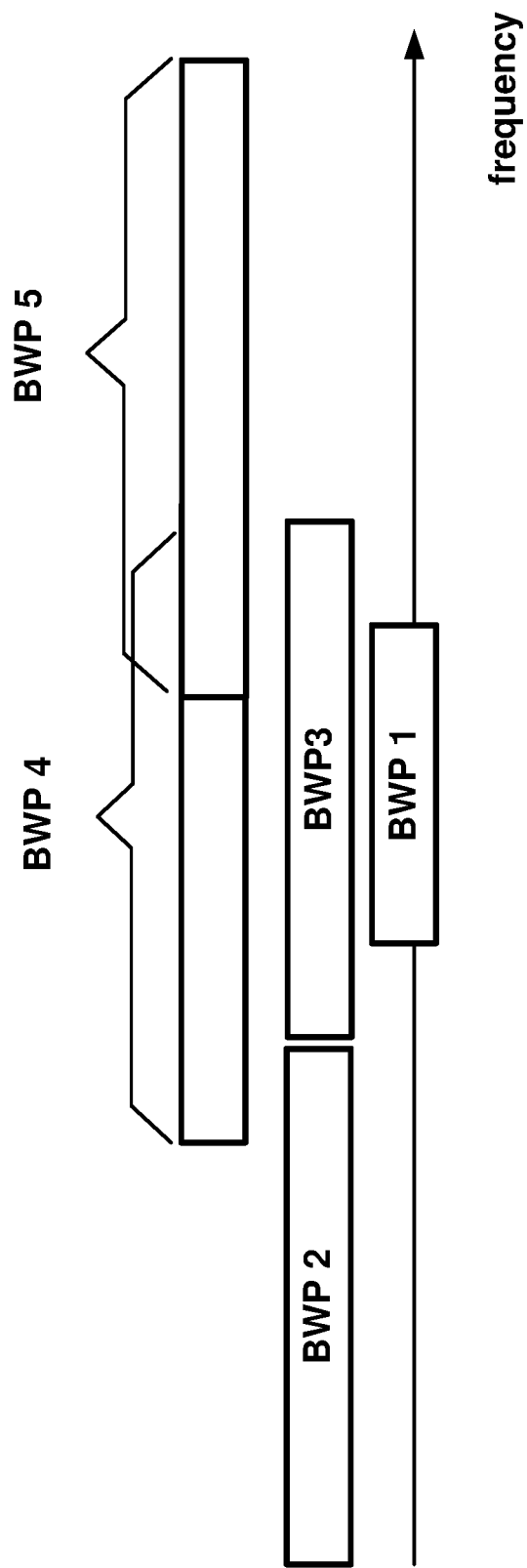
FIG. 24 is an example diagram for bandwidth part (BWP) configurations as per an aspect of an embodiment of the present disclosure.

FIG. 24 shows example of multiple BWP configuration. A gNB may transmit one or more message comprising configuration parameters of one or more bandwidth parts (BWP). The one or more BWPs may have different numerologies. A gNB may transmit one or more control information for cross-BWP scheduling to a UE. One BWP may overlap with another BWP in frequency domain.

A gNB may transmit one or more messages comprising configuration parameters of one or more DL and/or UL BWPs for a cell, with at least one BWP as the active DL or UL BWP, and zero or one BWP as the default DL or UL BWP. For the PCell, the active DL BWP may be the DL BWP on which the UE may monitor one or more PDCCH, and/or receive PDSCH. The active UL BWP is the UL BWP on which the UE may transmit uplink signal. For a secondary cell (SCell) if configured, the active DL BWP may be the DL BWP on which the UE may monitor one or more PDCCH and receive PDSCH when the SCell is activated by receiving a MAC activation/deactivation CE. The active UL BWP is the UL BWP on which the UE may transmit PUCCH (if configured) and/or PUSCH when the SCell is activated by receiving a MAC activation/deactivation CE. Configuration of multiple BWPs may be used to save UE's power consumption. When configured with an active BWP and a default BWP, a UE may switch to the default BWP if there is no activity on the active BWP. For example, a default BWP may be configured with narrow bandwidth, an active BWP may be configured with wide bandwidth. If there is no signal transmitting or receiving, the UE may switch the BWP to the default BWP, which may reduce power consumption.

Switching BWP may be triggered by a DCI or a timer. When a UE receives a DCI indicating DL BWP switching from an active BWP to a new BWP, the UE may monitor PDCCH and/or receive PDSCH on the new BWP. When the UE receives a DCI indicating UL BWP switching from an active BWP to a new BWP, the UE may transmit PUCCH (if configured) and/or PUSCH on the new BWP. A gNB may transmit one or more messages comprising a BWP inactivity timer to a UE. The UE starts the timer when it switches its active DL BWP to a DL BWP other than the default DL BWP. The UE may restart the timer to the initial value when it successfully decodes a DCI to schedule PDSCH(s) in its active DL BWP. The UE may switch its active DL BWP to the default DL BWP when the BWP timer expires.

In an example embodiment, a UE configured for operation in bandwidth parts (BWPs) of a serving cell, may be configured by higher layers for the serving cell a set of bandwidth parts (BWPs) for receptions by the UE (DL BWP set) or a set of BWPs for transmissions by the UE (UL BWP set). In an example, for a DL BWP or UL BWP in a set of DL BWPs or UL BWPs, respectively, the UE may be configured at least one of following for the serving cell: a subcarrier spacing for DL and/or UL provided by higher layer parameter, a cyclic prefix for DL and/or UL provided by higher layer parameter, a number of contiguous PRBs for DL and/or UL provided by higher layer parameter, an offset of the first PRB for DL and/or UL in the number of contiguous PRBs relative to the first PRB by higher layer, or Q control resource sets if the BWP is a DL BWP.

In an example embodiment, for each serving cell, higher layer signalling may configure a UE with Q control resource sets. In an example, for control resource set q, $0 \leq q < Q$, the configuration may comprise at least one of following: a first OFDM symbol provided by one or more higher layer parameters, a number of consecutive OFDM symbols provided by one or more higher layer parameters, a set of resource blocks provided by one or more higher layer parameters, a CCE-to-REG mapping provided by one or more higher layer parameters, a REG bundle size, in case of interleaved CCE-to-REG mapping, provided by one or more higher layer parameters, or antenna port quasi-collocation provided by higher layer parameter.

In an example embodiment, a control resource set may comprise a set of CCEs numbered from 0 to $N_{CCE,q}-1$ where $N_{CCE,q}$ may be the number of CCEs in control resource set q.

In an example embodiment, the sets of PDCCH candidates that a UE monitors may be defined in terms of PDCCH UE-specific search spaces. A PDCCH UE-specific search space at CCE aggregation level $L \in \{1, 2, 4, 8\}$ may be defined by a set of PDCCH candidates for CCE aggregation level L. In an example, for a DCI format, a UE may be configured per serving cell by one or more higher layer parameters a number of PDCCH candidates per CCE aggregation level L.

In an example embodiment, in non-DRX mode operation, a UE may monitor one or more PDCCH candidate in control resource set q according to a periodicity of $W_{PDCCH,\ q}$ symbols that may be configured by one or more higher layer parameters for control resource set q.

In an example embodiment, if a UE is configured with higher layer parameter, e.g., cif-InSchedulingCell, the carrier indicator field value may correspond to cif-InSchedulingCell.

In an example embodiment, for the serving cell on which a UE may monitor one or more PDCCH candidate in a UE-specific search space, if the UE is not configured with a carrier indicator field, the UE may monitor the one or more PDCCH candidates without carrier indicator field. In an example, for the serving cell on which a UE may monitor one or more PDCCH candidates in a UE-specific search space, if a UE is configured with a carrier indicator field, the UE may monitor the one or more PDCCH candidates with carrier indicator field.

In an example embodiment, a UE may not monitor one or more PDCCH candidates on a secondary cell if the UE is configured to monitor one or more PDCCH candidates with carrier indicator field corresponding to that secondary cell in another serving cell. For example, for the serving cell on which the UE may monitor one or more PDCCH candidates, the UE may monitor the one or more PDCCH candidates at least for the same serving cell.

In an example embodiment, a UE may receive PDCCH and PDSCH in a DL BWP according to a configured subcarrier spacing and CP length for the DL BWP. A UE may transmit PUCCH and PUSCH in an UL BWP according to a configured subcarrier spacing and CP length for the UL BWP.

In an example embodiment, a UE may be configured, by one or more higher layer parameters, a DL BWP from a configured DL BWP set for DL receptions. A UE may be configured by one or more higher layer parameters, an UL BWP from a configured UL BWP set for UL transmissions. If a DL BWP index field is configured in a DCI format scheduling PDSCH reception to a UE, the DL BWP index field value may indicate the DL BWP, from the configured DL BWP set, for DL receptions. If an UL-BWP index field is configured in a DCI format scheduling PUSCH transmission from a UE, the UL-BWP index field value may indicate the UL BWP, from the configured UL BWP set, for UL transmissions.

In an example embodiment, for TDD, a UE may expect that the center frequency for the DL BWP is same as the center frequency for the UL BWP.

In an example embodiment, a UE may not monitor PDCCH when the UE performs measurements over a bandwidth that is not within the DL BWP for the UE.

In an example embodiment, for an initial active DL BWP, UE may identify the bandwidth and frequency of the initial active DL BWP in response to receiving the NR-PBCH.

In an example embodiment, a bandwidth of an initial active DL BWP may be confined within the UE minimum bandwidth for the given frequency band. For example, for flexible for DL information scheduling, the bandwidth may be indicated in PBCH, and/or some bandwidth candidates may be predefined. For example, x bits may be employed for indication. This enables.

In an example embodiment, a frequency location of initial active DL BWP may be derived from the bandwidth and SS block, e.g. center frequency of the initial active DL BWP. For example, a SS block may have a frequency offset, as the edge of SS block PRB and data PRB boundary may not be aligned. Predefining the frequency location of SS block and initial active DL BWP may reduce the PBCH payload size, additional bits are not needed for indication of frequency location of initial active DL BWP.

In an example embodiment, for the paired UL BWP, the bandwidth and frequency location may be informed in RMSI.

In an example embodiment, for a UE, gNB may configure a set of BWPs by RRC. The UE may transmit or receive in an active BWP from the configured BWPs in a given time instance. For example, an activation/deactivation of DL bandwidth part by means of timer for a UE to switch its active DL bandwidth part to a default DL bandwidth part may be supported. In this case, when the timer at the UE side expires, e.g. the UE has not received scheduling DCI for X ms, the UE may switch to the default DL BWP.

In an example, a new timer, e.g., BWPDeactivationTimer, may be defined to deactivate the original BWP and switch to the default BWP. The BWPDeactivationTimer may be started when the original BWP is activated by the activation/deactivation DCI. If PDCCH on the original BWP is received, a UE may restart the BWPDeactivationTimer associated with the original BWP. For example, if the BWPDeactivationTimer expires, a UE may deactivate the original BWP and switch to the default BWP, may stop the BWPDeactivationTimer for the original BWP, and may (or may not) flush all HARQ buffers associated with the original BWP.

In an example embodiment, gNB and UE may have different understanding of the starting of the timer since the UE may miss scheduling grants. In an example, the UE may be triggered to switch to the default BWP, but gNB may schedules the UE in the previous active BWP. For example, in the case that the default BWP is nested within other BWPs, gNB may restrict the location of the CORESET of BWP2 to be within BWP1 (e.g., the narrow band BWP1 may be the default BWP). Then the UE may receive CORESET and switch back to BWP2 if it mistakenly switches to the default BWP.

In an example embodiment, for a case that the default BWP and the other BWPs are not overlapped in frequency domain, it may not solve a miss switching problem by restricting the location of the CORESET. For example, the gNB may maintain a timer for a UE. When the timer expires, e.g. there is no data scheduling for the UE for Y ms, or gNB has not received feedback from the UE for Y' ms, the UE may switch to the default BWP to send paging signal or re-schedule the UE in the default BWP.

In an example embodiment, gNB may not fix the default bandwidth part to be the same as initial active bandwidth part it. Since the initial active DL BWP may be the SS block bandwidth which is common to UEs in the cell, the traffic load may be very heavy if many UEs fall back to such small bandwidth for data transmission. Configuring the UEs with different default BWPs may help to balance the load in the system bandwidth.

In an example embodiment, on a Scell, there may be no initial active BWP since the initial access is performed on the Pcell. For example, the initially activated DL BWP and/or UL BWP when the Scell is activated may be configured or reconfigured by RRC signaling. In an example, the default BWP of the Scell may also be configured or reconfigured by RRC signaling. To strive for a unified design for both Pcell and Scell, the default BWP may be configured or reconfigured by the RRC signalling, and the default BWP may be one of the configured BWPs of the UE.

In an example embodiment, gNB may configure UE-specific default DL BWP other than initial active BWP after RRC connection, e.g., for the purpose of load balancing. The default BWP may support other connected mode operations (besides operations supported by initial active BWP) for example fall back and connected mode paging. In this case, the default BWP may comprise common search space, at least the search space needed for monitoring the pre-emption indications. For example, for FDD, the default DL and UL BWPs may be independently configured to the UE.

In an example, the initial active DL/UL BWP may be set as default DL/UL BWP. In an example, a UE may return to default DL/UL BWP in some cases. For example, if a UE does not receive control for a long time, the UE may fallback to default BWP.

In an example embodiment, gNB may configure UE with multiple BWPs. For example, the multiple BWPs may share at least one CORESET including default BWP. For example, CORESET for RMSI may be shared for all configured BWP. Without going back to another BWP or default BWP, the UE may receive control information via the common CORESET. To minimize the ambiguity of resource allocation, the common CORESET may schedule data within only default BWP. For example, frequency region of default BWP may belong to all the configured BWPs.

In an example embodiment, when the configured BWP is associated with a different numerology from default BWP, a semi-static pattern of BWP switching to default BWP may be considered. For example, to check RMSI at least periodically, switching to default BWP may be considered. This may be necessary particularly when BWPs use different numerologies.

In an example embodiment, in terms of reconfiguration of default BWP from initial BWP, it may be considered for RRC connected UEs. For RRC_IDLE UEs, default BWP may be same as initial BWP (or, RRC_IDLE UE may fallback to initial BWP regardless of default BWP). If a UE performs measurement based on SS block, reconfiguration of default BWP outside of initial BWP may become very inefficient due to frequent measurement gap. In this sense, if default BWP is reconfigured to outside of initial BWP, the following conditions may be satisfied: a UE is in CONNECTED mode, and a UE is not configured with SS block based measurement for both serving cell and neighbor cells.

In an example embodiment, a DL BWP other than the initial active DL BWP may be configured to a UE as the default DL BWP. The reconfiguring the default DL BWP may be due to load balancing and/or different numerologies employed for active DL BWP and initial active DL BWP.

In an example embodiment, a default BWP on Pcell may be an initial active DL BWP for transmission of RMSI, comprising RMSI CORESET with CSS. The RMSI CORESET may comprise USS. The initial active/default BWP may remain active BWP for the user also after UE becomes RRC connected.

In an example embodiment, for a paired spectrum, downlink and uplink bandwidth parts may be independently activated while, for an unpaired spectrum downlink and uplink bandwidth parts are jointly activated. In case of bandwidth adaptation, where the bandwidth of the active downlink BWP may be changed, there may, in case of an unpaired spectrum, be a joint activation of a new downlink BWP and new uplink BWP. For example, a new DL/UL BWP pair where the bandwidth of the uplink BWPs may be the same (e.g., no change of uplink BWP).

In an example embodiment, there may be an association of DL BWP and UL BWP in RRC configuration. For example, in case of TDD, a UE may not retune the center frequency of channel BW between DL and UL. In this case, since the RF is shared between DL and UL in TDD, a UE may not retune the RF BW for every alternating DL-to-UL and UL-to-DL switching.

In an example embodiment, making an association between DL BWP and UL BWP may allow that one activation/deactivation command may switch both DL and UL BWPs at once. Otherwise, separate BWP switching commands may be necessary.

In an example embodiment, a DL BWP and an UL BWP may be configured to the UE separately. Pairing of the DL BWP and the UL BWP may impose constrains on the configured BWPs, e.g., the paired DL BWP and UL BWP may be activated simultaneously. For example, gNB may indicate a DL BWP and an UL BWP to a UE for activation in a FDD system. In an example, gNB may indicate a DL BWP and an UL BWP with the same center frequency to a UE for activation in a TDD system. Since the activation/deactivation of the BWP of the UE is instructed by gNB, no paring or association of the DL BWP and UL BWP may be mandatory even for TDD system. It may be up to gNB implementation.

In an example embodiment, the association between DL carrier and UL carrier within a serving cell may be done by carrier association. For example, for TDD system, UE may not be expected to retune the center frequency of channel BW between DL and UL. To achieve it, an association between DL BWP and UL BWP may be needed. For example, a way to associate them may be to group DL BWP configurations with same center frequency as one set of DL BWPs and group UL BWP configurations with same center frequency as one set of UL BWPs. The set of DL BWPs may be associated with the set of UL BWPs sharing the same center frequency.

For an FDD serving cell, there may be no association between DL BWP and UL BWP if the association between DL carrier and UL carrier within a serving cell may be done by carrier association.

In an example embodiment, UE may identify a BWP identity from DCI to simplify the indication process. The total number of bits for BWP identity may depend on the number of bits that may be employed within the scheduling DCI (or switching DCI) and the UE minimum BW. The number of BWPs may be determined by the UE supported minimum BW along with the network maximum BW. For instance, in a similar way, the maximum number of BWP may be determined by the network maximum BW and the UE minimum BW. In an example, if 400 MHz is the network maximum BW and 50 MHz is the UE minimum BW, 8 BWP may be configured to the UE which means that 3 bits may be needed within the DCI to indicate the BWP. In an example, such a split of the network BW depending on the UE minimum BW may be useful for creating one or more default BWPs from the network side by distributing UEs across the entire network BW, e.g., load balancing purpose.

In an example embodiment, at least 2 DL and 2 UL BWP may be supported by a UE for a BWP adaption. For example, the total number of BWP supported by a UE may be given by 2≤Number of DL/UL BWP≤floor (Network maximum BW/UE minimum DL/UL BW). For example, a maximum number of configured BWPs may be 4 for DL and UL respectively. For example, a maximum number of configured BWPs for UL may be 2.

In an example embodiment, different sets of BWPs may be configured for different DCI formats/scheduling types respectively. For example, some larger BWPs may be configured for non-slot-based scheduling than that for slot-based scheduling. If different DCI formats are defined for slot-based scheduling and non-slot-based scheduling, different BWPs may be configured for different DCI formats. This may provide flexibility between different scheduling types without increasing DCI overhead. The 2-bit bitfield may be employed to indicate a BWP among the four for the DCI format. For example, 4 DL BWPs or [2 or 4] UL BWPs may be configured for each DCI formats. Same or different BWPs may be configured for different DCI formats.

In an example embodiment, a required maximum number of configured BWPs (may be not comprising the initial BWP) may depend on the flexibility needed for a BWP functionality. For example, in the minimal case of supporting bandlimited devices, it may be sufficient to be able to configure one DL BWP and one UL BWP (or a single DL/UL BWP pair in case of unpaired spectrum). For example, to support bandwidth adaptation, there may be a need to configure (at least) two DL BWPs and a single uplink BWP for paired spectrum (or two DL/UL BWP pairs for unpaired spectrum). For example, to support dynamic load-balancing between different parts of the spectrum, there may be a need to configure one or more DL (UL) BWPs that jointly cover different parts of the downlink (uplink) carrier. In an example, for dynamic load balancing, it may be sufficient with two bandwidth parts. In addition to the two bandwidth parts, two additional bandwidth parts may be needed for bandwidth adaptation. For example, a Maximum number of configured BWPs may be four DL BWPs and two UL BWPs for a paired spectrum. For example, a Maximum number of configured BWPs may be four DL/UL BWP pairs for an unpaired spectrum.

In an example embodiment, UE may monitor for RMSI and broadcast OSI which may be transmitted by the gNB within the common search space (CSS) on the PCell. In an example, RACH response and paging control monitoring on the PCell may be transmitted within the CSS. In an example, when a UE is allowed to be on an active BWP configured with UE-specific search space (USSS or USS), the UE may not monitor the common search space.

In an example, for a PCell, at least one of configured DL bandwidth parts may comprise at least one CORESET with a CSS type. For example, to monitor RMSI and broadcast OSI, UE may periodically switch to the BWP containing the CSS. In an example, the UE may periodically switch to the BWP containing the CSS for RACH response and paging control monitoring on the PCell.

In an example, if BWP switching to monitor the CSS happens frequently, it may result in increasing overhead. In an example, the overhead due to the CSS monitoring may depends on overlapping in frequency between any two BWPs. In an example, in a nested BWP configuration where one BWP is a subset of another BWP, the same CORESET configuration may be employed across the BWPs. In this case, unless reconfigured otherwise, a default BWP may be the one containing the CSS, and another BWP may contain the CSS. In an example, the BWPs may be partially overlapping. If the overlapping region is sufficient, a CSS may be across a first BWP and a second BWP. In an example, two non-overlapping BWP configurations may exist.

In an example embodiment, there may be one or more benefits of configuring the same CORESET containing the CSS across BWPs. For example, RMSI and broadcast OSI monitoring may be handled without necessitating BWP switching. In an example, RACH response and paging control monitoring on the PCell may also be handled without switching. For example, if CORESET configuration is the same across BWPs, robustness for BWP switching may improve, because even if gNB and UE are out-of-sync as to which BWP is currently active, the DL control channel may work. In an example, one or more constraints on BWP configuration may not be too much, considering that BWP may be for power saving, even the nested configuration may be very versatile for different applications.

In an example embodiment, for the case where the BWP configurations are non-overlapping in frequency, there may not be spec mandate for UE to monitor RMSI and broadcast OSI in the CSS. It may be left to implementation to handle this case.

In an example embodiment, NR may support group-common search space (GCSS). For example, the GCSS may be employed as an alternative to CSS for certain information. In an example, gNB may configure GCSS within a BWP for a UE, and information such as RACH response and paging control may be transmitted on GCSS. For example, the UE may monitor GCSS instead of switching to the BWP containing the CSS for such information.

In an example embodiment, for pre-emption indication and other group-based commands on a serving cell, gNB may transmit the information on GCSS. UE may monitor the GCSS for the information. For example, for SCell which may not have CSS.

In an example embodiment, NR may configure a CORESET without using a BWP. For example, NR support to configure a CORESET based on a BWP to reduce signaling overhead. In an example, a first CORESET for a UE during an initial access may be configured based on its default BWP. In an example, a CORESET for monitoring PDCCH for RAR and paging may be configured based on a DL BWP. In an example, the CORESET for monitoring group common (GC)-PDCCH for SFI may be configured based on a DL BWP. In an example, the CORESET for monitoring GC-DCI for pre-emption indication may be configured based on a DL BWP. In an example, the BWP index may be indicated in the CORESET configuration. In an example, the default BWP index may not be indicated in the CORESET configuration.

In an example embodiment, the contention-based random access (CBRA) RACH procedure may be supported via an initial active DL and UL BWPs since the UE identity is unknown to the gNB. In an example, the contention-free random access (CFRA) RACH procedure may be supported via the USS configured in an active DL BWP for the UE. For example, in this case, an additional CSS for RACH purpose may not need to be configured per BWP. For example, idle mode paging may be supported via an initial active DL BWP and the connected mode paging may be supported via a default BWP. No additional configurations for the BWP for paging purposes may not be needed for paging. For the case of pre-emption, a configured BWP (on a serving cell) may have the CSS configured for monitoring the pre-emption indications.

In an example embodiment, for a configured DL BWP, a group-common search space may be associated with at least one CORESET configured for the same DL BWP. For example, depending on the monitoring periodicity of different group-common control information types, it may not be practical for the UE to autonomously switch to a default BWP where a group-common search space is available to monitor for such DCI. In this case, if there is at least one CORESET configured on a DL BWP, it may be possible to configure a group-common search space in the same CORESET.

In an example embodiment, a center frequency of the activated DL BWP may not be changed. In an example, the center frequency of the activated DL BWP may be changed. For example, For TDD, if the center frequency of the activated DL BWP and deactivated DL BWP is not aligned, the active UL BWP may be switched implicitly.

In an example embodiment, BWPs with different numerologies may be overlapped, and rate matching for CSI-RS/SRS of another BWP in the overlapped region may be employed to achieve dynamic resource allocation of different numerologies in FDM/TDM fashion. In an example, for the CSI measurement within one BWP, if the CSI-RS/SRS is collided with data/RS in another BWP, the collision region in another BWP may be rate matched. For example, CSI information over the two BWPs may be known at a gNB side by UE reporting. Dynamic resource allocation with different numerologies in a FDM manner may be achieved by gNB scheduling.

In an example embodiment, PUCCH resources may be configured in a configured UL BWP, in a default UL BWP and/or in both. For instance, if the PUCCH resources are configured in the default UL BWP, UE may retune to the default UL BWP for transmitting an SR. for example, the PUCCH resources are configured per BWP or a BWP other than the default BWP, the UE may transmit an SR in the current active BWP without retuning.

In an example embodiment, if a configured SCell is activated for a UE, a DL BWP may be associated with an UL BWP at least for the purpose of PUCCH transmission, and a default DL BWP may be activated. If the UE is configured for UL transmission in same serving cell, a default UL BWP may be activated.

In an example embodiment, at least one of configured DL BWPs comprises one CORESET with common search space (CSS) at least in primary component carrier. The CSS may be needed at least for RACH response (msg2) and pre-emption indication.

In an example, for the case of no periodic gap for RACH response monitoring on Pcell, for Pcell, one of configured DL bandwidth parts may comprise one CORESET with the CSS type for RMSI & OSI. For Pcell, a configured DL bandwidth part may comprise one CORESET with the CSS type for RACH response & paging control for system information update. For a serving cell, a configured DL bandwidth part may comprise one CORESET with the CSS type for pre-emption indication and other group-based commands.

In an example, for the case of a presence of periodic gap for RACH response monitoring on Pcell, for Pcell, one of configured DL bandwidth parts may comprise one CORESET with CSS type for RMSI, OSI, RACH response & paging control for system information update. For a serving cell, a configured DL bandwidth part may comprise one CORESET with the CSS type for pre-emption indication and other group-based commands.

In an example embodiment, BWPs may be configured with respect to common reference point (PRB 0) on a NW carrier. In an example, the BWPs may be configured using TYPE1 RA as a set of contiguous PRBs, with PRB granularity for the START and LENGTH, and the minimum length may be determined by the minimum supported size of a CORESET.

In an example embodiment, a CSS may be configured on a non-initial BWP for RAR and paging.

In an example embodiment, to monitor (group) common channel for RRC CONNECTED UE, an initial DL BWP may comprise control channel for RMSI, OSI and paging and UE switches BWP to monitor such channel. In an example, a configured DL BWP may comprise control channel for Msg2. In an example, a configured DL BWP may comprise control channel for SFI. In an example, a configured DL BWP may comprise pre-emption indication and other group common indicators like power control.

In an example embodiment, a DCI may explicitly indicate activation/deactivation of BWP.

For example, a DCI without data assignment may comprise an indication to activate/deactivate BWP. In an example, UE may receive a first indication via a first DCI to activate/deactivate BWP. In order for the UE to start receiving data, a second DCI with a data assignment may be transmitted by the gNB. A UE may receive the first DCI in a target CORESET in a target BWP. In an example, until there is CSI feedback provided to a gNB, the gNB scheduler may make conservative scheduling decisions.

In an example, a DCI without scheduling for active BWP switching may be transmitted to measure the CSI before scheduling. It may be taken as an implementation issue of DCI with scheduling, for example, the resource allocation field may be set to zero, which means no data may be scheduled. Other fields in this DCI may comprise one or more CSI/SRS request fields.

In an example embodiment, support for a single scheduling DCI to trigger active BWP switching may be motivated by dynamic BWP adaptation for UE power saving during active state (which may comprise ON duration and when inactivity timer is running when C-DRX is configured). For example, with a C-DRX enabled, a UE may consume significant amount of power monitoring PDCCH without decoding any grant. To reduce the power consumption during PDCCH monitoring, two BWPs may be configured: a narrower BWP for PDCCH monitoring, and a wider BWP for scheduled data. In such a case, the UE may switch back-and-forth between the narrower BWP and the wider BWP, depending on the burstiness of the traffic. For example, the UE may be revisiting a BWP that it has dwelled on previously. For this case, combining a BWP switching indication and a scheduling grant may result in low latency and reduced signalling overhead for BWP switching.

In an example embodiment, a SCell activation and deactivation may trigger the corresponding action for its configured BWP. In an example, a SCell activation and deactivation may not trigger the corresponding action for its configured BWP.

In an example embodiment, a dedicated BWP activation/deactivation DCI may impact a DCI format. For example, a scheduling DCI with a dummy grant may be employed. the dummy grant may be constructed by invalidating one or some of the fields, for example, the resource allocation field. In an example, it may be feasible to leverage a fallback scheduling DCI format (which contains a smaller payload) to improve the robustness for BWP DCI signalling, without incurring extra work on introducing a new DCI format.

In an example embodiment, a DCI with data assignment may comprise an indication to activate/deactivate BWP along with a data assignment. For example, a UE may receive a combined data allocation and BWP activation/deactivation message. For example, a DCI format may comprise a field to indicate BWP activation/deactivation along with a field indicating UL/DL grant. In this case, the UE may start receiving data with a single DCI. In this case, the DCI may need indicate one or more target resources of a target BWP. A gNB scheduler may have little knowledge of the CSI in the target BW and may have to make conservative scheduling decisions.

In an example embodiment, for the DCI with data assignment, the DCI may be transmitted on a current active BWP and scheduling information may be for a new BWP. For example, there may be a single active BWP. There may be one DCI in a slot for scheduling the current BWP or scheduling another BWP. The same CORESET may be employed for the DCI scheduling the current BWP and the DCI scheduling another BWP. For example, to reduce the number of blind decoding, the DCI payload size for the DCI scheduling current BWP and the scheduling DCI for BWP switching may be the same.

In an example embodiment, to support the scheduling DCI for BWP switching, a BWP group may be configured by gNB, in which a numerology in one group may be the same. In an example, the BWP switching for the BWP group may be configured, in which BIF may be present in the CORESETs for one or more BWPs in the group. For example, scheduling DCI for BWP switching may be configured per BWP group, in which an active BWP in the group may be switched to any other BWP in the group.

In an example, embodiment, a DCI comprising scheduling assignment/grant may not comprise active-BWP indicator. For a paired spectrum, a scheduling DCI may switch UEs active BWP for the transmission direction that the scheduling is valid for. For an unpaired spectrum, a scheduling DCI may switch the UEs active DL/UL BWP pair regardless of the transmission direction that the scheduling is valid for. There may be a possibility for downlink scheduling assignment/grant with "zero" assignment, in practice allowing for switch of active BWP without scheduling downlink or uplink transmission In an example embodiment, a timer-based activation/deactivation BWP may be supported. For example, a timer for activation/deactivation of DL BWP may reduce signaling overhead and may enable UE power savings. The activation/deactivation of a DL BWP may be based on an inactivity timer (referred to as a BWP inactive (or inactivity) timer). For example, a UE may start and reset a timer upon reception of a DCI. When the UE is not scheduled for the duration of the timer, the timer may expire. In this case, the UE may activate/deactivate the appropriate BWP in response to the expiry of the timer. For example, the UE may activate for example the Default BWP and may deactivate the source BWP.

For example, a BWP inactivity timer may be beneficial for power saving for a UE switching to a default BWP with smaller BW and fallback for a UE missing DCI based activation/deactivation signaling to switch from one BWP to another BWP.

In an example embodiment, triggering conditions of the BWP inactivity timer may follow the ones for the DRX timer in LTE. For example, an On-duration of the BWP inactivity timer may be configured and the timer may start when a UE-specific PDCCH is successfully decoded indicating a new transmission during the On-duration. The timer may restart when a UE-specific PDCCH is successfully decoded indicating a new transmission. The timer may stop once the UE is scheduled to switch to the default DL BWP.

In an example embodiment, for fallback, the BWP inactivity timer may start once the UE switches to a new DL BWP. The timer may restart when a UE-specific PDCCH is successfully decoded, wherein the UE-specific PDCCH may be associated with a new transmission, a retransmission or some other purpose, e.g., SPS activation/deactivation if supported.

In an example embodiment, a UE may switch to a default BWP if the UE does not receive any control/data from the network during a BWP inactivity timer running. The timer may be reset upon reception of any control/data. For example, the timer may be triggered when UE receives a DCI to switch its active DL BWP from the default BWP to another. For example, the timer may be reset when a UE receives a DCI to schedule PDSCH(s) in the BWP other than the default BWP.

In an example embodiment, a BWP inactivity-timer may enable the fall-back to default BWP on Pcell and Scell.

In an example embodiment, a timer-based activation/deactivation of BWP may be similar to a UE DRX timer. For example, there may not be a separate inactivity timer for BWP activation/deactivation for the UE DRX timer. For example, one of the UE DRX inactivity timer may trigger BWP activation/deactivation.

For example, there may be a separate BWP inactivity timer from the UE DRX timer. For example, the DRX timers may be defined in a MAC layer, and the BWP inactivity timer may be defined in a physical layer. In an example, If the same DRX inactivity timer is employed for BWP activation/deactivation, UE may stay in a wider BWP for as long as the inactivity timer is running, which may be a long time. For example, the DRX inactivity timer may be set to a large value of 100-200 milliseconds for C-DRX cycle of 320 milliseconds, larger than the ON duration (10 milliseconds). This may imply that power saving due to narrower BWP may not be achievable. To realize potential of UE power saving promised by BWP switching, a new timer may be defined, and it may be configured to be smaller than the DRX inactivity timer. From the point of view of DRX operation, BWP switching may allow UE to operate at different power levels during the active state, effectively providing some more intermediate operating points between the ON and OFF states.

In an example embodiment, with a DCI explicit activation/deactivation of BWP, a UE and a gNB may not be synchronized with respect to which BWP is activated/deactivated. The gNB scheduler may not have CSI information related to a target BWP for channel-sensitive scheduling. The gNB may be limited to conservative scheduling for one or more first several scheduling occasions. The gNB may rely on periodic or aperiodic CSI-RS and associated CQI report to perform channel-sensitive scheduling. Relying on periodic or aperiodic CSI-RS and associated CQI report may delay channel-sensitive scheduling and/or lead to signaling overhead (e.g. in the case where we request aperiodic CQI). To mitigate a delay in acquiring synchronization and channel state information, a UE may transmit an acknowledgement upon receiving an activation/deactivation of BWP. For example, a CSI report based on the provided CSI-RS resource may be transmitted after activation of a BWP and is employed as acknowledgment of activation/deactivation.

In an example embodiment, a gNB may provide a sounding reference signal for a target BWP after a UE tunes to a new bandwidth. In an example, the UE may report the CSI, which is employed as an acknowledgement by the gNB to confirm that the UE receive an explicit DCI command and activates/deactivates the appropriate BWPs. In an example, for the case of an explicit activation/deactivation via DCI with data assignment, a first data assignment may be carried out without a CSI for the target BWP In an example embodiment, a guard period may be defined to take RF retuning and the related operations into account. For example, a UE may neither transmit nor receive signals in the guard period. A gNB may need to know the length of the guard period. For example, the length of the guard period may be reported to the gNB as a UE capability. The length of the guard period may be closely related on the numerologies of the BWPs and the length of the slot. For example, the length of the guard period for RF retuning may be reported as a UE capability. In an example, the UE may report the absolute time in μs. in an example, the UE may report the guard period in symbols.

In an example embodiment, after the gNB knows the length of the guard period by UE reporting, the gNB may want to keep the time domain position of guard period aligned between the gNB and the UE. For example, the guard period for RF retuning may be predefined for time pattern triggered BWP switching. In an example, for the BWP switching triggered by DCI and timer, the guard period for DCI and timer based BWP switching may be an implementation issue. In an example, for BWP switching following some time pattern, the position of the guard period may be defined. For example, if the UE is configured to switch periodically to a default BWP for CSS monitoring, the guard period may not affect the symbols carrying CSS.

In an example embodiment, a single DCI may switch the UE's active BWP form one to another (of the same link direction) within a given serving cell. A separate field may be employed in the scheduling DCI to indicate the index of the BWP for activation, such that UE may determine the current DL/UL BWP according to a detected DL/UL grant without requiring any other control information. In case the BWP change does not happen during a certain time duration, the multiple scheduling DCIs transmitted in this duration may comprise the indication to the same BWP. During the transit time when potential ambiguity may happen, gNB may send scheduling grants in the current BWP or together in the other BWPs containing the same target BWP index, such that UE may obtain the target BWP index by detecting the scheduling DCI in either one of the BWPs. The duplicated scheduling DCI may be transmitted K times. When UE receive one of the K times transmissions, UE may switch to the target BWP and start to receive or transmit (UL) in the target BWP according to the BWP indication field.

In an example embodiment, switching between BWPs may not introduce large time gaps when UE may not be able to receive due to re-tuning, neither after detecting short inactivity (Case 1) or when data activity is reactivated (Case 2). For example, in Case 2, long breaks of several slots may severely impact the TCP ramp up as UE may not be able to transmit and receive during those slots, impacting obtained RTT and data rate. Case 1 may be seen less problematic at first glance but similarly long break in reception may make UE out of reach from network point of view reducing network interest to utilize short inactivity timer.

In an example, if BWP switching takes significant time, and UE requires new reference symbols to update AGC, channel estimation etc., the system may have less possibilities/motivation to utilize active BWP adaption in the UE. This may be achieved by preferring configuration where BWP center frequency remains the same when switching between BWPs.

In an example embodiment, a frequency location of UE RF bandwidth may be indicated by gNB. For example, considering the UE RF bandwidth capability, the RF bandwidth of the UE may be usually smaller than the carrier bandwidth. The supported RF bandwidth for a UE is usually a set of discrete values (e.g., 10 MHz, 20 MHz, 50 MHz and so on), for energy saving purpose, the UE RF bandwidth may be determined as the minimum available bandwidth supporting the BWP bandwidth. But the granularity of BWP bandwidth is PRB level, which is decoupled with UE RF bandwidth and more flexible. As a result, in most cases the UE RF bandwidth is larger than the BWP bandwidth. The UE may receive the signal outside the carrier bandwidth, especially if the configured BWP is configured near the edge of the carrier bandwidth, as shown in FIG. 4(a). And the inter-system interference or the interference from the adjacent cell outside the carrier bandwidth may impact the receiving performance of the BWP. Thus, to keep the UE RF bandwidth in the carrier bandwidth as shown in FIG. 4(b), it is necessary to indicate the frequency location of the UE RF bandwidth by gNB.

In an example embodiment, in terms of measurement gap configuration, the gap duration may be determined based on the measurement duration and necessary retuning gap. For example, different retuning gap may be needed depending on the cases. For example, if a UE does not need to switch its center, the retuning may be small such as 20 us. For the case that the network may not know whether the UE needs to switch its center or not to perform measurement, a UE may indicate the necessary retuning gap for a measurement configuration.

In an example embodiment, the necessary gap may depend on the current active BWP which may be dynamically switched via switching mechanism. In this case, for example, UEs may need to dynamically indicate the necessary gap.

In an example embodiment, the measurement gap may be implicitly created, wherein the network may configure a certain gap (which may comprise the smallest retuning latency, for example, the network may assume small retuning gap is necessary if both measurement bandwidth and active BWP may be included within UE maximum RF capability assuming center frequency of current active BWP is not changed). In this case, for example, if a UE needs more gap than the configured, the UE may skip receiving or transmitting.

In an example embodiment, different measurement gap and retuning latency may be assumed for RRM and CSI respectively. For CSI measurement, if periodic CSI measurement outside of active BWP is configured, a UE may need to perform its measurement periodically per measurement configuration. For RRM, it may be up to UE implementation where to perform the measurement as long as it satisfies the measurement requirements. In this case, for example, the worst-case retuning latency for a measurement may be employed. In an example, as the retuning latency may be different between intra-band and inter-band retuning, separate measurement gap configuration between intra-band and inter-band measurement may be considered.

In an example embodiment, for multiple DCI formats with the same DCI size of a same RNTI, a respective DCI format may comprise an explicit identifier to distinguish them. For example, a same DCI size may come from a few (but not a large number of) zero-padding bits at least in UE-specific search space.

In an example embodiment, when there is a BWP switching, a DCI in the current BWP may need to indicate resource allocation in the next BWP that the UE is expected to switch. For example, the resource allocation may be based on the UE-specific PRB indexing, which may be per BWP. A range of the PRB indices may change as the BWP changes. In an example, the DCI to be transmitted in current BWP may be based on the PRB indexing for the current BWP. The DCI may need to indicate the RA in the new BWP, which may arouse a conflict. To resolve the conflict without significantly increasing UEs blind detection overhead, the DCI size and fields may not change per BWP for a given DCI type.

In an example embodiment, as the range of the PRB indices may change as the BWP changes, one or more employed bits among the total field for RA may be dependent on the employed BWP. For example, UE may employ the indicated BWP ID that the resource allocation is intended to identify the resource allocation field.

In an example embodiment, a DCI size of the BWP may consider two cases. One case may be a normal DCI detection without BWP retuning, and the other case may be a DCI detection during the BWP retuning.

For example, in some cases, a DCI format may be independent of the BW of the active DL/UL BWP (which may be called as fallback DCI). In an example, at least one of DCI formats for DL may be configured to have the same size to a UE for one or more configured DL BWPs of a serving cell. In an example, at least one of the DCI formats for UL may be configured to have the same size to a UE for one or more configured UL BWPs of a serving cell. In an example embodiment, a BWP-dependent DCI format may be monitored at the same time (which may be called as normal DCI) for both active DL BWP and active UL BWP. For example, UE may be configured to monitor both DCI formats at the same time. During the BWP activation/deactivation, gNB may assign the fallback DCI format to avoid ambiguity during the transition period.

In an example embodiment, if a UE is configured with multiple DL or UL BWPs in a serving cell, an inactive DL/UL BWP may be activated by a DCI scheduling a DL assignment or UL grant respectively in this BWP. As the UE is monitoring the PDCCH on the currently active DL BWP, the DCI may comprise an indication to a target BWP that the UE may switch to for PDSCH reception or UL transmission. A BWP indication may be inserted in the UE-specific DCI format for this purpose. The bit width of this field may depend on either the maximum possible or presently configured number of DL/UL BWPs. Similar to CIF, it may be simpler to set the BWP indication field to a fixed size based on the maximum number of configured BWPs.

In an example, a DCI format size may match the BW of the BWP in which the PDCCH is received. To avoid an increase in the number of blind decodes, the UE may identify the RA field based on the scheduled BWP. For example, for a transition from a small BWP to a larger BWP, the UE may identify the RA field as being the LSBs of the required RA field for scheduling the larger BWP.

In an example embodiment, a same DCI size for scheduling different BWPs may be defied by keeping a same size of resource allocation field for one or more configured BWPs. For example, gNB may not be aware of whether UE switches BWPs if gNB does not receive at least one response from the UE (e.g., gNB may be aware of if UE switches BWPs based on a reception of ACK/NACK from the UE). In an example, to avoid such a mismatch between gNB and UE, NR may define fallback mechanism. For example, if there is no response from the UE, gNB may transmit the scheduling DCI for previous BWPs and that for newly activated BWP since the UE may receive the DCI on either BWP. When the gNB receives a response from the UE, the gNB may confirm that the active BWP switching is completed. In an example, if a same DCI size for scheduling different BWPs is considered and COREST configuration is also the same for different BWPs, gNB may not transmit multiple DCIs.

In an example embodiment, DCI format(s) may be configured user-specifically per cell, e.g., not per BWP. For example, after the UE syncs to the new BWP, the UE may start to monitor pre-configured search-space on the CORESET. If the DCI formats may be configured per cell to keep the number of DCI formats, the corresponding header size in DCI may be small.

In an example embodiment, a size of DCI format in different BWPs may vary and may change at least due to different size of RA bitmap on different BWPs. For example, the size of DCI format configured in a cell for a UE may be dependent on BWP it schedules.

In an example embodiment, the monitored DCI format size on a search-space of a CORESET may be configurable with the sufficiently fine granularity (the granularity may be predefined). For example, the monitored DCI format size with sufficient granularity may be beneficial when a gNB may have the possibility to set freely the monitoring DCI format size on a search-spaces of a CORESET, such that it may accommodate the largest actual DCI format size variant among one or more BWPs configured in a serving cell.

In an example embodiment, for a UE-specific serving cell, one or more DL BWPs and one or more UL BWPs may be configured by dedicated RRC for a UE. For the case of PCell, this may be done as part of the RRC connection establishment procedure. For the SCell, this may be done via RRC configuration which may indicate the SCell parameters.

In an example embodiment, when a UE receives SCell activation command, there may be a default DL and/or UL BWP which may be activated since there may be at least one DL and/or UL BWP which may be monitored by the UE depending on the properties of the SCell (DL only or UL only or both). This BWP which may be activated upon receiving SCell activation command, may be informed to the UE via the a RRC configuration which configured the BWP on this serving cell.

For example, for SCell, RRC signalling for SCell configuration/reconfiguration may be employed to indicate which DL BWP and/or which UL BWP may be activated when the SCell activation command is received by the UE. The indicated BWP may be the initially active DL/UL BWP on the SCell. Therefore, SCell activation command may activate DL and/or UL BWP.

In an example embodiment, for a SCell, RRC signaling for the SCell configuration/reconfiguration may be employed for indicating a default DL BWP on the SCell which may be employed for fall back purposes. For example, the default DL BWP may be same or different from the initially activated DL/UL BWP which is indicated to UE as part of the SCell configuration. In an example, a default UL BWP may be configured to UE for the case of transmitting PUCCH for SR (as an example), in case the PUCCH resources are not configured in every BWP for the sake of SR.

In an example, a Scell may be for DL only. For the Scell for DL only, UE may keep monitoring an initial DL BWP (initial active or default) until UE receives SCell deactivation command.

In an example, a Scell may be for UL only. For the Scell for UL only, when UE receives a grant, UE may transmit on the indicated UL BWP. In an example, the UE may not maintain an active UL BWP if UE does not receive a grant.

In an example, not mainlining the active UL BWP due to no grant receive may not deactivate the SCell.

In an example, a Scell may be for UL and DL. For the Scell for UL and DL, a UE may keep monitoring an initial DL BWP (initial active or default) until UE receives SCell deactivation command and. The UL BWP may be employed when there is a relevant grant or an SR transmission.

In an example, a BWP deactivation may not result in a SCell deactivation. For example, when the UE receives the SCell deactivation command, the active DL and/or UL BWPs may be considered deactivated.

In an example embodiment, if the SCell has its associated UL and/or a UE is expected to perform RACH procedure on SCell during activation, activation of UL BWP may be needed. For example, at SCell activation, DL only (only active DL BWP) or DL/UL (both DL/UL active BWP) may be configured. Regarding SUL band as a SCell, a UE may select default UL BWP based on measurement or the network configures which one in its activation.

In an example embodiment, one or more BWPs are semi-statically configured via UE-specific RRC signaling. In a CA system, if a UE maintains RRC connection with the primary component carrier (CC), the BWP in secondary CC may be configured via RRC signaling in the primary CC.

In an example embodiment, one or more BWPs may be semi-statically configured to a UE via RRC signaling in PCell. A DCI transmitted in SCell may indicate a BWP among the one or more configured BWP, and grant detailed resource based on the indicated BWP.

In an example embodiment, for a cross-CC scheduling, a DCI transmitted in PCell may indicate a BWP among the one or more configured BWPs, and grants detailed resource based on the indicated BWP.

In an example embodiment, when a SCell is activated, a DL BWP may be initially activated for configuring CORESET for monitoring the first PDCCH in Scell. The DL BWP may serve as a default DL BWP in the SCell. In an example, since the UE performs initial access via a SS block in PCell, the default DL BWP in SCell may not be derived from SS block for initial access. The default DL BWP in Scell may be configured by RRC signaling in the PCell.

In an example embodiment, when an Scell is activated, an indication indicating which DL BWP and/or which UL BWP are active may be in RRC signalling for Scell configuration/reconfiguration. For example, the RRC signalling for Scell configuration/reconfiguration may be employed for indicating which DL BWP and/or which UL BWP are initially activated when the Scell is activated.

In an example embodiment, when an Scell is activated, an indication indicating which DL BWP and/or which UL BWP are active may be in Scell activation signaling. For example, Scell activation signaling may be employed for indicating which DL BWP and/or which UL BWP are initially activated when the Scell is activated.

In an example embodiment, for PCells and pSCells, an initial default bandwidth parts for DL and UL (e.g., for RMSI reception and PRACH transmission) may be valid until at least one bandwidth part is configured for the DL and UL via RRC UE-specific signaling, respectively, at what time the initial default DL/UL bandwidth parts may become invalid and new default DL/UL bandwidth parts may take effect. In an example, for an Scell, the SCell configuration may comprise default DL/UL bandwidth parts In an example embodiment, an initial BWP on Pcell may be defined by MIB. In an example, an initial BWP and default BWP may be separately configurable for the Scell. For an Scell if the Scell is activated, an initial BWP may be the widest configured BWP of the Scell. For example, after the traffic burst is served, and an inactivity timer expires, a UE may retune to default BWP which may be the narrow BWP, for power savings, keeping the Scell active and may be ready to be opened briskly when additional data burst arrives.

In an example embodiment, a BWP on Scell may be activated by means of cross-cell scheduling DCI, if cross-cell scheduling is configured to a UE. In this case, the gNB may activate a BWP on the Scell by indicating CIF and BWPI in the scheduling DCI.

In an example embodiment, UE and/or gNB may perform synchronization tracking within an active DL BWP without SS block. For example, TRS along with DL BWP configuration may be configured. For example, a DL BWP with SS block or TRS may be configured as a reference for synchronization tracking, which may be similar to the design of CSS monitoring when the BWP does not comprise a common CORESET.

In an example embodiment, SS-block based RRM measurements may be decoupled with BWP framework. For example, measurement configurations for each RRM and CSI feedback may be independently configured from bandwidth part configurations. CSI and SRS measurements/transmissions may be performed within the BWP framework.

In an example embodiment, for a MCS assignment of the first one or more DL data packets after active DL BWP switching, the network may assign robust MCS to a UE for the first one or more DL data packets based on RRM measurement reporting. In an example, for a MCS assignment of the first one or more DL data packets after active DL BWP switching, the network may signal to a UE by active DL BWP switching DCI to trigger aperiodic CSI measurement/reporting to speed up link adaptation convergence. For a UE, periodic CSI measurement outside the active BWP in a serving cell may not supported. For a UE, RRM measurement outside active BWP in a serving cell may be supported. For a UE, RRM measurement outside configured BWPs in a serving cell may be supported.

In an example embodiment, the RRM measurements may be performed on a SSB and/or CSI-RS. The RRM/RLM measurements may be independent of BWPs.

In an example embodiment, UE may not be configured with aperiodic CSI reports for non-active DL BWPs. For example, the CSI measurement may be obtained after the BW opening and the wide-band CQI of the previous BWP may be employed as starting point for the other BWP on the NW carrier.

In an example embodiment, UE may perform CSI measurements on the BWP before scheduling. For example, before scheduling on a new BWP, the gNB may intend to find the channel quality on the potential new BWPs before scheduling the user on that BWP. In this case, the UE may switch to a different BWP and measure channel quality on the BWP and then transmit the CSI report. There may be no scheduling needed for this case.

In an example embodiment, resource allocation for data transmission for a wireless device not capable of supporting the carrier bandwidth may be derived based on a two-step frequency-domain assignment process. In an example, a first step may indicate a bandwidth part, and a second step may indicate one or more PRBs within the bandwidth part.

In an example embodiment, One or multiple bandwidth part configurations for each component carrier may be semi-statically signaled to a wireless device. A bandwidth part may comprise a group of contiguous PRBs, wherein one or more reserved resources maybe be configured within the bandwidth part. The bandwidth of a bandwidth part may be equal to or be smaller than the maximal bandwidth capability supported by a wireless device. The bandwidth of a bandwidth part may be at least as large as the SS block bandwidth. The bandwidth part may or may not contain the SS block. A Configuration of a bandwidth part may comprise at least one of following properties: Numerology, Frequency location (e.g. center frequency), or Bandwidth (e.g. number of PRBs).

In an example embodiment, a bandwidth part may be associated with one or more numerologies, wherein the one or more numerologies may comprise sub-carrier spacing, CP type, or slot duration indication. In an example, an wireless device may expect at least one DL bandwidth part and at least one UL bandwidth part being active among a set of configured bandwidth parts for a given time instant. A wireless device may be assumed to receive/transmit within active DL/UL bandwidth part(s) using the associated numerology, for example, at least PDSCH and/or PDCCH for DL and PUCCH and/or PUSCH for UL, or combination thereof.

In an example, multiple bandwidth parts with same or different numerologies may be active for a wireless device simultaneously. The active multiple bandwidth parts may not imply that it is required for wireless device to support different numerologies at the same instance. The active DL/UL bandwidth part may not span a frequency range larger than the DL/UL bandwidth capability of the wireless device in a component carrier.

In an example embodiment, NR may support single and multiple SS block transmissions in wideband CC in the frequency domain. For example, for non-CA wireless device with a smaller BW capability and potentially for CA wireless device, NR may support a measurement gap for RRM measurement and potentially other purposes (e.g., path loss measurement for UL power control) using SS block (if it is agreed that there is no SS block in the active BW part(s)). wireless device may be informed of the presence/parameters of the SS block(s) and parameters necessary for RRM measurement via at least one of following: RMSI, other system information, and/or RRC signaling In an example embodiment, a maximum bandwidth for CORESET for RMSI scheduling and NR-PDSCH carrying RMSI may be equal to or smaller than a certain DL bandwidth of NR that one or more wireless devices may support in a frequency range. For example, at least for one RACH preamble format, the bandwidth may be equal to or smaller than a certain UL bandwidth of NR that one or more wireless devices may support in a frequency range. There may be other RACH preamble format with larger bandwidth than a certain bandwidth of NR that one or more wireless devices may support.

In an example embodiment, CORESET for RMSI scheduling and NR-PDSCH for RMSI may be confined within the BW of one NR-PBCH. In an example, CORESET for RMSI scheduling is confined within the BW of one NR-PBCH and NR-PDSCH for RMSI may not be confined within the BW of one NR-PBCH. In an example, CORESET for RMSI scheduling and NR-PDSCH for RMSI may not be confined within the BW of one NR-PBCH.

In an example embodiment, there may be one active DL BWP for a given time instant. For example, a configuration of a DL bandwidth part may comprise at least one CORESET. PDSCH and corresponding PDCCH (PDCCH carrying scheduling assignment for the PDSCH) may be transmitted within the same BWP if PDSCH transmission starts no later than K symbols after the end of the PDCCH transmission. In case of PDSCH transmission starting more than K symbols after the end of the corresponding PDCCH, PDCCH and PDSCH may be transmitted in different BWPs. The value of K may depend on at least one of following numerology or possibly reported wireless device retuning time. In an example, for the indication of active DL/UL bandwidth part(s) to a wireless device, DCI (explicitly and/or implicitly), MAC CE, Time pattern (e.g. DRX like) and/or combinations thereof may be considered.

In an example embodiment, NR may support switching between partial bands for SRS transmissions in a CC. For example, when an wireless device is not capable of simultaneous transmission in partial bands in a CC, RF retuning requirement for partial band switching may be considered, wherein the partial band may indicate a bandwidth part.

In an example embodiment, Common PRB indexing may be employed at least for DL BWP configuration in RRC connected state. For example, a reference point may be PRB 0, which may be common to one or more wireless devices sharing a wideband CC from network perspective, regardless of whether they are NB, CA, or WB wireless devices. In an example, an offset from PRB 0 to the lowest PRB of the SS block accessed by a wireless device may be configured by high layer signaling, e.g., via RMSI and/or wireless device-specific signaling. In an example, a common PRB indexing may be for maximum number of PRBs for a given numerology, wherein the common PRB indexing may be for RS generation for wireless device-specific PDSCH and/or may be for UL.

In an example embodiment, there may be an initial active DL/UL bandwidth part pair to be valid for a wireless device until the wireless device is explicitly (re)configured with bandwidth part(s) during or after RRC connection is established. For example, the initial active DL/UL bandwidth part may be confined within the wireless device minimum bandwidth for the given frequency band. NR may support activation/deactivation of DL and UL bandwidth part by explicit indication at least in DCI. MAC CE based approach may be employed for the activation/deactivation of DL and UL bandwidth part. In an example, NR may support an activation/deactivation of DL bandwidth part by means of timer for a wireless device to switch its active DL bandwidth part to a default DL bandwidth part. For example, a default DL bandwidth part may be the initial active DL bandwidth part defined above. The default DL bandwidth part may be reconfigured by the network.

In an example embodiment, when a wireless device performs measurement or transmit SRS outside of its active BWP, it may be considered as a measurement gap. For example, during the measurement gap, wireless device may not monitor CORESET.

In an example embodiment, a SRS transmission in an active UL BWP may employ the same numerology as that configured for that BWP. For example, for LTE SRS sequences, NR may support wireless device specific configured bandwidth based on tree-like SRS bandwidth sets (e.g., analogues to LTE). Parameters employed for configuring bandwidth allocation, e.g. whether or not CSRS and BSRS may be reused in a wireless device specific manner. For example, for LTE SRS sequences, NR may support to sound substantially all UL PRBs in a BWP.

In an example embodiment, a frequency-hopping for a PUCCH may occur within an active UL BWP for the wireless device, wherein there may be multiple active BWPs, and the active BWP may refer to BWP associated with the numerology of PUCCH In an example embodiment, for paired spectrum, base station may configure DL and UL BWPs separately and independently for a wireless device-specific serving cell for a wireless device. For example, for active BWP switching using at least scheduling DCI, a DCI for DL may be employed for DL active BWP switching and a DCI for UL may be employed for UL active BWP switching. For example, NR may support a single DCI switching DL and UL BWP jointly.

In an example, embodiment, for unpaired spectrum, base station may jointly configure a DL BWP and an UL BWP as a pair, with the restriction that the DL and UL BWPs of a DL/UL BWP pair may share the same center frequency but may be of different bandwidths for a wireless device-specific serving cell for a wireless device. For example, for active BWP switching using at least scheduling DCI, a DCI for either DL or UL may be employed for active BWP switching from one DL/UL BWP pair to another pair. This may apply to at least the case where both DL & UL are activated to a wireless device in the corresponding unpaired spectrum. In an example, there may not be a restriction on DL BWP and UL BWP pairing.

In an example embodiment, for a wireless device, a configured DL (or UL) BWP may overlap in frequency domain with another configured DL (or UL) BWP in a serving cell.

In an example embodiment, for a serving cell, a maximal number of DL/UL BWP configurations may be for paired spectrum, for example, 4 DL BWPs and 4 UL BWPs. In an example, a maximal number of DL/UL BWP configurations may be for unpaired spectrum, for example, 4 DL/UL BWP pairs. In an example, a maximal number of DL/UL BWP configurations may be for SUL, for example, 4 UL BWPs.

In an example embodiment, for paired spectrum, NR may support a dedicated timer for timer-based active DL BWP switching to the default DL BWP. For example, a wireless device may start the timer when it switches its active DL BWP to a DL BWP other than the default DL BWP. In an example, a wireless device may restart the timer to the initial value when it successfully decodes a DCI to schedule PDSCH(s) in its active DL BWP. For example, a wireless device may switch its active DL BWP to the default DL BWP when the timer expires.

In an example embodiment, for unpaired spectrum, NR may support a dedicated timer for timer-based active DL/UL BWP pair switching to the default DL/UL BWP pair. For example, a wireless device may start the timer when it switches its active DL/UL BWP pair to a DL/UL BWP pair other than the default DL/UL BWP pair. For example, a wireless device may restart the timer to the initial value when it successfully decodes a DCI to schedule PDSCH(s) in its active DL/UL BWP pair. In an example, a wireless device may switch its active DL/UL BWP pair to the default DL/UL BWP pair when the timer expires.

In an example embodiment, for an Scell, RRC signaling for Scell configuration/reconfiguration may indicate a first active DL BWP and/or a first active UL BWP when the Scell is activated. In an example, NR may support a Scell activation signaling that doesn't contain any information related to the first active DL/UL BWP. In an example, for an Scell, an active DL BWP and/or UL BWP may be deactivated when the Scell is deactivated. In an example, the Scell may be deactivated by an Scell deactivation timer.

In an example embodiment, for an Scell, a wireless device may be configured with at least one of following: a timer for timer-based active DL BWP (or DL/UL BWP pair) switching, and/or a default DL BWP (or the default DL/UL BWP pair) which may be employed when the timer is expired, wherein the default DL BWP may be different from the first active DL BWP.

In an example, for Pcell, a default DL BWP (or DL/UL BWP pair) may be configured/reconfigured to a wireless device. In an example, if no default DL BWP is configured, the default DL BWP may be an initial active DL BWP.

In an example embodiment, in a serving cell where PUCCH is configured, a configured UL BWP may comprise PUCCH resources.

In an example embodiment, for a wireless device in Pcell, a common search space for at least RACH procedure may be configured in one or more BWPs. For example, for a wireless device in a serving cell, a common search space for group-common PDCCH (e.g. SFI, pre-emption indication, etc.) may be configured in one or more BWPs In an example embodiment, a DL (or UL) BWP may be configured to a wireless device by resource allocation Type 1 with 1 PRB granularity of starting frequency location and 1 PRB granularity of bandwidth size, wherein the granularity may not imply that a wireless device may adapt its RF channel bandwidth accordingly.

In an example embodiment, for a wireless device, DCI format size itself may not be a part of RRC configuration irrespective of BWP activation & deactivation in a serving cell. For example, the DCI format size may depend on different operations and/or configurations (if any) of different information fields in the DCI.

In an example embodiment, an initial active DL BWP may be defined as frequency location and bandwidth of RMSI CORESET and numerology of RMSI, wherein PDSCH delivering RMSI may be confined within the initial active DL BWP.

In an example embodiment, a wireless device may be configured with PRB bundling size(s) per BWP.

In an example embodiment, NR may support configuring CSI-RS resource on BWP with a transmission BW equal to or smaller than the BWP. For example, when the CSI-RS BW is smaller than the BWP, NR may support at least the case that CSI-RS spans contiguous RBs in the granularity of N RBs. When CSI-RS BW is smaller than the corresponding BWP, it may be at least larger than X RBs, wherein value of X is predefined. For example, the value of X may be the same or different for beam management and CSI acquisition. For example, the value of X may or may not be numerology-dependent.

For example, RSs for beam management of an active BWP may comprise CSI-RS, SS Blocks, and/or the like. A base station may transmit to a wireless device one or more RRC messages comprising RS resource configuration parameters indicating one or more CSI report setting for the active BWP. The one or more CSI report setting may comprise one or more RS resources and a report quantity indicator. The report quantity indicator may indicate that report of a reference signal received power (RSRP), pre-coding matrix indicator (PMI), channel quality indicator (CQI), rank indicator (RI), or CSI-RS resource index (CRI) is required. The RSRP may be a layer-1 RSRP report measured based on the one or more CSI-RS resources. A RSRP report may be for beam management. CQI/PMI/RI/CRI report may be for CSI acquisition. The one or more RSRP report may be measured based on the one or more CSI-RS resources of an active BWP. The UE may transmit one or more CQI/PMI/RI/CRI report for the active BWP. The one or more CQI/PMI/RI/CRI report may be based on the one or more CSI-RS resources of the active BWP. The UE may transmit the one or more RSRP report or the one or more CQI/PMI/RI/CRI report based on the report quantity indicator. In an example, when the report quantity indicator indicates RSRP report is required, the UE may transmit the one or more RSRP report. when the report quantity indicator indicates CQI/PMI/RI/CRI report is required, the UE may transmit the one or more CQI/PMI/RI/CRI report.

In an example embodiment, for FDD, base station may configure separate sets of bandwidth part (BWP) configurations for DL & UL per component carrier. In an example, a numerology of DL BWP configuration may be applied to at least PDCCH, PDSCH & corresponding DMRS. A numerology of UL BWP configuration may be applied to at least PUCCH, PUSCH & corresponding DMRS. In an example, for TDD, base station may configure separate sets of BWP configurations for DL & UL per component carrier. In an example, a numerology of DL BWP configuration is applied to at least PDCCH, PDSCH & corresponding DMRS. A numerology of UL BWP configuration is applied to at least PUCCH, PUSCH & corresponding DMRS. For example, when different active DL and UL BWPs are configured, wireless device may not retune the center frequency of channel BW between DL and UL.

In an example, a plurality of scheduling request (SR) configurations may be configured for a bandwidth part (BWP) of a cell for a wireless device. In an example, a wireless device may use SR resources configured by a SR resource in the plurality of SR configurations in a BWP to indicate to the base station the numerology/TTI/service type of a logical channel (LCH) or logical channel group (LCG) that triggered the SR. In an example, the maximum number of SR configurations may be the maximum number of logical channels/logical channel groups.

In an example, there may be at most one active DL BWP and at most one active UL BWP at a given time for a serving cell. A BWP of a cell may be configured with a specific numerology/TTI. In an example, a logical channel and/or logical channel group that triggers SR transmission while the wireless device operates in one active BWP, the corresponding SR may remain triggered in response to BWP switching.

In an example, the logical channel and/or logical channel group to SR configuration mapping may be (re)configured in response to switching of the active BWP. In an example, when the active BWP is switched, the RRC dedicated signaling may (re-)configure the logical channel and/or logical channel group to SR configuration mapping on the new active BWP.

In an example, mapping between the logical channel and/or logical channel group to SR configuration may be configured when BWP is configured. RRC may pre-configure mapping between logical channel and/or logical channel group to SR configurations for all the configured BWPs. In response to the switching of the active BWP, the wireless device may employ the RRC configured mapping relationship for the new BWP. In an example, when BWP is configured, RRC may configure the mapping between logical channel and SR configurations for the BWP.

In an example, sr-ProhibitTimer and SR_COUNTER corresponding to a SR configuration may continue and the value of the sr-ProhibitTimer and the value of the SR_COUNTER may be their values before the BWP switching.

In an example, a plurality of logical channel/logical channel group to SR-configuration mappings may be configured in a serving cell. A logical channel/logical channel group may be configured to be mapped to at most one SR configuration per Bandwidth Part. In an example, a logical channel/logical channel group configured to be mapped onto multiple SR configurations in a serving cell may have one SR configuration active at a time, e.g., that of the active BWP. In an example, a plurality of logical channel/logical channel group to SR-configuration mappings may be supported in carrier aggregation (CA). A logical channel/logical channel group may be configured to be mapped to one (or more) SR configuration(s) in each of both PCell and PUCCH-SCell. In an example, in CA, a logical channel/logical channel group configured to be mapped to one (or more) SR configuration(s) in each of both PCell and PUCCH-SCell may have two active SR configurations (one on PCell and one on PUCCH-SCell) at a time. In an example, The SR resource which comes first may be used.

In an example, a base station may configure one SR resource per BWP for the same logical channel/logical channel group. If a SR for one logical channel/logical channel group is pending, it may be possible for wireless device to transmit SR with the SR configuration in another BWP after BWP switching. In an example, the sr-ProhibitTimer and SR_COUNTER for the SR corresponding to the logical channel/logical channel group may continue in response to BWP switching. In an example, when a SR for one logical channel/logical channel group is pending, the wireless device may transmit the SR in another SR configuration corresponding to the logical channel/logical channel group in another BWP after BWP switching.

In an example, if multiple SRs for logical channels/logical channel groups mapped to different SR configurations are triggered, the wireless device may transmit one SR corresponding to the highest priority logical channel/logical channel group. In an example, the wireless device may transmit multiple SRs with different SR configurations. In an example, SRs triggered at the same time (e.g., in the same NR-UNIT) by different logical channels/logical channel groups mapped to different SR configurations may be merged into a single SR corresponding to the SR triggered by the highest priority logical channel/logical channel group.

In an example, when an SR of a first SR configuration is triggered by a first logical channel/logical channel group while an SR procedure triggered by a lower priority logical channel/logical channel group is on-going on another SR configuration, the later SR may be allowed to trigger another SR procedure on its own SR configuration, independently of the other on-going SR procedure. In an example, a wireless device may be allowed to send triggered SRs for logical channels/logical channel groups mapped to different SR configurations independently. In an example, wireless device may be allowed to send triggered SRs for LCHs corresponding to different SR configurations independently.

In an example, dsr-TransMax may be independently configured per SR configuration. In an example, SR_COUNTER may be maintained for each SR configuration independently. In an example, a common SR_COUNTER may be maintained for all the SR configurations per BWP.

In an example, PUCCH resources may be configured per BWP. The PUCCH resources in the currently active BWP may be used for UCI transmission. In an example, PUCCH resource may be configured per BWP. In an example, it may be necessary to use PUCCH resources in a BWP not currently active for UCI transmission. In an example, PUCCH resources may be configured in a default BWP and BWP switching may be necessary for PUCCH transmission. In an example, a wireless device may be allowed to send SR1 in BWP1, even though BWP1 is no longer active. In an example, the network may reconfigure (e.g., pre-configure) the SR resources so that both SR1 and SR2 may be supported in the active BWP. In an example, an anchor BWP may be used for SR configuration. In an example, the wireless device may send SR2 as "fallback".

In an example, a logical channel/logical channel group mapped to a SR configuration in an active BWP may also be mapped to the SR configuration in another BWP to imply same or different information (e.g., numerology/TTI and priority).

In an example, a MAC entity may be configured with a plurality of SR configurations within the same BWP. In an example, the plurality of the SR configurations may be on the same BWP, on different BWPs, or on different carriers. In an example, the numerology of the SR transmission may not be the same as the numerology that the logical channel/logical channel group that triggered the SR is mapped to.

In an example, for an LCH mapped to multiple SR configurations, the PUCCH resources for transmission of the SR may be on different BWPs or different carriers. In an example, if multiple SRs are triggered, the selection of which configured SR configuration within the active BWP to transmit one SR may be up to wireless device implementation.

In an example, a single BWP may support multiple SR configurations. In an example, multiple sr-ProhibitTimers (e.g., each for one SR configuration) may be running at the same time. In an example, drs-TransMax may be independently configured per SR configuration. In an example, SR_COUNTER may be maintained for each SR configuration independently.

In an example, a single logical channel/logical channel group may be mapped to zero or one SR configuration. In an example, PUCCH resource configuration may be associated with an UL BWP. In an example, in CA, one logical channel may be mapped to none or one SR configuration per BWP.

In an example, the bandwidth part (BWP) may consist of a group of contiguous PRBs in the frequency domain. The parameters for each BWP configuration may include numerology, frequency location, bandwidth size (e.g., in terms of PRBs), CORESET (e.g., required for each BWP configuration in case of single active DL bandwidth part for a given time instant). In an example, one or multiple BWPs may be configured for each component carrier when the wireless device is in RRC connected mode.

In an example, when a new BWP is activated, the configured downlink assignment may be initialized (if not active) or re-initialized (if already active) using PDCCH.

In an example, for uplink SPS, the wireless device may initialize or re-initialize the configured uplink grant when switching from one BWP to anther BWP. When a new BWP is activated, the configured uplink grant may be initialized (if not active) or re-initialized (if already active) using PDCCH.

In an example, for type 1 uplink data transmission without grant, there may be no L1 signaling to initialize or re-initialize the configured grant. The wireless device may not assume the type 1 configured uplink grant is active when the BWP is switched even if it's already active in the previous BWP. The type 1 configured uplink grant may be re-configured using RRC dedicated signaling when the BWP is switched. In an example, when a new BWP is activated, the type 1 configured uplink grant may be re-configured using dedicated RRC signaling.

In an example, if SPS is configured on the resources of a BWP and that BWP is subsequently deactivated, the SPS grants or assignments may not continue. In an example, when a BWP is deactivated, all configured downlink assignments and configured uplink grants using resources of this BWP may be cleared. In an example, the MAC entity may clear the configured downlink assignment or/and uplink grants upon receiving activation/deactivation of BWP.

In an example, the unit of drx-RetransmissionTimer and drx-ULRetransmissionTimer may be OFDM symbol corresponding to the numerology of the active BWP. In an example, if a wireless device is monitoring an active DL BWP for a long time without activity, the wireless device may move to default BWP for power saving. In an example, a BWP inactivity timer may be introduced to switch active BWP to default BWP after a certain inactive time.

In an example, autonomous switching to DL default BWP may consider both DL BWP inactivity timer and/or DRX timers (e.g., HARQ RTT and DRX retransmission timers). In an example, DL BWP inactivity timer may be configured per MAC entity. In an example, a wireless device may be configured to monitor PDCCH in a default BWP at least when wireless device uses long DRX cycle.

In an example, PHR may not be triggered due to the switching of BWP. In an example, the support of multiple numerologies/BWPs may not impact PHR triggers. In an example, PHR may be triggered upon BWP activation. In an example, a prohibit timer may start upon PHR triggering due to BWP switching. PHR may not be triggered due to BWP switching while the prohibit timer is running. In an example, PHR may be reported per activated/deactivated BWP.

In an example, PDCP duplication may be in an activated state while the wireless device receives the BWP deactivation command. In an example, when the BWP which the PDCP duplication is operated on is deactivated, the PDCP duplication may not be deactivated, but the PDCP entity may stop sending the data to the deactivated RLC buffer.

In an example, RRC signalling may configure one BWP to be activated when the SCell is activated. Activation/deactivation MAC CE may be used to activate both the SCell and the configured BWP. In an example, one HARQ entity may serve different BWP within one carrier.

In an example, for a wireless device-specific serving cell, one or more DL BWPs and one or more UL BWPs may be configured by dedicated RRC for a wireless device. In an example, a single scheduling DCI may switch the wireless device's active BWP from one to another. In an example, an active DL BWP may be deactivated by means of timer for a wireless device to switch its active DL bandwidth part to a default DL bandwidth part.

In an example, narrower BWP may be used for DL control monitoring and wider BWP may be used for scheduled data. In an example, small data may be allowed in narrower BWP without triggering BWP switching.

In an example embodiment, for a wireless device with a RRC connected mode, RRC signalling may support to configure one or more BWPs (both for DL BWP and UL BWP) for a serving cell (PCell, PSCell). For example, RRC signalling may support to configure 0, 1 or more BWPs (both for DL BWP and UL BWP) for a serving cell SCell (at least 1 DL BWP). In an example, for a wireless device, the PCell, PSCell and each SCell may have a single associated SSB in frequency. A cell defining SS block may be changed by synchronous reconfiguration for PCell/PSCell and SCell release/add for the SCell. For example, a SS block frequency which needs to be measured by the wireless device may be configured as individual measurement object (e.g., one measurement object corresponds to a single SS block frequency). the cell defining SS block may be considered as the time reference of the serving cell, and for RRM serving cell measurements based on SSB, for example, irrespective of which BWP is activated.

In an example, embodiment, one or more RRC timers and counters related to RLM may not be reset when the active BWP is changed.

In an example embodiment, an SR configuration may comprise a collection of sets of PUCCH resources across different BWPs and cells, wherein per cell, at any given time there may be at most one usable PUCCH resource per LCH, and/or this may be applicable to the case of one single LTE-like set of SR PUCCH resources being configured per LCH per BWP, and one BWP being active at a time.

In an example embodiment, BWP switching and cell activation/deactivation may not interfere with the operation of the counter and timer. For example, when a BWP is deactivated, the wireless device may or may not stop using configured downlink assignments and/or configured uplink grants using resources of the BWP. In an example, the wireless device may suspend the configured grants of the or clear it. In an example, the wireless device may not suspend the configured grants of the or may not clears it.

In an example embodiment, a new timer (BWP inactivity timer) may be employed to switch active BWP to default BWP after a certain period of inactive time. The BWP inactivity timer may be independent from the DRX timers.

In an example embodiment, on the BWP that is deactivated, wireless device may not transmit on UL-SCH on the BWP. In an example, on the BWP that is deactivated, wireless device may not In an example, on the BWP that is deactivated, wireless device may not monitor the PDCCH on the BWP. In an example, on the BWP that is deactivated, wireless device may not transmit PUCCH on the BWP. In an example, on the BWP that is deactivated, wireless device may not transmit on PRACH on the BWP. In an example, on the BWP that is deactivated, wireless device may not flush HARQ buffers when doing BWP switching.

In an example embodiment, a wireless device may receive one or more RRC messages/signaling from a base station. The one or more RRC messages/signaling may cause configuration of at least one UL BWP, at least one DL BWP, and one or more configured grants for a cell. DCI grants may be of at least two types: configured grants and dynamic grants. The one or more configured grants may be semi-persistent scheduling (SPS), Type 1 grant-free (GF) transmission/scheduling, and/or Type 2 GF transmission/scheduling. A configured grant provides period resource allocation/assignment for one or more wireless devices. A wireless device does not need to receive DCI for transmission/reception via each resource allocation/assignment. In an example, one or more configured grants may be configured per UL BWP. For example, one or more radio resources associated with one or more configured grants may not be defined/assigned/allocated across two or more UL BWPs. Configured grants are activated/initialized and deactivated/released/cleared by the base station and wireless device. Dynamic DCI grants may provide uplink resources for one or more TTIs.

In an example embodiment, a wireless device may be configured a BWP inactivity timer for a downlink bandwidth part of a cell. For example, the BWP inactivity timer may be associated with an active DL BWP of the cell. For example, when an active DL BWP is not a default DL BWP in the cell, the BWP inactivity timer may be running. In an example embodiment, a BWP inactivity timer (e.g., DL BWP inactivity timers) may (re)start when an active BWP (e.g., an active DL BWP) is switched to a non-default BWP (e.g., a non-default DL BWP). In an example, the BWP inactivity timer (e.g., DL BWP inactivity timers) may stop (or be disabled) when an active BWP (e.g., an active DL BWP) is switched to a default BWP (e.g., a default DL BWP). In an example, when the BWP inactivity timer expires, an active BWP (e.g., an active DL BWP) may switched to a default BWP (e.g., a default DL BWP).

In an example embodiment, a wireless device may be configured with one or more configured grants on an UL BWP for a cell. For example, a wireless device may be configured with a BWP inactivity timer (e.g., DL BWP inactivity timers) for the cell. The BWP inactivity timer (e.g., DL BWP inactivity timers) may start when an active DL BWP is not a default BWP. The BWP inactivity timer (e.g., DL BWP inactivity timers) may start when an active DL BWP is not a default BWP and an UL BWP, that is a pair of an active DL BWP, becomes active.

In an example embodiment, an BWP may be active during a period of time when a BWP inactivity timer is running. For example, a base station may transmit a control message to a wireless device to configure a first timer value (or a first counter value) of an BWP inactivity timer. The first timer value may determine how long a BWP inactivity timer runs, e.g., a period of time that a BWP inactivity timer runs. For example, the BWP inactivity timer may be implemented as a count-down timer from a first timer value down to a value (e.g., zero). In an example embodiment, the BWP inactivity timer may be implemented as a count-up timer from a value (e.g., zero) up to a first timer value. In an example embodiment, the BWP inactivity timer may be implemented as a down-counter from a first counter value down to a value (e.g., zero). In an example embodiment, the BWP inactivity timer may be implemented as a count-up counter from a value (e.g., zero) up to a first counter value. For example, a wireless device may restart a BWP inactivity timer when the wireless device receives (and/or decodes) a DCI to schedule PDSCH(s) in its active BWP (e.g., its active DL BWP, and/or UL/DL BWP pair).

Figure 25:
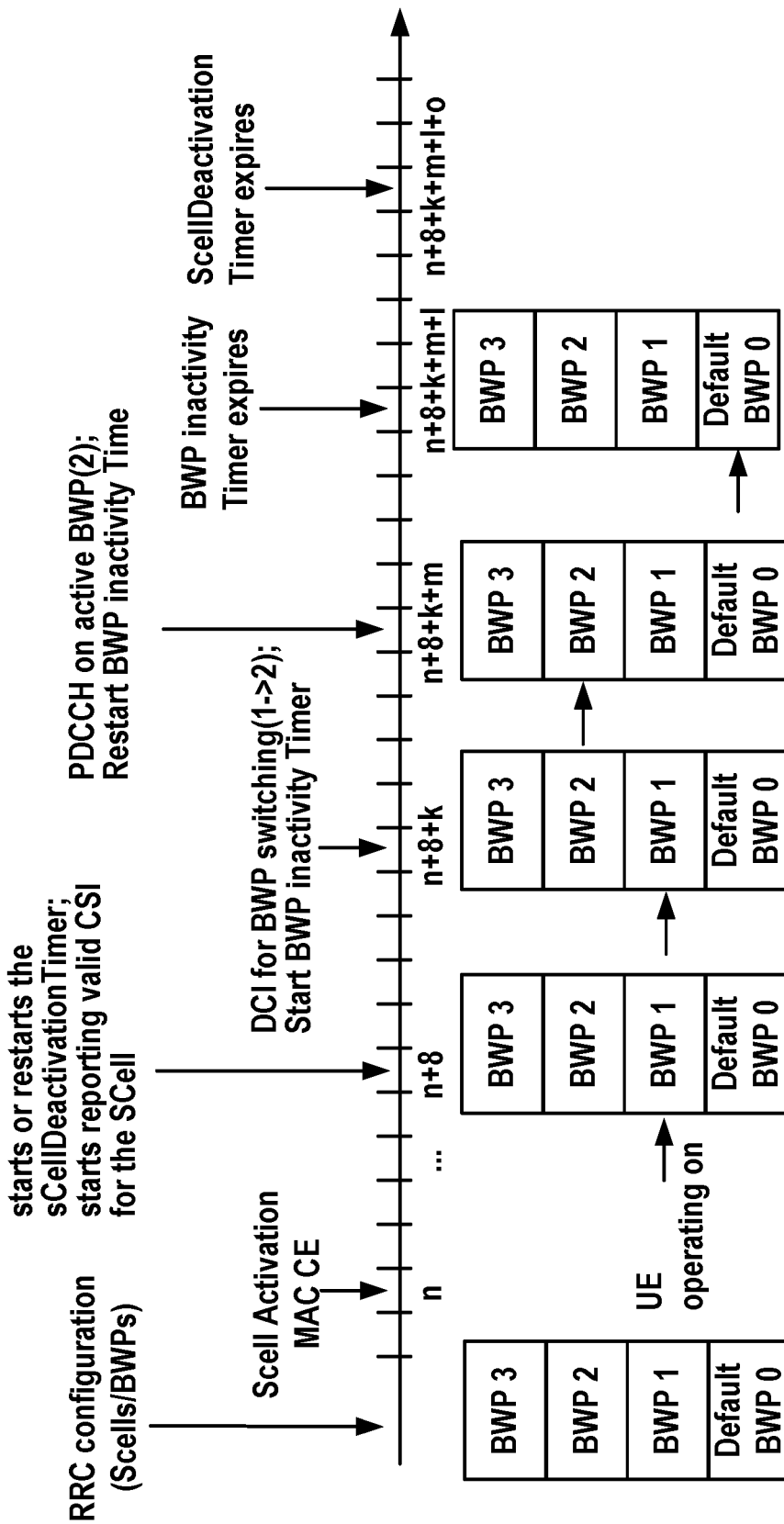
FIG. 25 is an example diagram for BWP operation in a secondary cell as per an aspect of an embodiment of the present disclosure.

FIG. 25 shows example of BWP switching based on BWP inactivity timer. A UE may receive RRC message comprising parameters of at least one SCell and one or more BWP configuration associated with the at least one SCell. Among the one or more BWPs, at least one BWP may be configured as the first active BWP (e.g., BWP 1 in the figure), one BWP as the default BWP (e.g., BWP 0 in the figure). The UE may receive a MAC CE to activate the Scell at the $n^{th}$ subframe. The UE may start the sCellDeactivationTimer, and start reporting CSI for the SCell, and/or start reporting CSI for the first active BWP of the SCell at a first available CSI resource on or after the $(n+8)^{th}$ subframe. The UE may start the BWP inactivity timer when receiving a DCI indicating switching BWP from BWP 1 to BWP 2, at the $(n+8+k)^{th}$ subframe. When receiving a PDCCH indicating DL scheduling on BWP 2, for example, at the $(n+8+k+m)^{th}$ subframe, the UE may restart the BWP inactivity timer. The UE may switch back to the default BWP (0) when the BWP inactivity timer expires, at the $(n+8+k+m+1)^{th}$ subframe. The UE may deactivate the SCell when the sCellDeactivationTimer expires. Employing the BWP inactivity timer may further reduce UE's power consumption when the UE is configured with multiple cells with each cell having wide bandwidth (e.g., 1 GHz). The UE may only transmit on or receive from a bandwidth BWP (e.g., 5 MHz) on the PCell or SCell when there is no activity on an active BWP.

In an example, a UE may receive one or more RRC messages configuring a first active BWP and a default BWP for a SCell. The first active BWP and the default BWP may be different, for example, as shown in FIG. 25, the first active BWP is BWP 0, and the default BWP is BWP 1. When receiving a MAC CE activating the SCell, the UE may activate the first active BWP (BWP 1), e.g., by monitoring one or more PDCCH and/or transmitting uplink signals on the first active DL or UL BWP. In an example, the UE may stay on the first active BWP (BWP 1) until receiving a DCI indicating active BWP change, and starting the BWP inactivity timer. In this case, it may not be power efficient, since the UE may keep monitoring the PDCCH on the first active BWP, even though there may be no activity on the first active BWP until receiving a DCI indicating a BWP change. There is a need to have mechanisms to reduce power consumption for a UE when an SCell activated with multiple BWPs.

Figure 26:
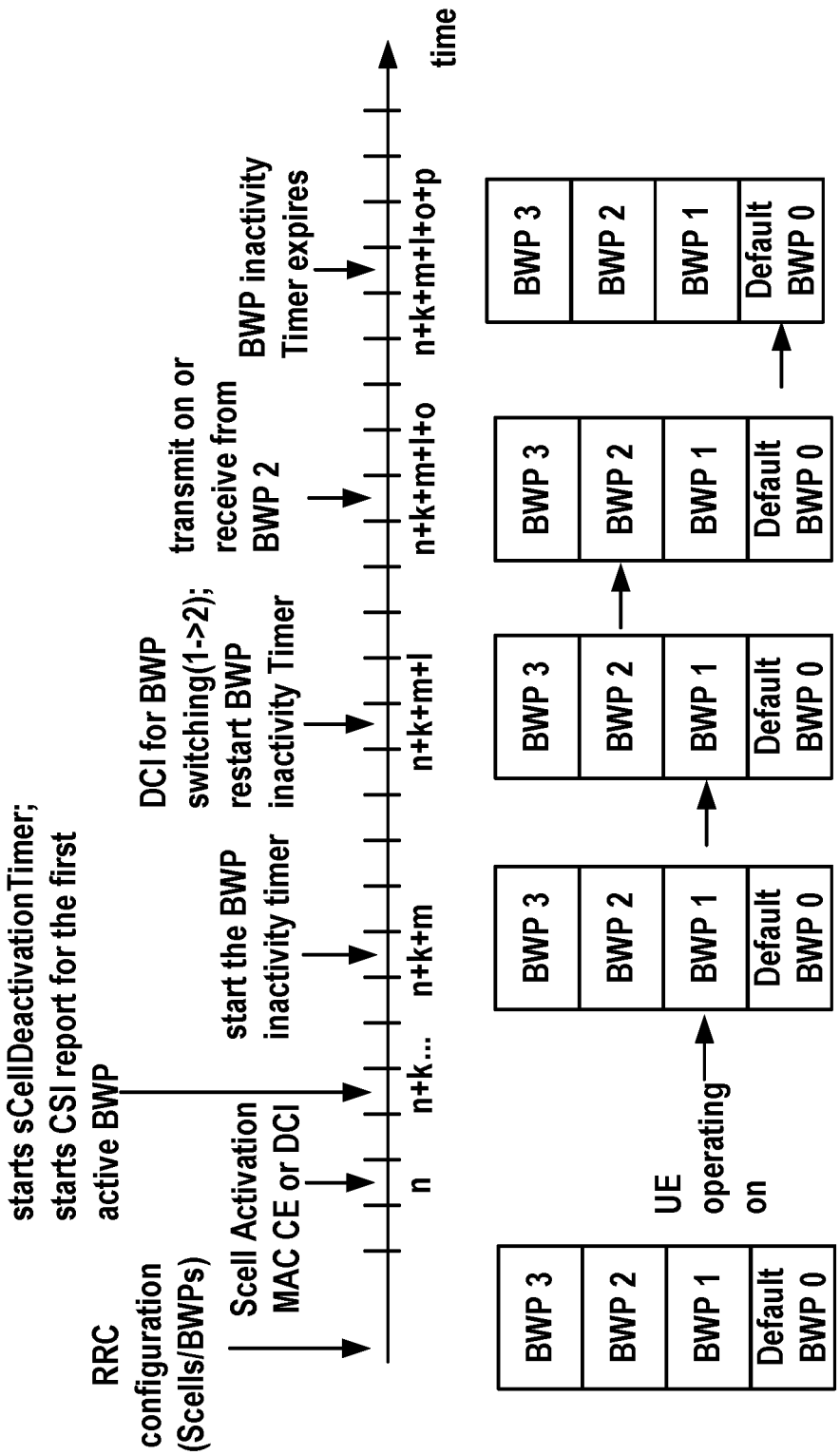
FIG. 26 is an example diagram for BWP operation in a secondary cell as per an aspect of an embodiment of the present disclosure.

FIG. 26 shows an example embodiment. A UE may receive one or more RRC messages comprising at least configuration parameters of a plurality of cells. The plurality of cells may comprise a PCell and at least one SCell. The configuration parameters of the at least one SCell may comprise at least one of: one or more BWPs associated with one or more radio resource configuration (e.g., frequency location, bandwidth, subcarrier spacing, cyclic prefix, one or more CSI-RS resource configuration); at least a first BWP identifier indicating a first active BWP; a second BWP identifier indicating a default BWP; a BWP inactivity timer with a timer value; and/or an SCell deactivation timer with a timer value. The BWP inactivity timer value may be configured per cell or per base station in an RRC message, or may be a pre-defined value. The SCell deactivation timer may be configured for each SCell with a different/same value. In an example, the SCell deactivation timer may be configured for all SCells with a same value in an RRC message, or as a pre-defined value.

The UE may receive an SCell activation/deactivation MAC CE comprising parameters indicating activation or deactivation of the at least one SCell at the $n^{th}$ subframe. In an example, a UE may receive an SCell activation/deactivation DCI indicating activation or deactivation of the at least one SCell at the $n^{th}$ subframe. The UE may start or restart the SCell deactivation timer at the $(n+k)^{th}$ subframe, in response to receiving the SCell activation/deactivation MAC CE or DCI. In an example, the UE may start the BWP inactivity timer at the $(n+k+m)^{th}$ subframe, in response to receiving the SCell activation/deactivation MAC CE or DCI, if the first active BWP is different from the default BWP. In an example, the UE may start transmitting CSI report for the first active BWP at a first available CSI resources on or after the $(n+k)^{th}$ subframe. In an example, the UE may start transmitting CSI report for the first active BWP at a first available CSI resources on or after the $(n+k+m)^{th}$ subframe. The first time offset (e.g., k value) between receiving the SCell activation/deactivation MAC CE or DCI and starting the SCell deactivation timer may be configured in a RRC message, or preconfigured as a fixed value.

The second time offset (e.g., m value) between starting the SCell deactivation timer and starting the BWP inactivity timer may be configured in an RRC message, or predefined as a fixed value. For example, the first time offset may be configured as zero if a DCI is used to activate an SCell in case that a UE is capable of activating the SCell with a first time offset of zero. The second time offset may be predefined or configured as zero if the time for SCell activation is same as the time for BWP activation, then the UE may start the SCell deactivation timer and BWP inactivity timer (if the first active BWP is different from the default BWP) at the same time. In the embodiment, when activating an SCell with multiple BWPs, the UE may switch to the default BWP when the BWP inactivity timer expires, even without receiving a DCI indicating BWP change, therefore reducing the power consumption. The configurable or predefined time offset for SCell activation and BWP activation may give the gNB more flexibility on controlling SCell activation and BWP activation, and allow different UEs with different capability (e.g., on BWP switch) to change BWP correctly.

In an example, when receiving a second DCI indicating an active BWP change, a UE may start or restart the BWP inactivity timer depending on whether the new active BWP is the default BWP. For example, in FIG. 26, a UE may receive a second DCI indicating active BWP change from BWP 1 to BWP 2, at the $(n+k+m+1)^{th}$ subframe. The UE may start or restart the BWP inactivity timer if the new active BWP is not the default BWP. In an example, the UE may start or restart the BWP inactivity timer at the same subframe, e.g., the $(n+k+m+1)^{th}$ subframe. In an example, when the UE may have a slow BWP switch, the UE may start or restart the BWP inactivity timer at the $(n+k+m+1+o)^{th}$ subframe. The time offset (e.g., 0 value) between receiving the second DCI and starting BWP inactivity timer may be configured or predefined. The time offset may be a transition gap. The transition gap may be a time period between a first time when receiving the second DCI and a second time when the wireless device completes BWP switching from BWP 1 to BWP 2. The configurable time offset between receiving BWP change DCI and starting the BWP inactivity timer may provide the gNB more flexibility on controlling BWP change, and allow different UEs with different capability (e.g., on BWP switch) to change BWP correctly.

In an example, a UE may receive the second DCI indicating active BWP change from an active BWP to a default BWP, for example, in FIG. 26, a UE may receive the second DCI indicating active BWP change from BWP 1 to BWP 0. The UE may stop the BWP inactivity timer, in response to receiving the second DCI. With the embodiment, stopping the BWP inactivity timer when switching an active BWP to the default BWP may reduce unnecessary BWP inactivity timer management at the gNB and the UE.

In an example, a UE may restart the BWP inactivity timer when the UE receives a DCI indicating PDSCH scheduling for an active DL BWP. When the UE does not receive DCI(s) for PDSCH scheduling for a period of time, the BWP inactivity timer may expire and the UE may switch to the default BWP as the active BWP. For some services, the UE may need to stay on an active BWP even if there is no DCI for PDSCH scheduling during a period of time. For example, the UE may receive a resource assignment (e.g. via RRC, MAC and/or DCI) for configured PDSCH transmission (e.g., SPS transmission, or grant-free transmission) from the base station for periodic transmissions via PDSCH. Since there is no DCI for PDSCH scheduling during a period of time, the BWP inactivity timer may expire. The UE may switch to the default BWP as an active BWP. In this example, the configured PDSCH transmission may be interrupted due to switching the active BWP. There is a need to implement a mechanism for maintaining uninterrupted PDSCH transmission even if a DCI is not received during a period of time.

In existing technologies, a base station may maintain uninterrupted PDSCH transmission on the active BWP by frequently transmitting DCIs for PDSCH or PUSCH scheduling to restart the BWP inactivity timer so that the BWP inactivity timer does not expire. Frequently transmitting the DCIs may increase downlink control channel overhead.

Implementation of the existing technologies may increase battery power consumption and UE processing requirements for monitoring downlink control channel for the DCIs. There is need for enhanced mechanisms to reduce downlink control channel overhead, UE battery power consumption and processing requirements when uninterrupted data transmission on a BWP is required.

Example embodiments may enable a wireless device and/or a base station to maintain an active state of an active BWP for the wireless device without sending DCI(s) for PDSCH scheduling. Example embodiments implement signaling and BWP inactivity timer management mechanisms that may reduce downlink control overhead. Example embodiment further reduces RRC signaling overhead by implementing an enhanced mechanism for RRC configuration signaling for BWP configuration. Example embodiment may reduce power consumption and processing for blind decoding of DCI by the UE.

In an example, a UE may receive from a base station, one or more RRC messages comprising configuration parameters of a cell of a plurality of cells. For example, the cell may be a primary cell or a secondary cell. The configuration parameters may comprise at least one of: one or more BWPs associated with one or more radio resource configuration (e.g., frequency location, bandwidth, subcarrier spacing, cyclic prefix, one or more CSI-RS resource configuration); a first BWP identifier indicating a first active BWP; a second BWP identifier indicating a default BWP; a first timer value for a BWP inactivity timer; a second timer value for a cell deactivation timer (e.g. BWP is a for an SCell). The first timer value for the BWP inactivity timer may be set to a first value (e.g., "infinite"). In response to the first timer value set to the first value in the one or more RRC messages, the UE may disable the BWP inactivity timer. The UE may maintain a state of an active BWP in response to disabling the BWP inactivity timer. In an example, the UE may activate a cell of the plurality of cells when receiving a MAC CE or DCI indicating an activation of the cell, when the cell is a secondary cell. The UE may monitor a downlink control channel of an active BWP (e.g. a first active BWP configured in one or more RRC messages) of the cell. The UE may receive a downlink control information on the downlink control channel during the monitoring. The UE may receive data packets based on the downlink control information indicating downlink assignments. The UE may transmit data packets based on the downlink control information indicating uplink grants. The UE may keep monitoring the downlink control channel of the active BWP continuously based on DRX operation being not configured. The UE may monitor, during DRX active time, the downlink control channel of the active BWP discontinuously in response to DRX operation being configured. The UE may maintain the state of the active BWP until receiving a second downlink control information indicating switching the active BWP. Example embodiment may maintain a state of an active BWP without a need for transmitting by a base station a DCI triggering restarting the BWP inactivity timer, and may reduce DCI signal overhead. The example embodiment may require an RRC information element for configuring BWP inactivity timer. This may require additional overhead for transmission of RRC message to the wireless device.

In an example, a UE may receive from a base station, one or more first RRC messages comprising configuration parameters of a cell. The configuration parameters may comprise at least one of: one or more BWPs associated with one or more radio resource configuration (e.g., frequency location, bandwidth, subcarrier spacing, cyclic prefix, one or more CSI-RS resource configuration); a first BWP identifier indicating a first active BWP; a second BWP identifier indicating a default BWP; a first timer value for a BWP inactivity timer. The first timer value for the BWP inactivity timer may be set to a first value (e.g., "infinite"). In response to the first timer value set to the first value in the one or more RRC messages, the UE may disable the BWP inactivity timer. The UE may maintain a state of an active BWP in response to disabling the BWP inactivity timer. Example embodiment may maintain a state of an active BWP without a need for transmitting by a base station a DCI triggering restarting the BWP inactivity timer, and may reduce DCI signal overhead. The example embodiment may require an RRC information element for configuring BWP inactivity timer. This may require additional overhead for transmission of RRC message to the wireless device.

In an enhanced example embodiment both DCI and RRC signaling overhead may be further reduced. In an example, the BWP inactivity timer may be absent in the one or more RRC messages when a UE is configured with multiple BWPs. The UE may disable the BWP inactivity timer in response to receiving the one or more RRC messages comprising configuration parameters of multiple BWPs, where the BWP inactivity timer is absent in the configuration parameters. The UE may maintain an active state of an active BWP in response to disabling the BWP inactivity timer. The UE may maintain the active state of the active BWP until receiving a command indicating a BWP switching.

Example embodiments may enable a wireless device and/or a base station to maintain an active state of an active BWP for the wireless device without sending RRC BWP inactivity timer parameter and additional DCI(s) for PDSCH scheduling. Example embodiments implement signaling and BWP inactivity timer management mechanisms that may reduce downlink control overhead. Example embodiment further reduces RRC signaling overhead by implementing an enhanced mechanism for RRC configuration signaling for BWP configuration. Example embodiment may reduce power consumption and processing for blind decoding of DCI by the UE.

In an example, the UE may receive a first RRC message comprising first configuration parameters of a plurality of BWPs of a cell. The plurality of BWPs may comprise a first BWP and a default BWP. The first configuration parameters may comprise a timer value for a BWP inactivity timer. The UE may activate the first BWP in response to receiving a first downlink control information indicating a downlink assignment or an uplink grant on the first BWP. The UE may start the BWP inactivity timer based on the timer value. The UE may start the BWP inactivity timer with the timer value. the UE may monitor, while the BWP inactivity timer is running, a downlink control channel on the first BWP. In an example, the UE may receive a second RRC message comprising second configuration parameters of the plurality of BWPs of the cell.

The second configuration parameters may not comprise the BWP inactivity timer. The BWP inactivity timer may be absent in the second configuration parameters. In response to the second RRC message, the UE may disable the BWP inactivity timer. The UE may stop (or disable) the BWP inactivity timer in response to the second RRC message. The UE may maintain the active state of the first BWP in response to disabling (or stopping) the BWP inactivity timer. The UE may maintain the active state of the first BWP without switching to the default BWP in response to the second RRC message. The UE may maintain the active state of the first BWP until receiving a command indicating a BWP switching. The command may be an RRC message, a MAC CE, or a downlink control information. In an example, the UE may switch to a second BWP as an active BWP from the first BWP in response to receiving a second downlink control information indicating switching from the first BWP to the second BWP. The UE may maintain the active state of the first BWP until receiving a command indicating a deactivation of the cell, if the cell is a secondary cell. The UE may maintain the active state of the first BWP until receiving a third RRC message indicating change of one or more configuration parameters of the multiple BWPs of the cell. Example embodiments may provide methods to maintain a state of an active BWP by disabling the BWP inactivity timer. Maintaining the state of the active BWP may be beneficial for uninterrupted downlink data transmission.

Example embodiments may enable a wireless device and/or a base station to maintain an active state of an active BWP for the wireless device without sending RRC BWP inactivity timer parameter and additional DCI(s) for PDSCH scheduling. Example embodiments implement signaling and BWP inactivity timer management mechanisms that may reduce downlink control overhead. Example embodiment further reduces RRC signaling overhead by implementing an enhanced mechanism for RRC configuration signaling for BWP configuration. Example embodiment may reduce power consumption and processing for blind decoding of DCI by the UE.

Figure 27:
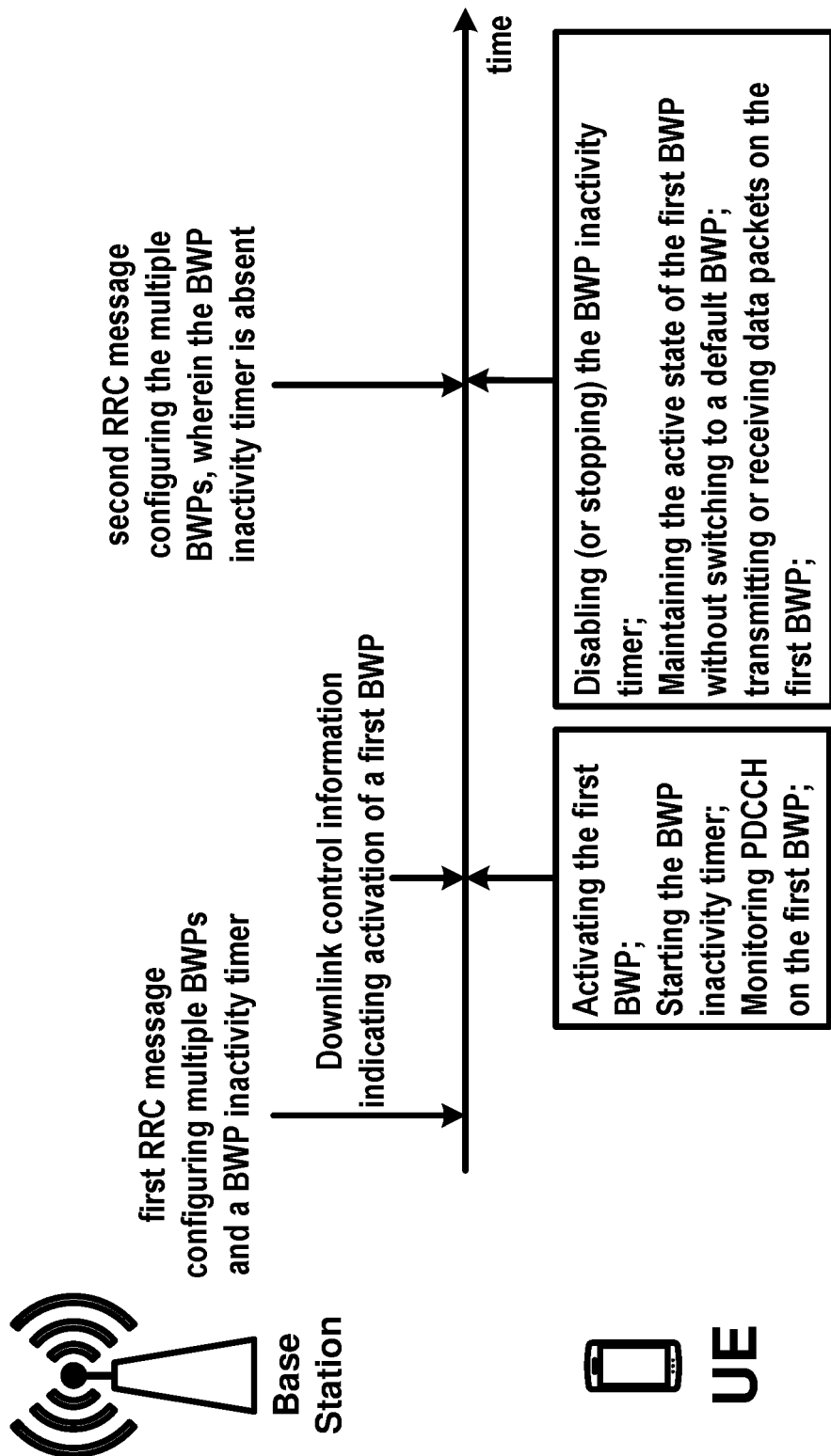
FIG. 27 is an example diagram for BWP inactivity timer management of BWP operation as per an aspect of an embodiment of the present disclosure.

FIG. 27 shows an example embodiment. In an example, a UE (e.g., UE in FIG. 27) may receive from a base station (e.g., Base Station in FIG. 27), a first RRC message comprising first configuration parameters of a plurality of BWPs. The first configuration parameters may comprise a timer value for a BWP inactivity timer. The plurality of BWPs may comprise a first BWP and a default BWP. The UE may receive a first downlink control information via a downlink control channel (e.g., physical downlink control channel) indicating an activation of the first BWP. In response to the first downlink control information, the UE may activate the first BWP, start the BWP inactivity timer with the timer value, and/or monitor the downlink control channel on the first BWP. The UE may receive a second RRC message comprising second configuration parameters of the plurality of BWPs. The UE may determine that the BWP inactivity timer is absent in the second configuration parameters. In response to the BWP inactivity timer being absent in the second configuration parameters, the UE may disable (or stop) the BWP inactivity timer. The UE may maintain the active state of the first BWP (e.g., without switching to the default BWP). The UE may transmit or receive data packets on the first BWP when the UE maintains the active state of the first BWP.

In an example, transmission of the first RRC message may optional in the embodiment. The first RRC message may or may not be transmitted. In this case, when receiving the second RRC message, the wireless device may determine that the BWP inactivity timer is absent in the second configuration parameters of the second RRC message. In response to the determining, the UE may disable (or stop) the BWP inactivity timer. The UE may maintain the active state of the first BWP (e.g., without switching to the default BWP). The UE may transmit or receive data packets on the first BWP when the UE maintains the active state of the first BWP.

Figure 28B:
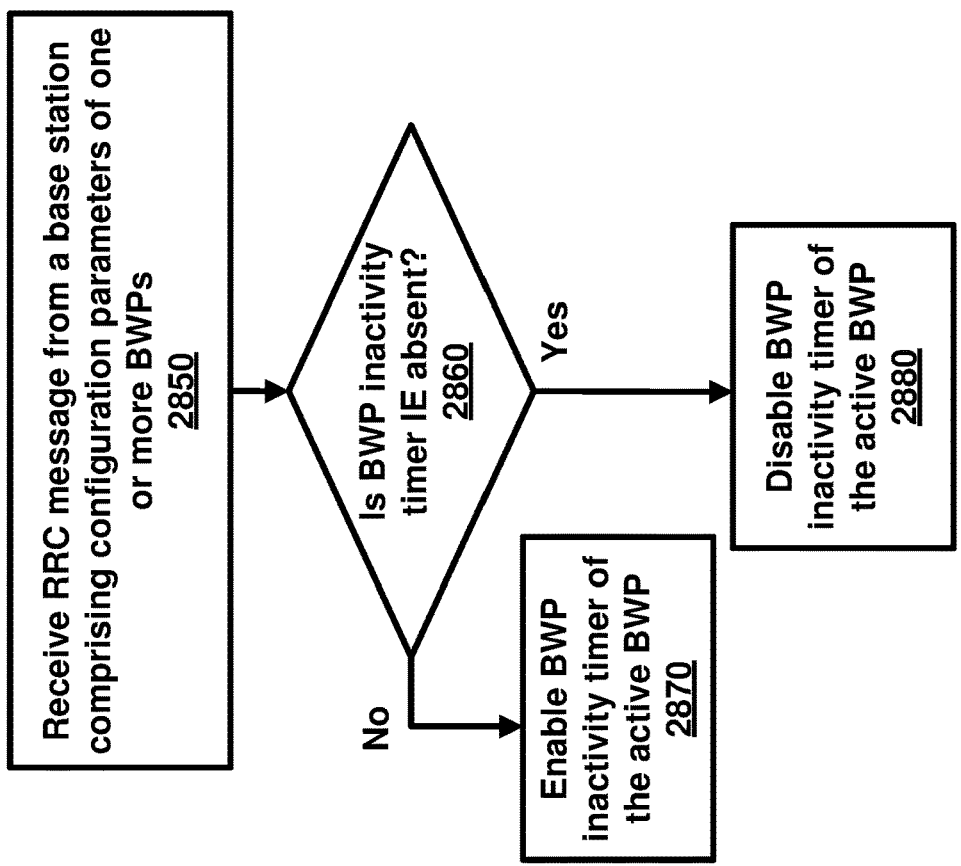
FIG. 28A and FIG. 28B are example flowcharts of BWP management as per an aspect of an embodiment of the present disclosure.
Figure 28A:
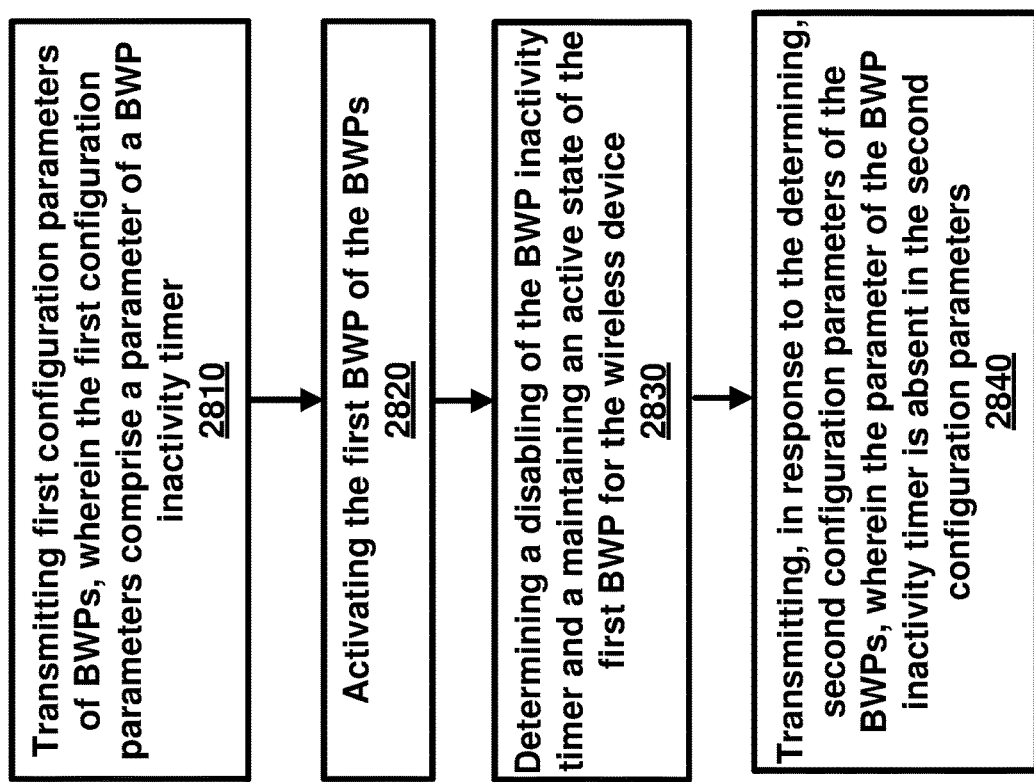

FIG. 28A shows an example flowchart of BWP management of a base station. At 2810, a base station may transmit to a wireless device, a first RRC message comprising first configuration parameters of BWPs. The first configuration parameters may comprise a parameter of a BWP inactivity timer. The parameter may be a timer value for the BWP inactivity timer. At 2820, the base station may transmit to the wireless device a first command indicating an activation of a first BWP of the BWPs. The wireless device may activate the first BWP and start the BWP inactivity timer in response to the first command. At 2830, the base station may determine a disabling of the BWP inactivity timer and/or a maintaining an active state of the first BWP for the wireless device. In an example, the base station may determine the disabling of the BWP inactivity timer and/or the maintaining the active state of the first BWP when the base station determines an activation of a semi-persistent scheduling or a configuration grant, or the base station determines to communicate with the wireless device on the first BWP for some type of services (e.g., URLLC, V2X, and/or IoT).

At 2840, the base station may transmit, in response to the determining, a second RRC message comprising second configuration parameters of the BWPs, the parameter of the BWP inactivity timer being absent in the second configuration parameters. In response to receiving the second RRC message, the wireless device may disable (or stop) the BWP inactivity timer and maintain the active state of the first BWP. The wireless device may maintain the active state of the first BWP until receiving a second command indicating a BWP switching. In an example, some blocks (2810-2040) in FIG. 28A may be optional in one of the embodiments. In an example, 2810 and/or 2820 in FIG. 28A may be optional for reducing signaling overhead for the transmission of the first RRC messages. In this case, the base station may determine a disabling of the BWP inactivity timer and/or a maintaining an active state of the first BWP for the wireless device. The base station may determine the disabling of the BWP inactivity timer and/or the maintaining the active state of the first BWP when the base station determines an activation of a semi-persistent scheduling or a configuration grant, or the base station determines to launch on the first BWP some type of services (e.g., URLLC, V2X, and/or IoT). At 2840, the base station may transmit, in response to the determining, a second RRC message comprising second configuration parameters of the BWPs, the parameter of the BWP inactivity timer being absent in the second configuration parameters. In response to receiving the second RRC message, the wireless device may disable (or stop) the BWP inactivity timer and maintain the active state of the first BWP. The wireless device may maintain the active state of the first BWP until receiving a second command indicating a BWP switching.

FIG. 28B shows an example flowchart of BWP inactivity timer management at a wireless device. At 2850, a wireless device may receive from a base station, one or more RRC messages comprising configuration parameters of one or more BWPs. At 2860, the wireless device may determine whether a BWP inactivity timer information element (IE) is absent in the one or more RRC messages. In an example, if the BWP inactivity timer IE is present in the one or more RRC messages, at 2870, the wireless device may enable the BWP inactivity timer. The wireless device may start or restart the BWP inactivity timer in response to receiving a DCI indicating a downlink assignment or an uplink grant on an active BWP. In an example, if the BWP inactivity timer IE is absent in the one or more RRC messages, at 2880, the wireless device may disable a BWP inactivity timer. The wireless device may maintain an active state of an active BWP, in response to disabling the BWP inactivity timer.

In an example, a UE may receive a downlink control information via a downlink control channel. The downlink control information may comprise a plurality of fields, with downlink radio resource allocation fields being absent, or uplink radio resource allocation fields being absent. The DCI may not comprise any downlink resource grant or uplink resource grant. The downlink or uplink radio resource allocation fields may comprise a frequency resource allocation field and/or a time resource allocation field. The downlink control information may indicate at least one of: power control command; CSI report; downlink control resource set change; uplink control resource set change; SRS transmission; beam management; and/or SCell activation/deactivation. The downlink control information may indicate an active BWP, without downlink or uplink resource allocation indication.

In existing technologies, BWP inactivity timer may be started or restarted when the DCI comprises downlink assignment or uplink grant and BWP inactivity timer is not started when the DCI does not comprise downlink assignment or uplink grant. Example embodiment enhances existing BWP timer management mechanisms to reduce unnecessary bandwidth part switching. In an example embodiment, the behavior of UE may be defined for both wireless device and base station. The gNB and the UE may remain in-sync with regards to the BWP inactivity timer and/or whether the UE switching the active BWP to the default BWP. Example embodiments may enable the UE to remain on the active BWP during extended time period when receiving the downlink control information which does not comprise downlink or uplink resource allocation indication.

In an example, a UE may receive one or more RRC message comprising configuration parameters of a cell of a plurality of cells. The plurality of cells comprising a primary cell and a secondary cell. The configuration parameters of the cell may comprise at least one of: BWPs associated with radio resource configuration (e.g., frequency location, bandwidth, subcarrier spacing, cyclic prefix, CSI-RS resource configuration); a first BWP identifier indicating a first active BWP; a second BWP identifier indicating a default BWP; a BWP inactivity timer with a first timer value; a SCell deactivation timer with a second timer value (e.g. when the cell is the secondary cell). In an example, the UE may receive a SCell activation/deactivation MAC CE comprising parameters indicating activation or deactivation of the secondary cell. In an example, a UE may receive a SCell activation/deactivation DCI indicating activation or deactivation of the secondary cell. In an example, the UE may start the BWP inactivity timer, in response to receiving the SCell activation/deactivation MAC CE or DCI. In an example, the UE may not maintain a deactivation timer for a PCell.

In an example, when a UE receives a DCI for switching an active BWP, the UE may restart the BWP inactivity timer. When a UE receives a DCI comprising a DL scheduling on PDSCH of the active BWP, the UE may start/restart the BWP inactivity timer.

In an example, when a UE receives one or more signals comprising an indication of an active BWP, the UE may restart the BWP inactivity timer. The active BWP indicated in the active BWP indication may be same or different as a previous active BWP before receiving the one or more signals. In an example, the one or more signals may comprise a downlink control information. The downlink control information may comprise a plurality of fields, with downlink radio resource allocation fields being absent, or uplink radio resource allocation fields being absent. The downlink control information may not comprise a downlink radio resource allocation field and/or an uplink radio resource allocation field. The downlink control information may indicate at least one of: power control command; CSI report; downlink control resource set change; uplink control resource set change; SRS transmission; beam management; and/or SCell activation/deactivation. The downlink control information may indicate an active BWP, without downlink or uplink resource allocation indication. In an example, the UE may restart the BWP inactivity timer in response to receiving the one or more signals, if a first active BWP indicated in the one or more signals is same as a current BWP. The current BWP may be a BWP for DL transmission or UL transmission before receiving the one or more signals. In an example, the UE may stop the BWP inactivity timer, if the active BWP indicated in the one or more signals is same as the default BWP.

In an example, when configured with multiple beams (e.g., beams associated with SSBs in FIG. 15 and/or beams associated with CSI-RS in FIG. 17) on a cell, a UE may transmit to a base station one or more beam report of the cell. The one or more beam report may comprise one or more RSRP report of one or more beams (identified by an SSB or a CSI-RS) of the cell. In an example, a cell may be configured with multiple BWPs. Base station transmit data to a wireless device via one or more beams configured on a bandwidth part.

In existing technologies, bandwidth part and beam management processes may not be fully integrated. For example, if a wireless device switches from a first BWP to a second BWP as an active BWP, beam report for the first BWP may be out-of-date and not accurate for the second BWP. In order to update beam pair link between the base station and the UE, the base station may need to transmit to the UE one or more control signals instructing the UE to transmit one or more beam report for the second BWP, after the UE completes switching to the second BWP. The base station may need to transmit additional signaling to configure and/or activate beam report on the second bandwidth part. In the existing beam management procedure, when switching the active BWP, the beam pair link setup procedure may take extra time to finish, which may result in downlink data scheduling delay. This may increase signaling overhead and may delay transmission of beam reports for the second bandwidth part. There is a need to implement enhanced beam report mechanisms when multiple BWPs are configured for a cell.

Example embodiments may provide enhanced mechanisms to reduce the beam pair link setup procedure when switching from a first bandwidth part to a second bandwidth part as an active BWP. In an example embodiment, a wireless device may transmit one or more beam reports for a new active BWP (e.g. the second BWP) in response to switching to the second BWP as the active BWP, without a need for waiting to receive the one or more signaling (e.g., indicating the UE to transmit the beam report). Example embodiment may provide methods and systems enabling enhanced BWP scheduling for the base station and wireless device. Example embodiment may reduce downlink and uplink scheduling delay when an active BWP changes.

In an example, a UE may receive one or more RRC messages comprising configuration parameters of a plurality of BWPs of a cell. The configuration parameters may comprise at least one of: frequency location, bandwidth, subcarrier spacing, cyclic prefix, reference signal (RS) resource configuration parameters; a first BWP identifier indicating a first BWP; a second BWP identifier indicating a default BWP; a BWP inactivity timer with a timer value. The wireless device may receive a first DCI indicating activation of the first BWP. The UE may activate the first BWP in response to the first DCI. The UE may switch from the first BWP to a second BWP in response to switching to the second BWP as an active BWP. For example, the UE may receive a second DCI indicating the switching. In response to activating the second BWP, the UE may transmit one or more RSRP report for the second BWP (e.g. without the need for base station to transmit any additional signaling). The one or more RSRP report may be measured based on the one or more RS resources of the second BWP. This may reduce downlink and uplink scheduling delay and may reduce control signaling when an active BWP changes.

In an example, when receiving a second DCI indicating an active BWP change to the second BWP. The UE may start or restart the BWP inactivity timer depending on whether the second BWP is the default BWP. The UE may start or restart the BWP inactivity timer if the second BWP is not the default BWP. The UE may receive downlink assignment or uplink grants from the base station for the second BWP. The UE may transmit or receive transport blocks via the second BWP.

Figure 29:
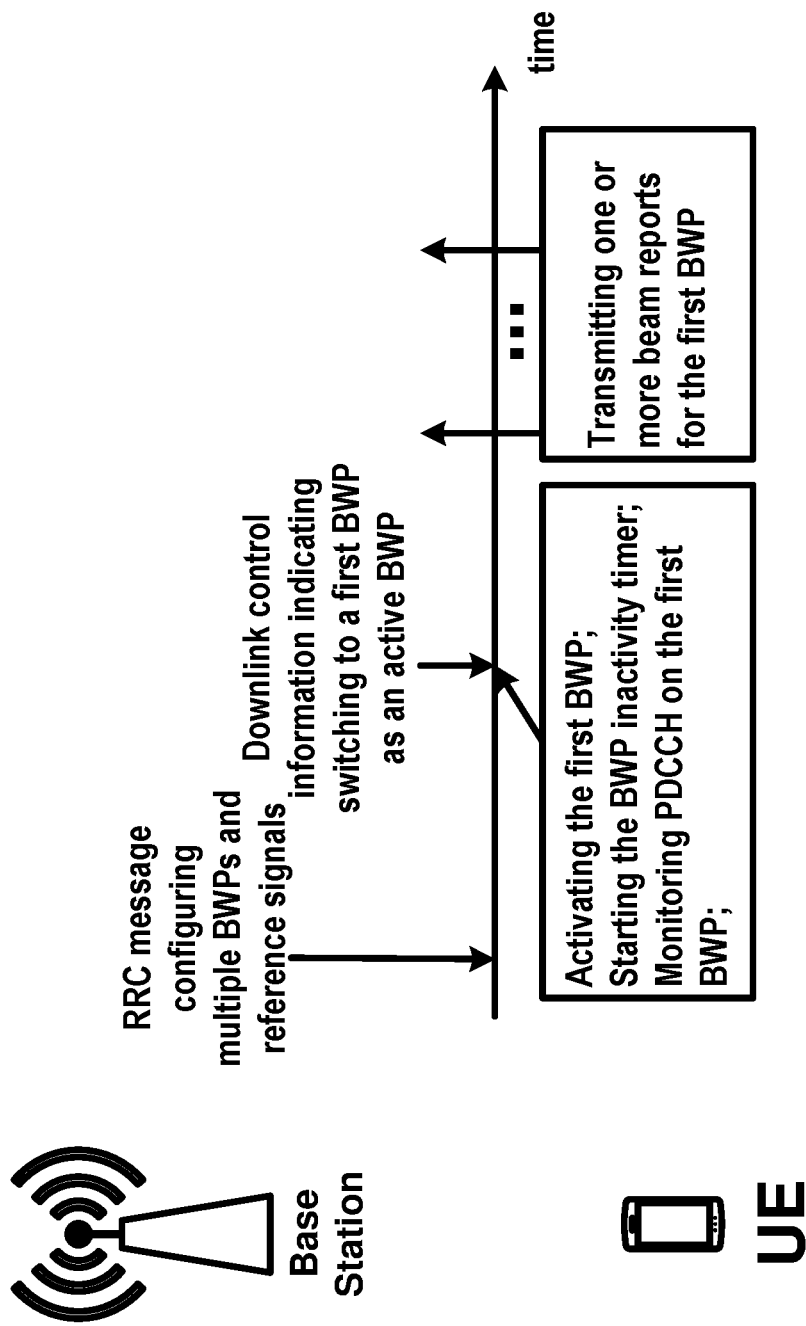
FIG. 29 is an example diagram for beam management of BWP operation as per an aspect of an embodiment of the present disclosure.

FIG. 29 shows an example of the embodiment. In an example, a UE (e.g., UE in FIG. 29) may receive from a base station (e.g., Base Station in FIG. 29), one or more RRC messages comprising first configuration parameters of a plurality of BWPs and second configuration parameters of reference signals (RSs). The first configuration parameters may comprise a timer value for a BWP inactivity timer. The plurality of BWPs may comprise a first BWP and a default BWP. The second configuration parameters may comprise: one or more radio resource configuration parameters of a plurality of RSs; a report quantity indicator; one or more uplink control channel parameters. The UE may receive a downlink control information indicating switching to the first BWP as an active BWP. In response to the downlink control information, the UE may activate the first BWP, start the BWP inactivity timer with the timer value, and/or monitor a downlink control channel on the first BWP. In an example, after activating the first BWP, the UE may transmit one or more beam reports for the first BWP. The one or more beam reports may comprise one or more RSRP reports based on the plurality of RSs. The one or more RSRP reports may comprise at least a RS index indicating one of the plurality of RSs and a RSRP value for the one of the plurality of RSs.

In an example, a UE may receive a radio resource control message comprising configuration parameters of a cell, the configuration parameters comprising at least one of: first bandwidth part (BWP) configuration parameters for a first BWP; and second BWP configuration parameters for a default BWP. The UE may activate the first BWP. The UE may determine that a parameter for a BWP inactivity timer is absent from the configuration parameters. In response to the determining, the UE may disable the BWP inactivity timer of the first BWP without switching to the default BWP. The UE may maintain, in response to disabling the BWP inactivity timer, the first BWP as an active BWP until the wireless device receives a command indicating a BWP switching.

In an example, a UE may receive a first radio resource control message comprising first configuration parameters of a cell, the first configuration parameters comprising: first bandwidth part (BWP) configuration parameters for a default BWP; second BWP configuration parameters a first BWP; and a parameter for a BWP inactivity timer. The UE may start the BWP inactivity timer in response to activating the first BWP. The UE may receive a second radio resource control message comprising second configuration parameters of the cell. The UE may determine that the timer parameter for the BWP inactivity timer is absent in the second configuration parameters. In response to the determining, the UE may disable the BWP inactivity timer. The UE may maintain the first BWP as an active BWP in response to disabling the BWP inactivity timer. The UE may maintain the first BWP as the active BWP until the UE receives a command indicating a BWP switching.

In an example, a UE may receive a first radio resource control (RRC) message comprising first configuration parameters of a cell, the first configuration parameters indicating: one or more bandwidth parts (BWPs) comprising a default BWP and/or an initial active BWP; and a value associated with a BWP inactivity timer. The UE may receive a downlink control information indicating downlink assignments or uplink grant on a BWP of the one or more BWPs. The UE may start the BWP timer with the value in response to the downlink control information. The UE may receive a second radio resource control message comprising second configuration parameters of the cell, wherein the value associated with the BWP timer is set to infinite. In response to the second configuration parameters, the UE may disable the BWP inactivity timer. The UE may maintain the first BWP as an active BWP in response to disabling the BWP inactivity timer. The UE may maintain the first BWP as the active BWP until the UE receives a command indicating a BWP switching.

In an example, a UE may receive from a base station, one or more radio resource control messages comprising configuration parameters of a cell, the configuration parameters comprising first radio resource parameters of bandwidth parts (BWPs) comprising a first BWP and second radio resource parameters of reference signals. The UE may receive a downlink control information indicating switching to the first BWP as an active BWP. The UE may activate the first BWP in response to the downlink control information. The UE may transmit, in response to activating the first BWP, one or more reference signal received power (RSRP) reports for the first BWP, wherein the one or more RSRP reports comprise a reference signal index indicating one of the reference signals. The reference signals may comprise one or more channel state information reference signals and/or one or more synchronization signal blocks.

In an example, a UE may activate a first bandwidth part in response to switching to the first bandwidth part as an active bandwidth part. The UE may transmit, in response to the activating the first bandwidth part, one or more reference signal received power reports for the first bandwidth part. The one or more reference signal received power reports may comprise a reference signal index indicating reference signals and a value of reference signal received power of the reference signals.

In an example, a base station may configure a wireless device with uplink transmission without grant. The resources for uplink transmission scheme without grant may be semi-statically (re-)configured. In an example, the resource configuration may at least comprise physical resources in time and frequency domain and RS parameters. The configuration parameters may comprise at least modulation and coding scheme (MCS) and/or redundancy version and/or a number of repetitions (K). In an example, a wireless device may be configured with multiple K values. For an uplink transmission without grant, RS may be transmitted with data. In an example, the same channel structure as grant-based transmission may be employed for uplink transmission without grant. In an example, at least for CP-OFDM, a common DMRS structure may be used for downlink and uplink. In an example, for am uplink transmission with and/or without grant, K repetitions, including initial transmission, with/without same RV and with/without same MCS for the same transport block may be employed. In an example, frequency hopping may be employed between initial transmission and a retransmission and/or between retransmissions. In an example, for uplink transmission without grant, a wireless device may continue repetitions for a TB until either an acknowledgement (ACK) is successfully received from a base station or the number of repetitions for the TB reaches K. In an example, for a wireless device configured with K repetitions for a TB transmission with and/or without grant, the wireless device may continue repetition for the TB until an uplink grant is successfully received for a slot/mini-slot for the same TB and/or an acknowledgement/indication of successful receiving of that TB from base station and/or the number of repetitions for that TB reaches K. In an example, a wireless device may be identified based on or a wireless device ID may be based on RS sequence/configuration for the wireless device and/or radio resources configured for uplink transmission.

In an example, time and frequency resource for uplink transmission without grant may be configured in a wireless device-specific manner. The network may configure the same time/frequency resource and/or RS parameters to multiple wireless devices. The base station may avoid collision with network implementation. The base station may identify a wireless device ID based on physical layer parameters such as time/frequency resources and/or RS (e.g., DMRS) resources/parameters. In an example, both DFT-S-OFDM and CP-OFDM may be supported for uplink transmission without grant. In an example, uplink transmission without grant may support one or more HARQ processes. HARQ process ID may be identified based on resources used for uplink transmission without grant, e.g., time/frequency resources and/or RS parameters for HARQ process ID identification for both transmission with and without grant.

In an example, a wireless device may be configured with a plurality of parameters for uplink data transmission without grant. In an example, a wireless device may be configured with reference symbol, time and frequency resources in a wireless device-specific manner. The time and frequency resources configured for a wireless device may or may not collide with those of another wireless device. In an example, DFT-S-OFDM and CP-OFDM may be supported for uplink transmission without grant. In an example, uplink transmission without grant may support a plurality of HARQ processes. In an example, L1 signaling may be employed for activation/deactivation of uplink transmission without grant. In an example, L1 signaling may be used for modification of parameters configured by RRC. Example parameters may comprise time domain resource allocation (e.g., for one transmission), frequency domain resource allocation (e.g., in terms of RBs or RBGs), wireless device-specific DMRS configuration, MCS/TBS, etc. In an example, L1 signaling may be used for switching to grant-based re-transmission for the same TB. In an example, the L1 signaling may be based on wireless device-specific DCI (e.g., uplink grant) or a group common DCI. In an example, RRC (re-)configuration of a set of resource and parameters may comprise transmission interval, physical resource such as time domain resource allocation (e.g., for one transmission), frequency domain resource allocation, e.g., in terms of RBs or RBG(s), wireless device-specific DMRS configuration, etc. In an example, a plurality of physical resources may be configured in the transmission interval. In an example, one or more repetitions of a same one or more TBs may be performed (e.g., during the transmission interval) after an initial transmission. In an example, a repetition in the one or more repetitions may be performed in the same resource employed for initial transmission. In an example, a repetition in the one or more repetitions may be may be in a different resource than the initial transmission. The radio resources employed for initial transmission and repetition may or may not be timely contiguous.

In an example, uplink transmission without grant, may be configured/activated with a plurality of types. In an example first type, UL data transmission without grant may be activated/deactivated based on RRC (re-)configuration without L1 signaling. In an example second type, UL data transmission without grant may be based on both RRC configuration and L1 signaling for activation/deactivation. In an example third type, UL data transmission without grant may be based on RRC configuration and may allow L1 signaling to modify some parameters configured by RRC. In an example, for first type UL data transmission without grant, the RRC (re-) configuration may comprise periodicity and offset of a resource with respect to SFN=0, time domain resource allocation, frequency domain resource allocation, wireless device-specific DMRS configuration, MCS/TBS, number of repetitions K, power control related parameters, HARQ related parameters, etc. In an example, for second type UL transmission without grant, some of parameters, for example, periodicity and power control related parameters, may be RRC configured. In an example, for second type UL transmission without grant, the parameters not RRC configured and/or required to be updated, for example an offset value with respect to a timing reference, time domain resource allocation, frequency domain resource allocation, wireless device-specific DMRS configuration, and/or MCS/TBS, may be indicated by L1 signaling. The number of repetitions K may be RRC configured and/or indicated by L1 signaling.

In an example, an uplink grant, a group-common DCI, and/or HARQ feedback indication mechanism employed for an uplink transmission without grant may indicate an ACK or NACK implicitly or explicitly to reduce a signaling overhead and thereby to fulfill one or more service requirements (e.g., URLLC).

In an example, an uplink grant in response to an uplink transmission without grant may indicate an ACK for the uplink transmission without grant. The uplink grant may be a dynamic grant, e.g., for the same HARQ process as the uplink transmission without grant. In an example, an uplink grant for a new data transmission may implicitly indicate an ACK for an uplink transmission without grant. In an example, an uplink grant for the same TB initially transmitted without grant may indicate NACK for an uplink transmission without grant.

In an example, a group-common DCI may be employed to indicate one or more HARQ feedbacks of one or more wireless devices for uplink transmission without grant. In an example, the group common DCI may indicate ACK. In an example, the group common DCI may indicate NACK. In an example, the group common DCI may indicate ACK and NACK.

In an example, the wireless device may employ a timer to determine an implicit and/or explicit HARQ feedback (ACK/NACK) corresponding to an uplink transmission without grant. In an example, the timer value may be configured for the wireless device via RRC. The wireless device may receive one or more RRC message indicating the timer value. In an example, the wireless device may (re-)start the timer in response to an uplink transmission without grant (e.g., one or more TBs corresponding to an uplink transmission without grant). In an example, the wireless device may assume an ACK in response to the timer expiring and not receiving a NACK after K repetitions. In an example, the wireless device may assume a NACK in response to the timer expiring and not receiving an ACK. In an example, the wireless device may assume a NACK corresponding to an uplink transmission without grant in response to receiving a grant (e.g., dynamic grant) for retransmission of the same one or more TBs in a first uplink transmission without grant (e.g., the same HARQ process and with NDI not toggled). In an example, the wireless device may assume a NACK corresponding to an uplink transmission without grant in response to receiving a grant (e.g., dynamic grant) for retransmission of the same one or more TB in a first uplink transmission without grant in a period of time. In an example, the period of time may be configured for the wireless device. The wireless device may receive an RRC message indicating the period of time. In an example, the period of time may be pre-configured. In an example, the period of time may be indicated and/or updated by L1 signaling.

In an example embodiment, a base station may configure a wireless device with one or more RNTIs for uplink transmission without grant. In an example, the base station may configure a RNIT for uplink transmission without grant per configuration, per service, per type (e.g., the first, second, and/or third types) and/or per a wireless device.

In an example embodiment, a base station may configure a wireless device with a first RNTI. The first RNTI may be a group-common RNTI. In an example, for indicating HARQ feedback (e.g., ACK/NACK) corresponding to one or more uplink transmissions (e.g., one or more TBs corresponding to one or more uplink transmission) without uplink grant (e.g., for semi-persistent scheduling (SPS) and/or grant-free resource configuration) for one or more wireless devices, the base station may transmit a downlink control information (DCI) (e.g., a group common DCI) corresponding to the first RNTI. The DCI may be scrambled based on the first RNTI. In an example, a wireless device may monitor a common search space to detect the DCI corresponding to the first RNTI. In an example, the base station may transmit/indicate NACK (e.g., using the DCI) corresponding to one or more TBs of the wireless device and the wireless device may assume an ACK (e.g., implicit ACK) if no NACK is received within a period of time. In an example, the base station may transmit/indicate an ACK (e.g., using the DCI) and the wireless device may assume a NACK (e.g., implicit NACK) if no ACK is received within a period of time. The period for time may be configured for the wireless device. In an example, the base station may transmit an RRC message indicating the period of time. In an example, the period of time may be pre-configured. In an example, the wireless device may transmit up to a first number of repetitions of a same one or more TBs corresponding to an uplink transmission without grant. The period of time may be or may not be based on the duration that the first number of repetitions of the same one or more TBs corresponding to the uplink transmission is received. The wireless device may monitor for the DCI at least for a portion of the period of time. The wireless device may stop monitoring the DCI in response to receiving the ACK/NACK corresponding to the uplink transmission without grant. In an example, the DCI may comprise ACK/NACK for a plurality of wireless devices. The plurality of wireless devices may be configured with the same first RNTI used for transmission of the DCI. In an example, the plurality of wireless devices configured with the same first RNTI may monitor the search space and may detect the same DCI and may identify HARQ feedback corresponding to their transmissions. In an example, the DCI may comprise a plurality of HARQ feedbacks (e.g., corresponding to a plurality of TBs) for the same wireless device. The mapping between a HARQ feedback and a corresponding wireless device and/or a TB in a plurality of TBs transmitted by a wireless device may be based on a rule and/or implicitly/explicitly indicated by the DCI.

Uplink demodulation reference signals (DMRS) may be used for channel estimation and/or coherent demodulation of PUSCH and PUCCH. In an example, a base station may configure a wireless device with DMRS configuration parameters. The wireless device may receive one or more RRC messages. The one or more RRC messages may comprise a DMRS-Config IE. The DMRS-Config IE may comprise DMRS configuration parameters. An example, DMRS-Config IE may be as follows. Example embodiments may enhance the DMRS-Config configuration and/or the DMRS-Config configuration parameters.

```
DMRS-Config ::=           CHOICE {
    release                   NULL,
    setup                     SEQUENCE {
        scramblingIdentity        INTEGER (0..503),
        scramblingIdentity2       INTEGER (0..503)
    }
}
DMRS-Config ::=           SEQUENCE {
    dmrs-tableAlt             ENUMERATED {true}    OPTIONAL    --
Need OR
}
```

In an example, parameters scramblingIdentity and/or scramblingIdentity2 may indicate a parameter $n^{DMRS,i}_{ID}$. In an example, the parameter, dmrs-tableAlt may indicate whether to use an alternative table for DMRS upon PDSCH transmission.

Example embodiments of the disclosure may support an uplink (UL) transmission without an UL grant, referred to as a grant-free (GF) UL transmission or a configured grant Type 1, for one or more service types, e.g., URLLC. In an example, a base station may transmit one or more messages (e.g., RRC messages) comprising configuration parameters of the GF UL transmission. For example, the configuration parameters may indicate one or more resources (e.g., may be referred to as one or more GF UL radio resources). For example, the configuration parameters may indicate time and frequency location of the one or more GF UL radio resources. For example, the time and frequency location may be indicated based on a time offset and/or frequency offset. For example, the time offset may be defined in terms of a first system frame number, a first subframe number, a first slot number, a first OFDM symbol number, and/or combination thereof. For example, the time offset may comprise one or more times offsets, for example, a first offset in terms of a first system frame number and/or a second offset in terms of a first subframe number, a first slot number, and/or a first OFDM symbol number with respect to the first offset. For example, the first offset may be zero that may indicate the system frame number zero. For example, the frequency location may be indicated by a frequency offset. For example, the frequency offset may be defined with respect to a frequency reference. For example, the frequency reference may be a center frequency. For example, the frequency reference may be a first frequency of an operating bandwidth. For example, the first frequency may be a lowest frequency of an operating bandwidth. For example, the first frequency may be a highest frequency of an operating bandwidth. For example, the first frequency may be a fourth frequency that may be predefined, configured by a base station, and/or indicated by a base station. For example, the frequency reference may be a second frequency of an operating bandwidth part. For example, the second frequency may be a lowest frequency of an operating bandwidth part. For example, the second frequency may be a highest frequency of an operating bandwidth part. For example, the second frequency may be a fourth frequency that may be predefined, configured by a base station, and/or indicated by a base station.

In an example, one or more GF (configured grant) UL radio resources may be periodic resources. For example, the configuration parameters may indicate a periodicity of the one or more GF UL radio resources. For example, the wireless device configured by the base station with the GF UL radio resources may transmit one or more data packets via the GF UL radio resources without receiving a dynamic UL grant, which may result in reducing the signaling overhead comparing with a GB UL transmission. Such a service type that has strict requirements, for example in terms of latency and reliability such as URLLC, may be a candidate for which a base station may configure a wireless device with the GF UL transmission. The wireless device configured with the GF UL radio resource may skip an UL transmission on the GF UL radio resource if there is no data to transmit.

In example embodiments, the GF UL transmission may support multiple wireless devices to access the same GF UL radio resources, may referred to as GF radio resource pool, in order to achieve lower latency and lower signaling overhead. A GF radio resource pool may be defined as a subset of one or more radio resources from a common radio resource set (e.g. from all uplink shared channel radio resources). The GF radio resource pool may be employed to allocate exclusive or partially overlapped one or more radio resources for GF UL transmissions in a cell or to organize frequency/time reuse between different cells or parts of a cell (e.g. cell-center and cell-edge).

In example embodiments, if a base station configures multiple wireless devices with the same (or partially overlapped) GF radio resource pool, there may be a collision between the GF UL transmissions of two or more wireless devices. The base station may configure one or more parameters to assign a wireless device specific demodulation reference signal (DMRS) along with the GF radio resource pool configuration in order to identify a wireless device ID. In an example, the one or more parameters may indicate at least one of a root index of a set of Zadoff-Chu (ZC) sequences, a cyclic shift (CS) index, a TDM/FDM pattern index, or an orthogonal cover code (OCC) sequences or index.

In example embodiments, for the wireless device ID identification, a base station may employ one or more preamble sequences that may be transmitted together with the PUSCH data. The one or more preamble sequences may be designed to be reliable enough and to meet the detection requirement of a service, e.g., URLLC. For wireless devices configured with a GF radio resource pool, a preamble sequence may be uniquely allocated to a wireless device. A base station may configure different GF radio resources for different sets of wireless devices such that the preamble sequences may be reused in different GF radio resources. To have reliable detection performance, the preamble sequences may be mutually orthogonal, e.g. orthogonality between ZC root sequences with different cyclic shifts. In an example, a wireless device may transmit one or more preambles together with the data block in the first step and receive a response in the second step. The data may be repeated K times depending on a base station configuration. The one or more preambles may not be repeated. The response from a base station may be an UL grant or a dedicated ACK/NACK transmitted in the form of a downlink control information (DCI).

In an example, a grant-free (GF) resource pool configuration may not be known to wireless devices. It may be coordinated between different cells for interference coordination. If the GF resource pools are known to wireless devices, those may be semi-statically configured by wireless device-specific RRC signaling or non-UE-specific RRC signaling (e.g., via broadcasting a system information block in LTE). The RRC signaling for GF radio resource configuration may comprise one or more parameters indicating at least one of following: periodicity and offset of a resource with respect to SFN=0, time domain resource allocation, frequency domain resource allocation, wireless device-specific DMRS configuration, a modulation and coding scheme (MCS), a transport block size (TBS), number of repetitions K, a hopping pattern, HARQ related parameters, or power control related parameters. A wireless device may activate the GF UL transmission configured by the RRC signaling in response to receiving the RRC signaling without an additional signaling.

In an example, an L1 activation signaling may be employed with RRC signaling to configure/activate a GF configuration. In an example, RRC signaling may configure one or more parameters of GF UL transmission to the wireless device, and L1 activation signaling may activate, or deactivate the configured GF UL transmission. L1 activation signaling may be used to configure, adjust, modify, or update one or more parameters associated with GF UL transmission.

The L1 activation signaling may be transmitted via a PDCCH in the form of DCI, e.g., DCI employed for LTE UL semi-persistent scheduling (SPS). base station may assign a radio network temporary identifier (RNTI) for a wireless device along with GF configuration parameters in the RRC signaling. With the assigned RNTI, wireless device may monitor the PDCCH to receive the L1 activation signaling masked by the RNTI.

In an example, the RRC (re-)configuration of GF UL transmission without UL grant may comprise at least one of following: Periodicity of a resource or Power control related parameters. The L1 activation signaling may provide at least one of the following parameters for the GF resource: Offset associated with the periodicity with respect to a timing reference, time domain resource allocation, frequency domain resource allocation, wireless device-specific DMRS configuration, an MCS/TBS value, HARQ related parameters, number of repetitions K, or a hopping pattern.

In an example, the MCS may be indicated by the wireless device within the grant-free data. In an example, in order to avoid the blind decoding of MCS indication, the limited number of MCS levels may be pre-configured by a base station, e.g., K bits may be used to indicate MCS of grant-free data, where K may be as small as possible. The number of REs used to transmit MCS indication in a resource group may be semi-statically configured. In the GF operation, there may be one common MCS predefined for all wireless devices. In this case, there may be a tradeoff between a spectrum efficiency and decoding reliability, e.g., the spectrum efficiency may be reduced if a low level of MCS is used, while the data transmission reliability gets higher. The NR may predefine a mapping rule between multiple time/frequency resources for UL grant-free transmission and MCSs. In an example, a wireless device may select an appropriate MCS according to a DL measurement and associated time/frequency resources to transmit UL data. In this way, wireless device may choose a MCS based on the channel status and increase the resource utilization.

In an example, when a wireless device configured with a GF UL transmission, the GF UL transmission may be activated in different ways, via RRC signaling, via L1 activation signaling, or combination thereof. The need for L1 activation signaling may depend on service types, and the dynamic activation (e.g., activation via L1 activation signaling) may not be supported in the NR or may be configurable based on service and traffic considerations.

In example, it may be up to a base station whether to configure a wireless device with or without L1 activation signaling, which may be determined based on, for example, traffic pattern, latency requirements, and other possible aspects. With the L1 activation signaling, a wireless device may transmit a data packet with the configured time frequency radio resource when the wireless device receives an L1 activation signaling from the base station. If the L1 activation signaling is not configured, a wireless device may start an UL transmission with the configured GF radio resource at any moment or in a certain time interval (which may be configured by RRC signaling or pre-defined) once the configuration is completed. For example, a wireless device may activate the GF UL transmission in response to receiving the RRC signaling configuring the GF UL transmission. In an example, the activation type (via RRC signaling or via L1 activation signaling) may be pre-configured.

In an example, RRC signaling, transmitted from a base station to a wireless device to configure an UL GF transmission, may comprise an indicator employed for indicating whether the activation of the UL GF transmission needs an L1 activation signaling. If the indicator indicates a need of L1 activation signaling, the wireless device may wait an L1 activation signaling and activate the configured UL GF transmission in response to receiving the L1 activation signaling. When the L1 activation signaling is employed, the wireless device may transmit an acknowledgement in response to receiving an L1 activation signaling to the base station to inform of whether the wireless device correctly receives it.

In an example, if the indicator indicates no need of L1 activation signaling, the UL GF transmission may be activated in response to the RRC signaling configuring the GF UL transmission. For the case of the activation of GF UL transmission without the L1 activation signaling, the wireless device may not determine when to start the GF UL transmission. The base station and wireless device may predefine the start timing based on a time offset and the transmission time interval (TTI), e.g., a subframe, slot, or mini-slot, where the wireless device receive the RRC signaling for the GF UL transmission configuration, or the RRC configuration may comprise one or more parameters indicating the start timing (in terms of a subframe, slot, or mini-slot).

In an example, RRC signaling may not comprise an indicator whether the activation needs a L1 activation signaling. A wireless device may implicitly know whether the configured GF transmission is activated by RRC signaling or L1 activation signaling based on a format of RRC configuration for GF UL transmission. For example, for a GF UL transmission without L1 activation signaling, the RRC signaling for configuring and activating the GF UL transmission may comprise one or more parameters for the UL GF transmission. For a GF UL transmission activated by the L1 activation signaling, a RRC signaling may comprise a different number of parameters that may be less than a number of parameters in the RRC signaling activating the GF UL transmission. In this case, the absence and/or presence of one or more parameters (or the number of parameters) in the RRC signaling may be an implicit indicator for a wireless device to identify whether to activate the GF UL transmission via RRC signaling or via L1 activation signaling.

In an example, the L1 activation signaling may comprise one or more parameters indicating at least one of GF configuration, e.g., start timing of GF UL transmission, GF time and frequency radio resources, DMRS parameters, a modulation and coding scheme (MCS), a transport block size (TBS), number of repetitions K, a hopping pattern, or power control parameters. For example, a downlink control information (DCI) format used for the activation of the GF UL transmission may comprise one or more fields indicating a MCS for the GF UL transmission. In this case, the GF UL transmission requiring the L1 activation signaling may be configured with a RRC signaling that may not comprise one or more parameters indicating the MCS for the GF UL transmission. The MCS information may be carried by a L1 signaling which activate the GF UL transmission. If a wireless device receives a RRC signaling comprising a MCS for a GF UL transmission, the wireless device may activate the GF UL transmission in response to the RRC signaling without waiting for a L1 signaling.

In an example, if the service does not require high reliability and latency, the L1 activation signaling may be configured to control network resource load and utilization. For a delay sensitive service, the additional activation signaling may cause additional delay and may lead to potential service interruption or unavailability for the period of applying and requesting the activation. In this case, a base station may configure the wireless device with a GF UL transmission such that the GF UL transmission is activated in response to the RRC signaling comprising a GF radio resource configuration and transmission parameters.

In an example, there may be a case that the GF radio resource is over-allocated which may result in the waste of radio resources with few wireless devices. In this case, L1 signaling may be used to reconfigure the GF UL radio resource or one or more GF transmission parameters. By allowing L1 signaling-based reconfiguration, wireless devices may periodically monitor downlink control channel to detect the L1 signaling scrambled by a RNTI that may indicate whether the configured GF radio resources or parameters are changed. This may increase the power consumption of wireless device, and the periodicity to check the downlink control signaling may need to be configurable. In an example, if a radio resource utilization is important, the periodicity may be configured to be short like every 1 minute or every radio frame. If the power consumption is important, the periodicity may be configured to be long like every 1 hour. The periodicity to check downlink control signaling may need to be allowed to be separated from the periodicity of GF UL transmission, e.g., in order to shorten the latency. In an example, the periodicity of GF radio resource may be less than 1 ms like 0.125 ms but the periodicity to check downlink control signaling may be 1 minute or 1 hour. In an example, for deactivating the activated GF operation, L1 deactivation signaling may be used for all services in order to release resources as fast as possible.

For the GF UL transmission, a base station may support a K-repetition of the same transport block (TB) transmission over the GF radio resource pool until one or more conditions are met. The wireless device may continue the repetitions up to K times for the same TB until one of the following conditions is met: If an UL grant (or HARQ ACK/NACK) is successfully received from the base station before the number of repetitions reaches K, the number of repetitions for the TB reaches K, or other termination condition of repetition may apply.

In an example, the number of repetitions, K, may be a configurable parameter that may be wireless device-specific, and/or cell-specific. A mini-slot or a symbol may be a unit of the K-repetition. A base station may configure the number of this repetition and the radio resource in advance via one or more RRC messages. The base station may transmit L1 activation signaling comprising a parameter indicating the number of repetitions K. The base station may assume a set of initial transmission and the repetition as one amount of the transmission. The base station may not be required to prepare the case of only initial transmission or only repetition. One may call the set of initial transmission and its one or more repetitions as an extended TTI. The repetitions may not be necessarily contiguous in time. If the repetitions are contiguous in time, it may allow coherent combining. If the repetitions are not contiguous in time, it may allow time diversity.

In an example, when the GF UL transmission of two wireless devices collides in the same GF radio resource pool, a base station may fail to detect both wireless devices' data. When the two wireless devices retransmit the data without UL grants, the two wireless devices may collide again. In such a case, hopping may to solve the collision problem when radio resources are shared by multiple wireless devices. The hopping may randomize the collision relationship between wireless devices within a certain time interval to avoid persistent collision. It may bring a diversity gain on the frequency domain. A wireless device-specific hopping pattern may be pre-configured or be indicated by RRC signaling or L1 activation signaling. The wireless device-specific hopping pattern may be generated based on a known wireless device-specific ID, e.g., wireless device-specific DMRS index and/or RNTI.

There may be many factors considered for the hopping pattern design, such as the number of resource units (RUs), the max number of wireless devices sharing the same RU, the recently used RU index, the recent hopping index or the current slot index, the information indicating recently used sequence, hopping pattern, or hopping rule. The sequence described above may be a DMRS, a spreading sequence, or a preamble sequence that may be wireless device-specific.

In an example, the repetitions parameter K may be configured by one or more RRC messages, L1 activation signaling, or combination thereof. A wireless device configured with the repetitions parameter K may transmit a transport block (TB) K times. The wireless device may transmit the TB K times with the same redundancy version (RV) or transmit the TB K times with different RVs between the repetition. For example, the RV determination for K repetitions may comprise the initial transmission.

In an example, for the case that the GF UL transmission is activated by one or more RRC messages, the RV determination may be fixed to a pre-defined single value or fixed to a pre-defined RV pattern comprising a plurality of RVs. In an example, the RV determination may be configured by the one or more RRC messages with a single value or a RV pattern comprising a plurality of RVs.

In an example, for the case that the GF UL transmission is (fully or partially) configured by one or more RRC messages and activated by an L1 activation signaling, the RV determination may be fixed to a single value or fixed to a pre-defined RV pattern comprising a plurality of RVs. For the case that the GF UL transmission is (fully or partially) configured by one or more RRC messages and activated by L1 activation signaling, the RV determination may be configured by the one or more RRC messages with a single value or a RV pattern comprising a plurality of RVs. For the case that the GF UL transmission is (fully or partially) configured by one or more RRC messages and activated by L1 activation signaling, the RV determination may be configured by the L1 activation signaling with a single value or fixed to a RV pattern comprising a plurality of RVs.

In example embodiments, the base station may support to switch between GF and GB UL transmissions to balance resource utilization and delay/reliability requirements of associated services. The GF UL transmission may be based on a semi-static resource configuration that may be beneficial to reduce latency. Such a pre-defined resource configuration may be hard to satisfy all potential services or packet sizes. The overhead may be large, and the packet size for a service, such as URLLC, may be variable. If a wireless device's data packet collides with other wireless device's packets in the GF UL transmission, a re-attempt to access GF radio resources may not achieve the service requirements. In such cases, switching from GF to GB UL transmissions may be beneficial.

In example embodiments, to support the switching between GF and GB UL transmissions, the initial transmission on the pre-configured GF radio resources may include wireless device identification (ID), for example, explicit wireless device ID information (e.g. C-RNTI) or implicit wireless device information such as a DMRS cyclic shift (assuming use of ZC sequences) specific signature. To inform a base station of whether the wireless device has remaining data to transmit, the wireless device may include buffer status reporting (BSR) with the initial data transmission. If a base station successfully decodes data transmitted by a wireless device and determines that the wireless device has remaining data to transmit (e.g. from a BSR report), the base station may switch a type of scheduling for wireless device from GF to GB UL transmissions. If a base station fails to decode data transmitted by the wireless device but successfully detects the wireless device ID from the uniquely assigned sequence (e.g., preamble and/or DMRS), the base station may switch a type of scheduling for wireless device from GF to GB UL transmissions. The UL grant for subsequent data transmissions may be with CRC scrambled by the wireless device's RNTI (may be determined either by explicit signaling in the initial transmission or implicitly by the DMRS cyclic shift).

In example embodiments, one of the termination conditions for the K-repetitions may be a reception of a DCI comprising an UL grant which schedules an UL (re)transmission for the same TB. A base station may assign dedicated resources for retransmission in order to ensure the TB to be delivered within the latency budget. This behavior may be classified as scheduling switching from GF to GB operation. In this case, a wireless device may need to link the received grant with the transmitted TB in order to understand which TB to be retransmitted in case there are multiple ongoing transmission processes at the wireless device. For these purposes, the wireless device and base station may have the same notion of TB (and/or RV) counting.

In example embodiments, for the GF operation, the TB counting may not be possible if a base station may not detect one or more TBs due to collisions. In order to make an association between a DCI with a TB, there may be one or more options. If there is no other transmission process at the wireless device side, it may directly associate the DCI with a TB which is being transmitted. If there are at least two different TBs, a wireless device may deduct that the DCI is for a particular TB by applying an implicit linkage assuming only one TB is transmitted in one transmission interval. In this case, if the interval between detected wireless device transmission and a grant is fixed, it may unambiguously determine which TB may be retransmitted. If the timing between a detected transmission and a retransmission grant is not preconfigured, an explicit indication of the retransmitted TB may be carried by DCI. If a wireless device detects that a grant for one TB overlaps with transmission of another ongoing TB, the wireless device may assume precedence of the grant comparing to the grant-free retransmissions. If a grant is received for a new TB (e.g. for aperiodic CSI reporting) and overlaps with the GF UL transmissions, the GF transmissions may be dropped in the resources. Alternatively, a prioritization rule whether to transmit a triggered report or GF data may be introduced depending on priority of the associated services. For example, if URLLC services is assumed, then the CSI reporting may be dropped in this example.

An example embodiment may employ a dedicated pre-assigned channel for early termination. For example, the physical HARQ indicator channel (PHICH) defined in LTE may be employed as an acknowledge indicator. In LTE, the PHICH for a wireless device may be determined based on the physical resource block (PRB) and cyclic shift of the DMRS corresponding to the wireless device's PUSCH transmission. Similar design principle may be employed for a GF UL transmission. The early termination based on PHICH-like channel may improve the control channel capacity and system capacity. If a base station has successfully received a TB, the base station may obtain the corresponding information about the transmission of the TB, such as the wireless device ID, the resource employed for carrying this transmission, the DMRS employed for this transmission. The physical resources may be shared among multiple wireless devices who may have their own unique identifiers (e.g., DMRS) used in the GF radio resource pool. Therefore, even for GF UL transmission, if the base station has successfully received a TB, a unique PHICH may be determined.

In example embodiments, using a sequence based signal may be used for early termination of K-repetition. In this case, a sequence based signal may be transmitted via one or more pre-assigned channels to inform the wireless device to terminate the repetition of transmission. In this case, the signal may be transmitted when a base station successfully decodes a TB. The wireless device may perform a simple signal detection for the presence or absence to decide whether to continue the repetitions or not.

In example embodiments, a base station may switch from GF to GB UL transmissions in order to improve a GF radio resource shortage. In an example, one or more wireless devices whose delay requirements are not strict (e.g., comparing with URLLC requirements) may employ the GF radio resource to transmit a data packet. A base station may measure a level of congestion of the GF UL radio resource shared by a plurality of wireless devices based on statistics, e.g., resource utilization, load, and/or a number of wireless devices sharing the GF UL radio resource and set up a threshold policy to dynamically balance load or resource utilization of the GF UL radio resource. If the resource usage statistic of the GF UL radio resource exceeds the predefined threshold, it may be beneficial to switch some wireless devices from the GF UL radio resource to the GB UL radio resource, which may result in decreasing the resource collision.

For example, a configured grant (Type 1 and/or Type 2) may be activated on an active UL BWP to support a data transmission requiring a low latency (e.g., URLLC data packet). A wireless device and/or a base station may not predict when a data packet arrives. When the data packet arrives, if a wireless device does not have an UL grant, the wireless device may transmit a SR to a base station to request an UL grant for a transmission of the data packet. In response to receiving the SR, the base station may transmit a control message comprising an UL grant for the data packet. For the case of data transmission requiring a low latency, the SR-based UL grant assignment may not satisfy a requirement. In this case the configured grant may help a wireless device and/or a base station such that the data packet may be transmitted without requesting an UL grant.

In an example, a BWP inactivity timer may be (re)started in response to receiving, by a wireless device, a DCI comprising a DL assignment or an UL grant. Restarting a BWP inactivity timer in response to receiving a DCI may be for a wireless device to perform a transmission or a reception on a current active BWP. For example, a wireless device may receive a DCI comprising a DL assignment on a current DL BWP. A wireless device may (re)start BWP inactivity timer to keep monitoring control channel(s) and/or data channel(s) (and/or receiving a PDCCH and/or PDSCH) of the current DL BWP. For example, a wireless device may receive a DCI comprising an UL grant. A wireless device may (re)start BWP inactivity timer to keep monitoring control channel(s) on the current DL BWP to receive (and/or detect) a DCI (e.g., feedback message) corresponding to an UL transmission performed based on the UL grant.

In an example, at least one configured grant may be activated on an UL BWP of a cell. In an example, a wireless device and base station may run a BWP inactivity timer, for example, in response to activating a DL BWP that is not a default BWP. For example, running a BWP inactivity timer (e.g., a DL BWP inactivity timer) may impact an UL transmission on one or more radio resources associated with the at least one configured grant. In existing legacy mechanisms, BWP switching in response to an expiry of a BWP inactivity timer may result in a performance loss and interruption in uplink transmissions. The performance loss may include an increase in latency to (re)activate resource(s) of a configured grant. For example, for a time-division-duplexing system, a DL BWP switching in response to an expiry of a downlink BWP inactivity timer may result in a UL BWP switching. This may be a case that a DL BWP is paired with a UL BWP. If a UL BWP, where a configured grant is activated, is switched to a new UL BWP, a base station may activate a second configured grant on the new UL BWP. For example, a base station may not configure a second configured grant on the new UL BWP. The base station may transmit control message(s) (e.g., RRC, MAC CE, and/or DCI) to a wireless to configure and/or activate a second configured grant on the new UL BWP. For example, in existing mechanisms, a base station and/or wireless device may not be able to fulfill requirement(s) of a latency-sensitive service (e.g., URLLC) with a delay caused by a BWP switching in response to an expiry of a BWP inactivity timer. There is a need for an enhanced BWP inactivity timer management mechanism to reduce delay and increase continuity and efficiency of uplink transmission when configured grant is implemented. Example embodiments implements an improved BWP inactivity timer management mechanism to reduce unnecessary BWP switching when configured grants is implemented.

For a configured grant (Type 1 and/or Type 2), a DCI may not be needed to indicate a periodic resource of the configured grant. For example, a higher layer control message may configure a periodic resource of a configured grant. A wireless device may transmit a data packet via the periodic resource without receiving a DCI. For example, a wireless device may transmit a data packet via the periodic resource without a DCI while a BWP inactivity timer is running. In existing mechanisms, the BWP inactivity timer is (re)started when a wireless device receives a DCI comprising a downlink assignment or an UL grant. Since an UL transmission via a periodic resource of a configured grant (Type 1 and/or Type 2) does not require a DCI indicating an UL grant, a wireless device may not (re)start a BWP inactivity timer. In this case, an active BWP may be switched before receiving a feedback message (e.g., a DCI indicating a NACK) which may cause errors in the base station reception. There is a need for an enhanced BWP inactivity timer management mechanism to reduce error scenarios in uplink transmission when configured grant is implemented. Example embodiments implements an improved BWP inactivity timer management mechanism to reduce errors due to BWP switching.

In legacy mechanisms, switching a BWP (e.g., DL BWP) to a default BWP in response to an expiry of the BWP inactivity timer may happen during UL and/or DL transmissions via at least one configured grants, which may cause a failure of the UL and/or DL transmissions via the at least one configured grant and may results in a delay due to a retransmission process, e.g., via HARQ. For example, switching a BWP (e.g., DL BWP) to a default BWP in response to an expiry of the BWP inactivity timer may require a certain period of time for switching to a new BWP (e.g., retuning RF, measurement gap) during which a wireless device may not transmit and/or receive a data packet to/from a base station. In an example, For a latency-sensitive service, e.g., URLLC, carried by the at least one configured grant, such a period of time for transmission/switching may be a crucial factor to determine whether to meet the service requirements. For example, a traffic carried by the at least one configured grant may require low latency and/or ultra-high reliability, which may not be achieved in a default BWP, e.g., due to a size of narrow bandwidth of the default BWP and/or due to a slot duration of the default BWP. For example, a wireless device and a base station may transmit/receive one or more signals before/after switching a BWP, e.g., CSI-RS, SRS, and/or acknowledge signal to inform of success switching and/or to obtain a channel state information on a switched BWP, which may result in additional power consumption for a wireless device. For example, a base station may active an UL BWP with configured grant Type 1 and/or Type 2 for one or more wireless device for load balancing purpose. For example, keeping one or more radio resources associated with the at least one configured grant on an active BWP other than a default BWP be beneficial for reducing a potential collision and/or for load balancing purpose if the active BWP may be wider than the default BWP. There may be a need for an enhanced BWP inactivity timer management that keeps an active DL BWP with an activated configured grant (Type 1 and/or Type 2) as active for a first period of time. Example embodiments implements an improved BWP inactivity timer management mechanism to increase a duration that a downlink BWP remains active when a configured grant is configured.

Figure 30:
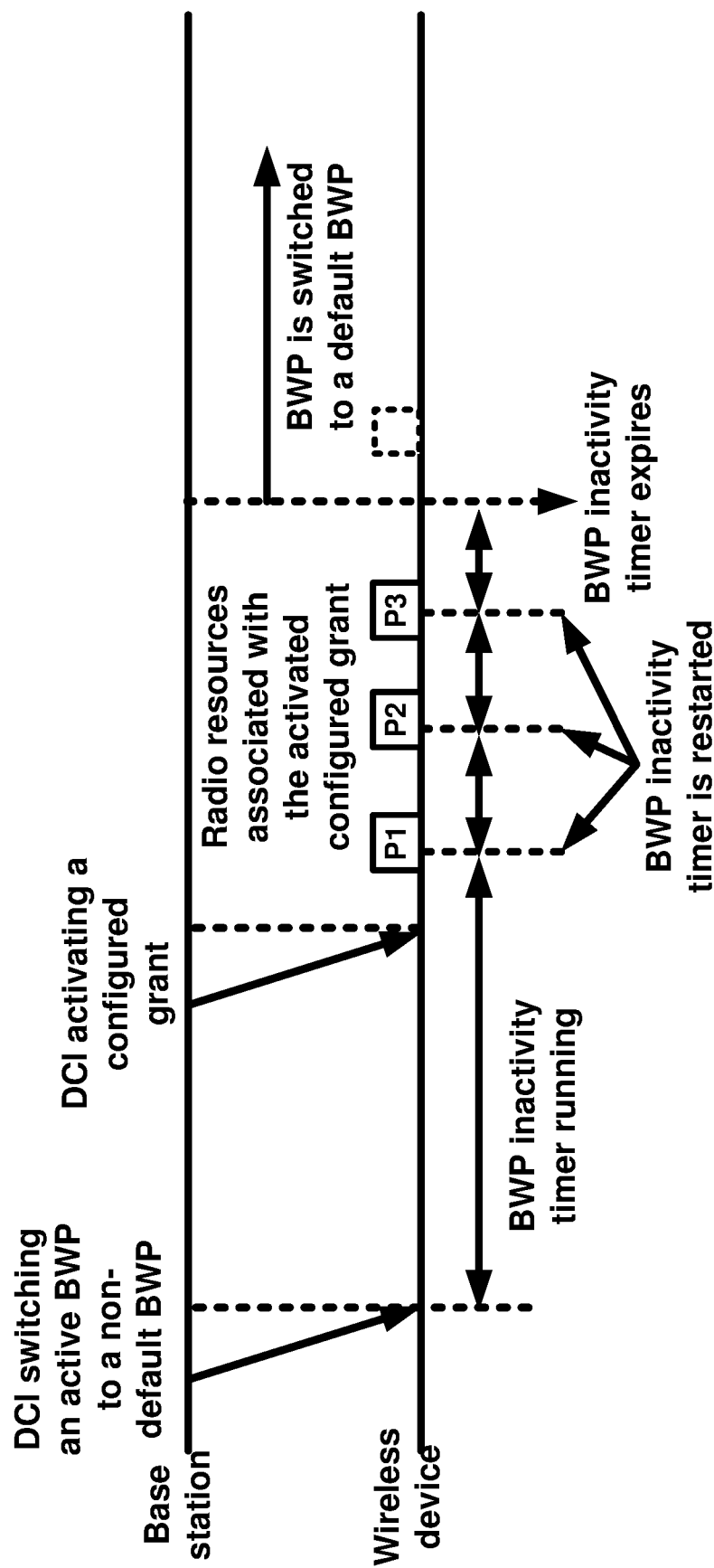
FIG. 30 is example diagrams illustrating scenarios maintaining a BWP inactivity timer as per an aspect of an embodiment of the present disclosure.
Figure 31:
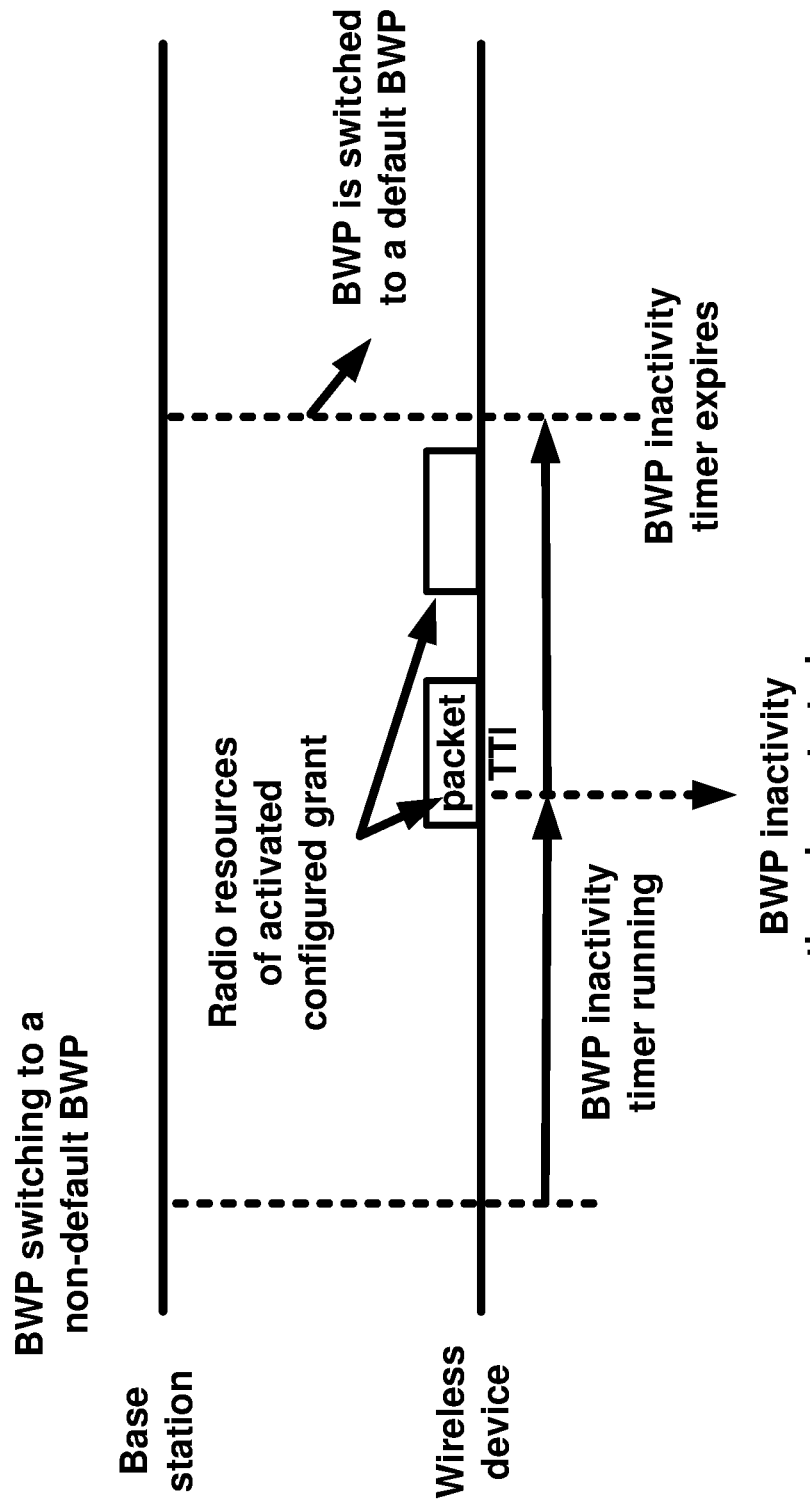
FIG. 31 is example diagrams illustrating scenarios maintaining a BWP inactivity timer as per an aspect of an embodiment of the present disclosure.

In FIG. 30 and FIG. 31, a wireless device may receive at least one message comprising configuration parameters indicating periodic resources of a configured grant of an uplink bandwidth part and a timer value of a bandwidth part inactivity timer of a downlink bandwidth part. The wireless device may start the bandwidth part inactivity timer in response to activating a downlink bandwidth part. The wireless device may restart the bandwidth part inactivity timer in response to transmitting one or more data packets via a first transmission interval of a first resource of the periodic resources of the uplink bandwidth part (without receiving an additional DCI for transmitting the one or more data packets). Example embodiment provides an improved BWP inactivity timer management mechanism that may reduce unnecessary BWP switching (when configured grants is implemented), may reduce errors due to BWP switching, and may increase a duration that a downlink BWP remains active. In an example embodiment, the wireless device maintains a BWP inactivity timer for the downlink bandwidth part when the configured grant is configured for an uplink BWP. The wireless device may enable a BWP inactivity timer for the downlink bandwidth part and may maintain a BWP inactivity timer with a finite timer value. This enhanced BWP inactivity timer management may reduce the possibility of BWP switching while enabling automatic timer based BWP switching for the downlink part when there is no transmission activity or when the configured grant is released/deactivated.

In an example embodiment, an enhanced BWP inactivity timer management mechanism uses uplink configured transmissions for restarting a BWP inactivity timer of a downlink BWP. A downlink BWP inactivity timer is restarted based on uplink transmissions via configured grant in addition to being restarted based on receiving DCIs on the downlink BWP. This enhanced BWP inactivity timer management may reduce unnecessary BWP switching (when configured grants is implemented), may reduce errors due to BWP switching, and may increase a duration that a downlink BWP remains active. In an example, in response to an expiry of the bandwidth part inactivity timer of the downlink BWP, the wireless device may switch from the downlink bandwidth part to a default bandwidth part as an active bandwidth part.

FIG. 30 is example diagram illustrating scenarios for (re)starting a BWP inactivity timer as per an aspect of an embodiment of the present disclosure. A wireless device may activate a uplink configured grant (e.g., Type 1 GF and/or Type 2 GF). For Type 1 GF, a wireless device may activate the Type 1 GF with a first time offset (may be predefined and/or configured by an RRC) in response to receiving RRC message(s) comprising one or more configured grant parameters. For Type 2 GF, as shown in FIG. 30, a wireless device may activate the Type 2 GF with a first time offset (may be predefined and/or configured by an RRC) in response to receiving a DCI indicating an activation indicator of the Type 2 GF. The configuration parameters of the configured grant (Type 1 and/or Type 2) may indicate periodic radio resource allocation (e.g., as shown in FIG. 30) with a periodicity. The wireless device may restart a BWP inactivity timer of a downlink BWP one or more times after an uplink configured grant is activated without receiving a DCI after activation. For example, the wireless device may restart a BWP inactivity timer of a downlink BWP at a time based on at least one of periodic radio resources of the activated configured grant. For example, the wireless device may (re)start one or more times the BWP inactivity timer at one or more different times based on periodic radio resources of the activated configured grant. For example, each of the one or more different times may be within a time duration of at least one of periodic radio resources of the activated configured grant. For example, the wireless device may transmit one or more UL data packet via the at least one of periodic radio resources of the activated configured grant.

FIG. 31 is an example diagram illustrating scenarios (re)starting a BWP inactivity timer of a downlink bandwidth part as per an aspect of an embodiment of the present disclosure. For example, a wireless device may switch an active BWP to a first BWP that is not a default BWP. There may be one or more ways that the wireless device may switch the active BWP. For example, a base station may transmit, to a wireless device, a control message (e.g., RRC message, MAC CE and/or DCI) indicating the BWP switching to a first BWP. For example, the control message may cause reconfiguration of BWP configuration parameters, e.g., the control message may be RRC message(s). For example, the control message may comprise downlink assignment and/or uplink grant, e.g., the control message may be DCI. For example, if a first downlink BWP, that becomes a new active BWP, is not a default BWP, a wireless device may start a BWP inactivity timer in response to BWP switching to the first downlink BWP. While the first downlink BWP is being active (e.g., a BWP inactivity timer is running), there may be one or more resources of one or more configured uplink grants (Type 1 and/or Type 2) configured on an UL BWP. In an example, the one or more configured uplink grants may be preconfigured before a first downlink BWP is activated. In an example, the one or more configured uplink grants may be configured after a first BWP is activated.

Figure 32B:
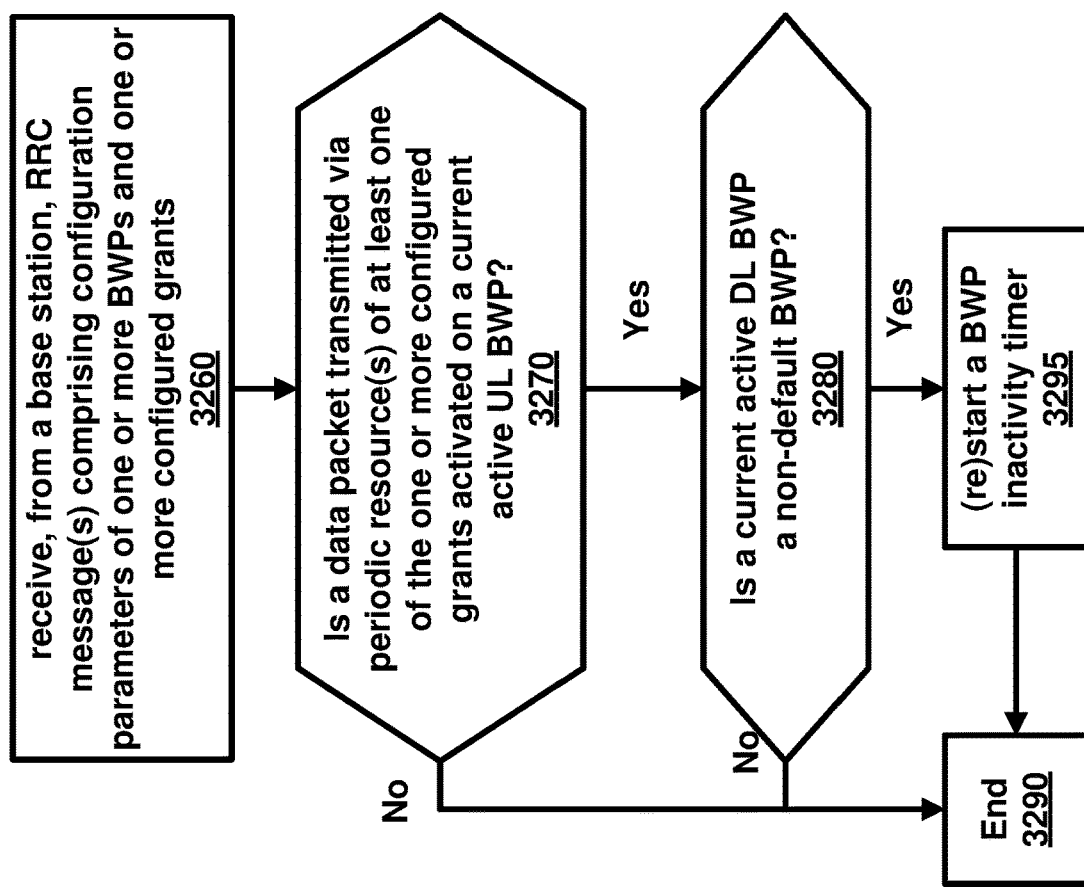
FIG. 32A and FIG. 32B are example flowcharts of BWP inactivity timer management as per an aspect of an embodiment of the present disclosure.
Figure 32A:
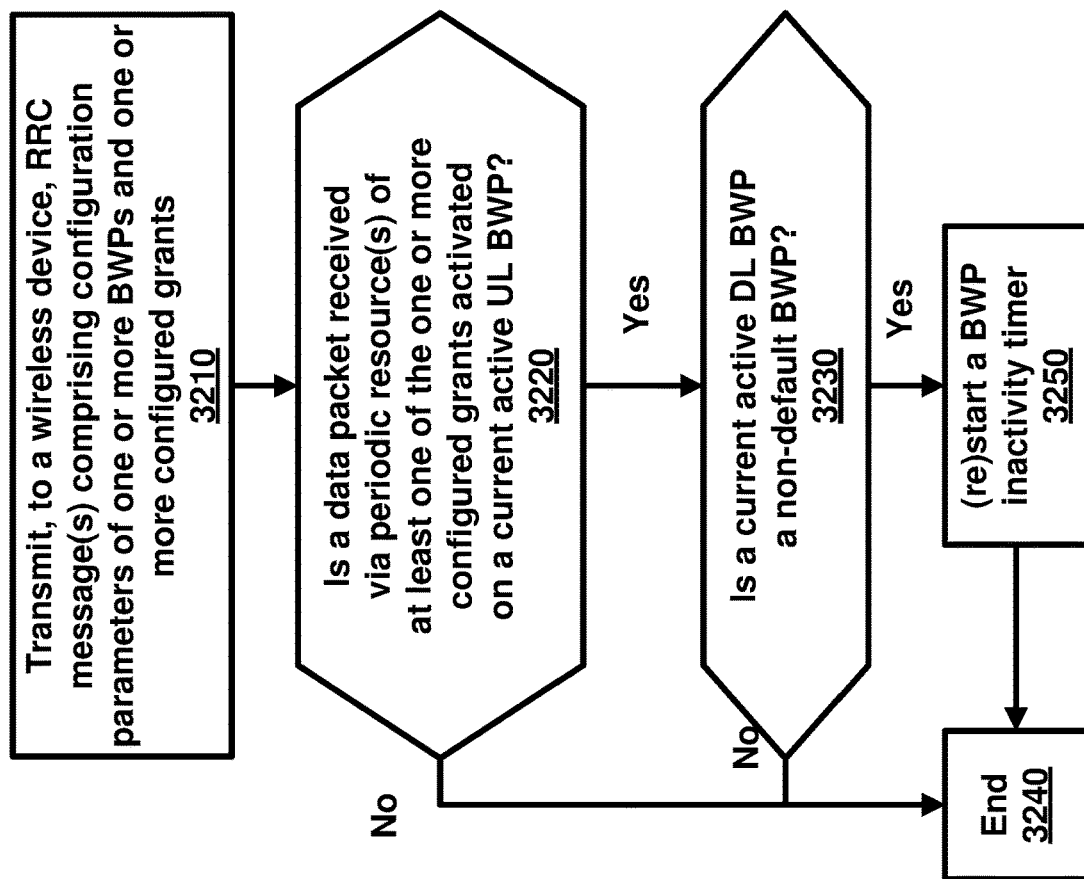

FIG. 32A shows examples of a BWP inactivity timer management of a DL BWP that may be performed by a base station. In FIG. 32A, at step 3210, a base station may transmit, to a wireless device, one or more RRC messages comprising configuration parameters of one or more BWPs and/or one or more uplink configured grants. The base station may activate (and/or (re)initialize) at least one of the one or more uplink configured grants on an active UL BWP. For a Type 1 uplink configured grant, in response to transmitting the one or more RRC messages, the base station may activate (or (re)initialize the at least one of the one or more uplink configured grants. For a Type 2 configured grant, a base station may (re)initialize a periodic resource of at least one of the one or more uplink configured grants and activate the periodic resource in response to transmitting a DCI indicating an activation. The base station may receive a data packet from a wireless device. At step 3220, the base station may determine if the data packet is received via the periodic resource of the at least one of the one or more uplink configured grants or via a resource indicated by a dynamic uplink grant. If the data packet is received via the resource indicated by the dynamic uplink grant, the base station may not maintain a BWP inactivity timer of a DL BWP in response to receiving the data packet, and, for example, the base station may proceed to step 3230. If the data packet is received via the periodic resource of the at least one of the one or more uplink configured grants, the base station may maintain a BWP inactivity timer of a DL BWP in response to receiving the data packet. For example, the base station may (re)start a BWP inactivity timer of a DL BWP in response to an active BWP being a non-default DL BWP at step 3240. For example, the base station may (re)start a BWP inactivity timer of a DL BWP in response to an active BWP being a non-default DL BWP at step 3250.

FIG. 32B shows examples of a BWP inactivity timer management of a DL BWP that may be performed by a wireless device. In FIG. 32B, at step 3260, a wireless device may receive, from a base station, one or more RRC messages comprising configuration parameters of one or more BWPs and/or one or more uplink configured grants. The wireless device may activate (and/or (re)initialize) at least one of the one or more uplink configured grants on an active UL BWP. For a Type 1 uplink configured grant, in response to receiving the one or more RRC messages, the wireless device may activate (or (re)initialize the at least one of the one or more uplink configured grants. For a Type 2 configured grant, a wireless device may (re)initialize a periodic resource of at least one of the one or more uplink configured grants and activate the periodic resource in response to receiving a DCI indicating an activation. The wireless device may transmit a data packet to the base station. At step 3270, the wireless device may determine if the data packet is transmitted via the periodic resource of the at least one of the one or more uplink configured grants or via a resource indicated by a dynamic uplink grant. The wireless device transmits the data packet via the resource indicated by the dynamic uplink grant, the wireless device may not maintain a BWP inactivity timer of a DL BWP in response to transmitting the data packet, and, for example, the wireless device may proceed to step 3280. If the wireless device transmits the data packet is received via the periodic resource of the at least one of the one or more uplink configured grants, the wireless device may maintain a BWP inactivity timer of a DL BWP in response to transmitting the data packet. For example, the wireless device may (re)start a BWP inactivity timer of a DL BWP in response to an active BWP being a non-default DL BWP at step 3290. For example, the wireless device may (re)start a BWP inactivity timer of a DL BWP in response to an active BWP being a non-default DL BWP at step 3295.

In an example embodiment, at least one configured grant may be activated via L1/L2 signaling (e.g., MAC CE and/or DCI in PDCCH). For example, SPS (UP SPS and/or DL SPS) may be activated via MAC CE and/or DCI. For example, Type 2 GF transmission/scheduling may be activated via DCI. For example, the activation may be performed via a RRC message/signaling. For example, a wireless device may activate Type 1 GF transmission/scheduling in response to receiving one or more RRC messages/signaling. The one or more RRC messages/signaling may indicate one or more transmission/scheduling parameters of the Type 1 GF transmission/scheduling. The one or more RRC messages/signaling may cause a wireless device to configure the Type 1 GF transmission/scheduling.

In an example embodiment, for a wireless device configured with at least one SPS and/or Type 2 GF transmission/scheduling on an uplink BWP in a cell, a BWP inactivity timer of an active DL BWP on the cell may be disabled (not run, or stop) during a period of time when at least one of the at least one SPS and/or Type 2 GF transmission/scheduling is activated. For example, if a wireless device receives a first MAC CE and/or DCI indicating an activation of at least one of the at least one SPS and/or Type 2 GF transmission/scheduling, the BWP inactivity timer may be disabled in response to receiving the first MAC CE and/or DCI. For example, if the wireless device receives a second MAC CE and/or DCI indicating a deactivation of the at least one of the at least one SPS and/or Type 2 GF transmission/scheduling, the BWP inactivity timer may be (re)started in response to receiving the second MAC CE and/or DCI. For example, if at least one of SPS, Type 2 GF, and Type 1 GF transmission/scheduling on the cell is activated, the BWP inactivity timer may remain disabled. For example, a wireless device may restart the BWP inactivity timer in response to receiving the second control message (e.g., MAC CE and/or DCI) deactivating at least one of SPS, Type 2 GF, or Type 1 GF Type 1 GF transmission/scheduling.

In an example embodiment, for a wireless device configured with at least one SPS and/or Type 2 GF transmission/scheduling on an uplink BWP in a cell, a BWP inactivity timer of an active DL BWP on the cell may be set to infinite during a period of time when at least one of the at least one SPS and/or Type 2 GF transmission/scheduling is activated. For example, if a wireless device receives a first MAC CE and/or DCI indicating an activation of at least one of the at least one SPS and/or Type 2 GF transmission/scheduling, the BWP inactivity timer may be set to infinite in response to receiving the first MAC CE and/or DCI. For example, if the wireless device receives a second MAC CE and/or DCI indicating a deactivation of the at least one of the at least one SPS and/or Type 2 GF transmission/scheduling, the BWP inactivity timer may be (re)started in response to receiving the second MAC CE and/or DCI. For example, if at least one of SPS, Type 2 GF, or Type 1 GF transmission/scheduling on the cell is activated, the BWP inactivity timer may remain infinite. For example, a wireless device may (re)start the BWP inactivity timer in response to receiving the second MAC CE and/or DCI deactivating at least one of SPS, Type 2 GF, or Type 1 GF Type 1 GF transmission/scheduling on the cell is not activated.

In an example embodiment, a wireless device may (re)start a BWP inactivity timer of an active DL BWP on the cell one or more times during a period of time when at least one of the at least one Type 1 GF transmission/scheduling and/or Type 2 GF transmission/scheduling is activated. For example, an active DL BWP (e.g., a current active DL BWP) may not be a default bandwidth part. A wireless device may maintain a BWP inactivity timer one or more times while the active BWP (e.g., a current active DL BWP) is being activated. For example, if a wireless device receives a first MAC CE and/or DCI indicating an activation of at least one of the at least one SPS and/or Type 2 GF transmission/scheduling, a wireless device may (re)start a BWP inactivity timer in response to receiving the first MAC CE and/or DCI. For example, a wireless device may (re)start a BWP inactivity timer of an active DL BWP at a TTI where one or more radio resources associated with at least one of at least one SPS and/or Type 2 GF transmission/scheduling are assigned/allocated. For example, a wireless device may transmit one or more data packet via the TTI.

For example, if a wireless device receives a MAC CE and/or DCI indicating a deactivation of the one of the at least one SPS and/or Type 2 GF transmission/scheduling, the wireless device may keep a BWP inactivity timer to run without (re)starting in response to receiving the MAC CE and/or DCI. For example, if at least one of SPS, Type 2 GF, or Type 1 GF transmission/scheduling is activated, a wireless device may keep running a BWP inactivity timer, independent of receiving the MAC CE and/or DCI.

In an example embodiment, a wireless device may disable (or may stop, or may not run) a BWP inactivity timer of an active DL BWP on the cell during a period of time when the at least one Type 1 GF transmission/scheduling is activated. For example, a wireless device may receive at least one first RRC message/signaling indicating an activation of at least one of the at least one Type 1 GF transmission/scheduling. A wireless device may disable a BWP inactivity timer of a DL BWP with a first time offset in response to receiving the at least one RRC message/signaling. In an example, a wireless device may receive, from a base station, the at least one first RRC message/signaling comprising the first time offset. In an example, the first time offset may be predefined. For example, if the wireless device receives at least one second RRC message/signaling indicating a deactivation of the at least one of the at least one Type 1 GF transmission/scheduling, the wireless device may (re)started the BWP inactivity timer with a second time offset in response to receiving the second at least one RRC message/signaling. In an example, the at least one second RRC message/signaling comprise the second time offset. In an example, the second time offset may be predefined.

In an example embodiment, a wireless device may set a BWP inactivity timer of an active DL BWP to infinity during a period of time when the at least one Type 1 GF transmission/scheduling is activated for a cell. For example, a wireless device may receive at least one first RRC message/signaling that may cause a wireless device to activate at least one Type 1 GF transmission/scheduling. The wireless device may set the BWP inactivity timer to infinity with a first time offset in response to receiving the at least one RRC message/signaling. In an example, the at least one first RRC message/signaling comprise the first time offset. In an example, the first time offset may be predefined. For example, a wireless device may receive at least one second RRC message/signaling that may cause the wireless device to deactivate the at least one of the at least Type 1 GF transmission/scheduling. The wireless device may (re)start the BWP inactivity timer with a second time offset in response to receiving the at least one second RRC message/signaling. In an example, the at least one second RRC message/signaling comprise the second time offset. In an example, the second time offset may be predefined.

In an example embodiment, a wireless device may (re)start a BWP inactivity timer of an active DL BWP one or more times during a period of time when the at least one Type 1 GF transmission/scheduling is activated. For example, an active BWP (e.g., a current active DL BWP) may not be a default bandwidth part. For example, a wireless device may receive at least one first RRC message/signaling that may cause the wireless device to activate at least one Type 1 GF transmission/scheduling. The wireless device may (re)start a BWP inactivity timer with a first time offset in response to receiving the at least one RRC message/signaling. In an example, the at least one first RRC message/signaling comprise the first time offset. In an example, the first time offset may be predefined. A wireless device may (re)start a BWP inactivity timer of an active DL BWP on the cell at a TTI where one or more radio resources associated with the at least one of the at least one Type 1 GF transmission/scheduling are assigned/allocated. For example, a wireless device may transmit one or more data packet via the TTI.

Figure 33:
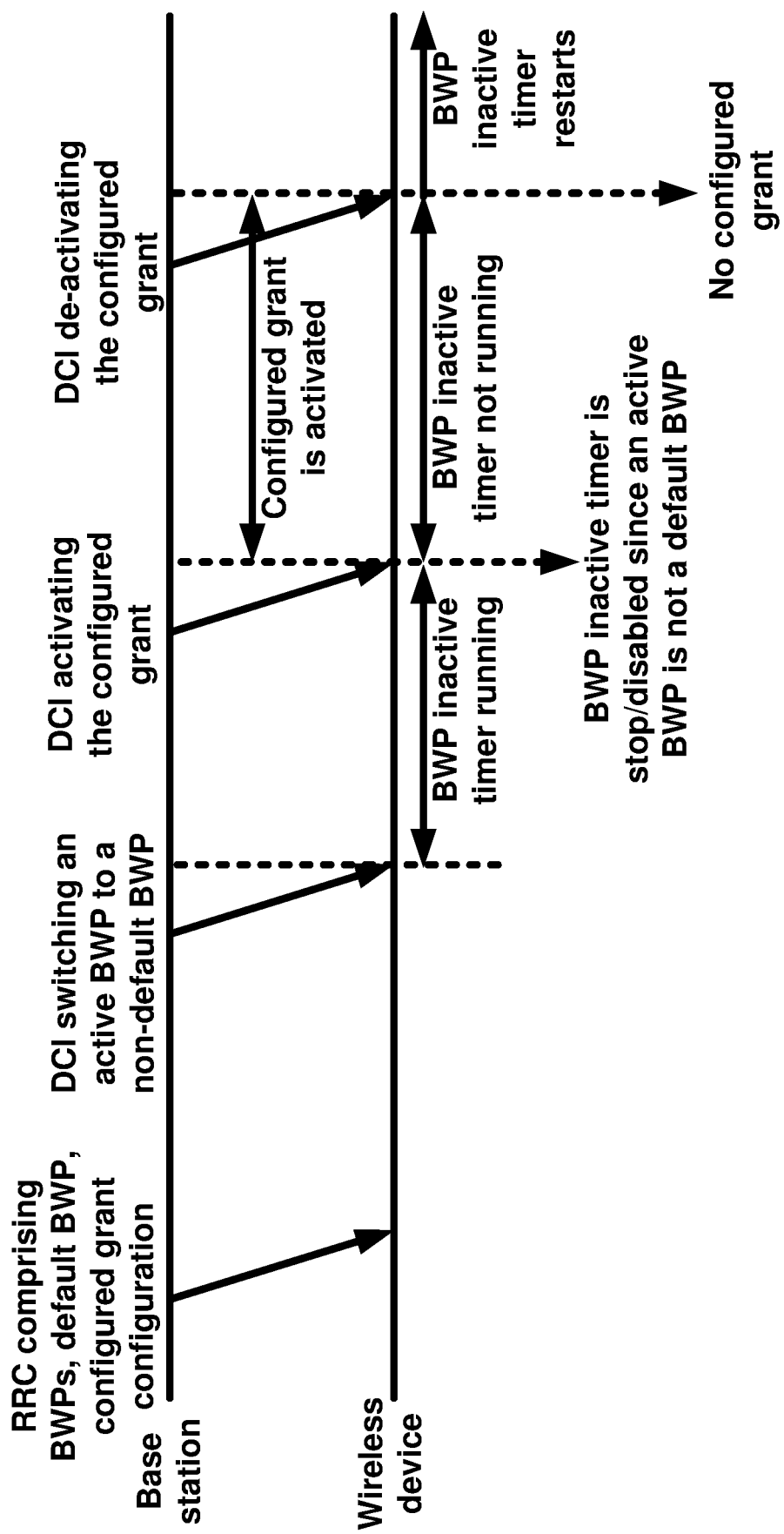
FIG. 33 is example diagrams illustrating scenarios maintaining a BWP inactivity timer as per an aspect of an embodiment of the present disclosure.

For example, there may be one or more ways that a wireless device may maintain a BWP inactivity timer in response to receiving a control message indicating a deactivation of activated configured grant. For example, a wireless device may receive at least one second RRC message/signaling that may cause the wireless device to deactivate at least Type 1 GF transmission/scheduling. The wireless device may (re)start a BWP inactivity timer of an active DL BWP with a second time offset in response to receiving the second at least one RRC message/signaling. In an example, the at least one second RRC message/signaling comprise the second time offset. In an example, the second time offset may be predefined. For example, the wireless device may keep running the BWP inactivity timer without (re)starting in response to receiving the second at least one RRC message/signaling. For example, a wireless device FIG. 33 is example diagrams illustrating scenarios starting a BWP inactivity timer as per an aspect of an embodiment of the present disclosure. In FIG. 33, a wireless device may start an BWP inactivity timer in response to receiving a DCI switching an active BWP to a non-default BWP. The timer may stop or be disabled in response to receiving a DCI activating the configured grant (SPS or Type 2 GF). During the time where the configured grant is activated, the timer may not run. The wireless device may restart the time in response to receiving a DCI deactivating the activated configured grant when there is no other configured grant.

Figure 34:
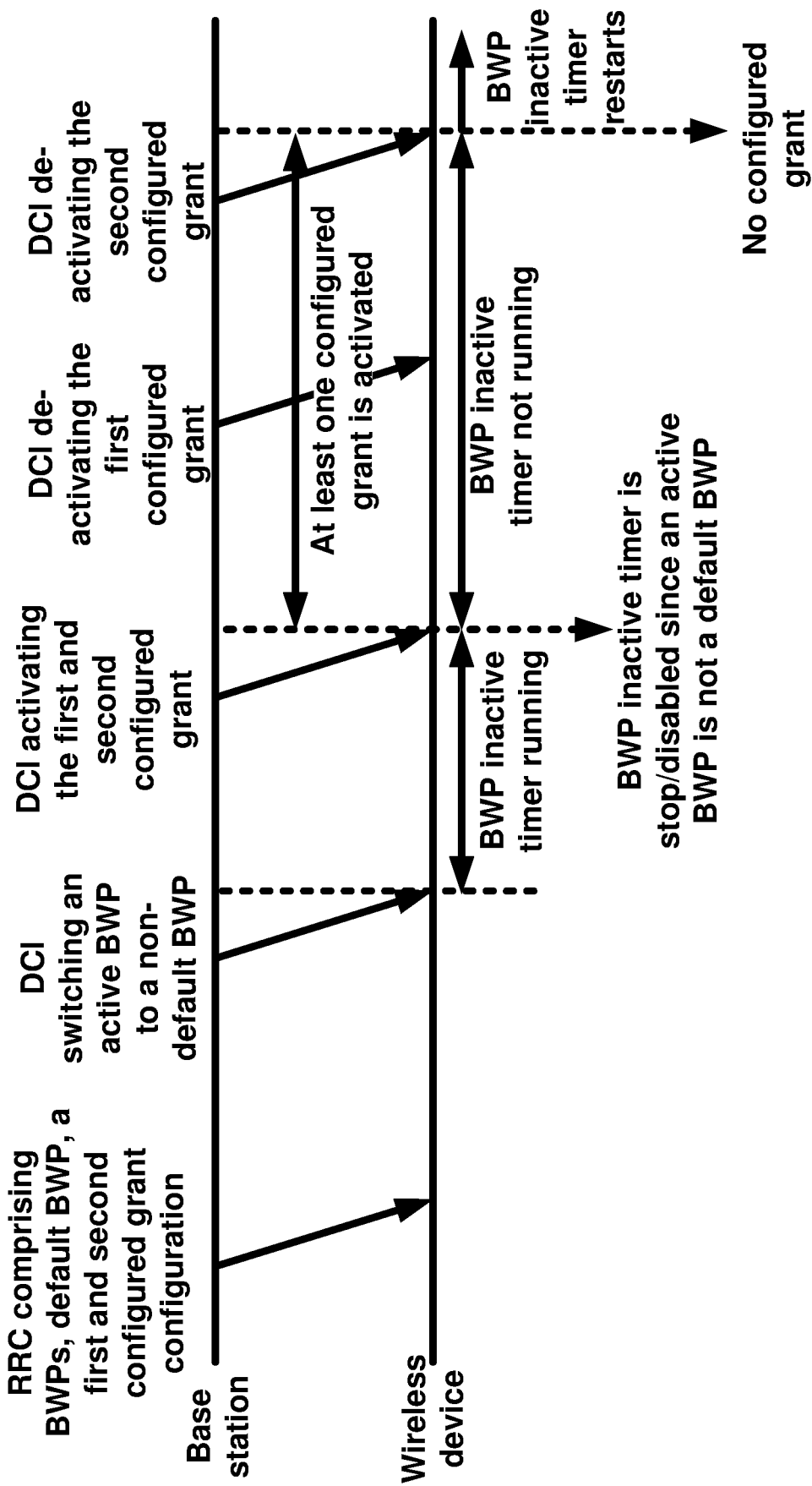
FIG. 34 is example diagrams illustrating scenarios maintaining a BWP inactivity timer as per an aspect of an embodiment of the present disclosure.

FIG. 34 is example diagrams illustrating scenarios starting a BWP inactivity timer as per an aspect of an embodiment of the present disclosure In FIG. 34, a wireless device may receive one or more RRC message/signaling configured a first and second configured grants. The wireless device may start an BWP inactivity timer in response to receiving a DCI switching an active BWP to a non-default BWP. The timer may stop or be disabled in response to receiving a DCI activating at least one of the first and second configured grants (SPS or Type 2 GF). During the time where the at least one of the configured grants is activated, the timer may not run. For example, the wireless device may not restart the timer when the first configured grant is deactivated via a DCI if the second configured grant is activated. The wireless device may restart the time in response to receiving a DCI deactivating the activated configured grant when there is no other configured grant.

Figure 35:
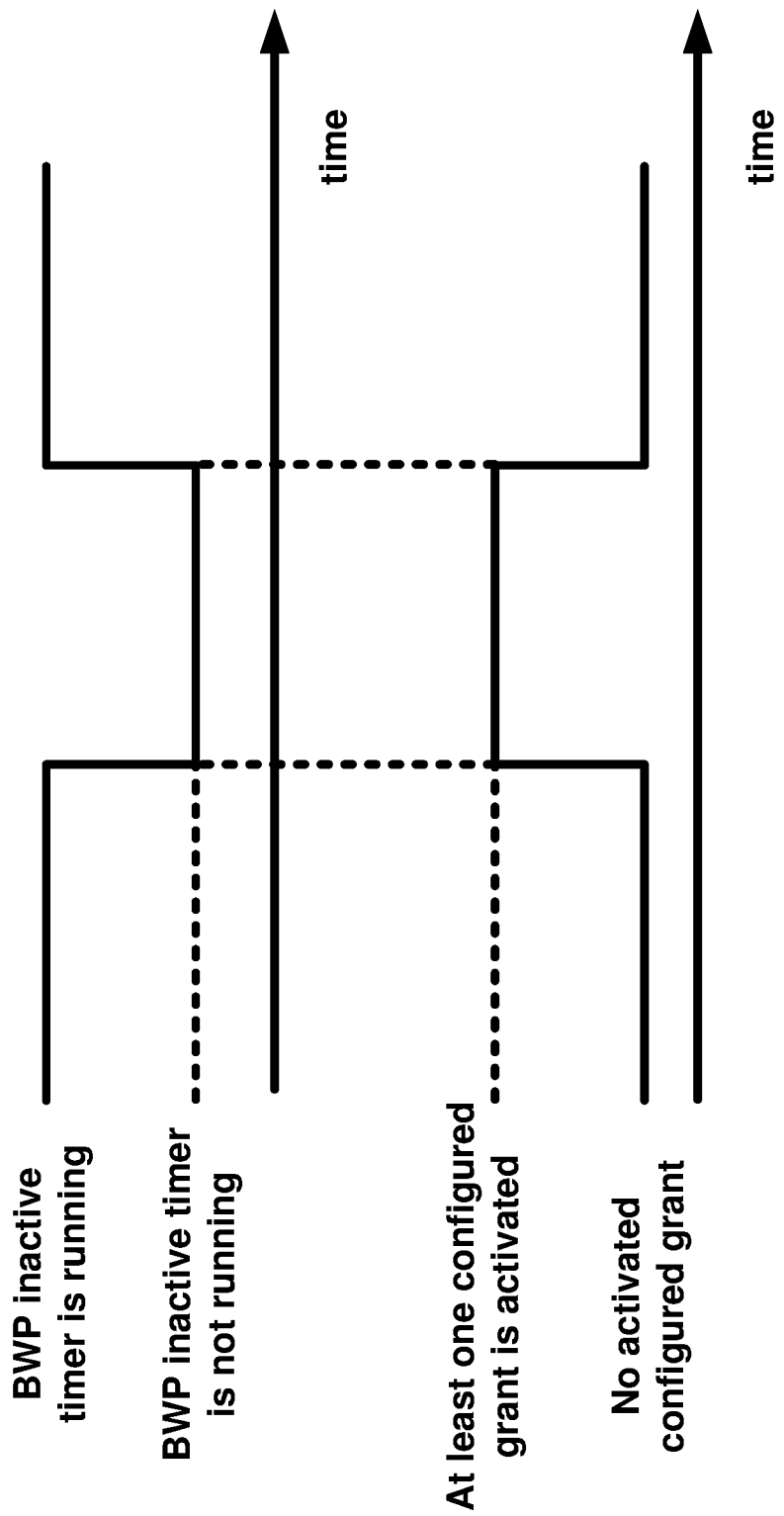
FIG. 35 is example diagrams illustrating scenarios maintaining a BWP inactivity timer as per an aspect of an embodiment of the present disclosure.

FIG. 35 is example diagrams illustrating scenarios starting a BWP inactivity timer as per an aspect of an embodiment of the present disclosure In FIG. 35, a wireless device and/or base station may start and/or stop (disable) a BWP inactivity timer depending on activation/deactivation state of one or more configured grants. For example, if there is at least one configured grant on a cell is activated, the timer may be running if an active BWP is not a default BWP. For example, if there is no activated configured grant on the cell, the timer may be independent of the activation/deactivation state of the configured grant.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 36:
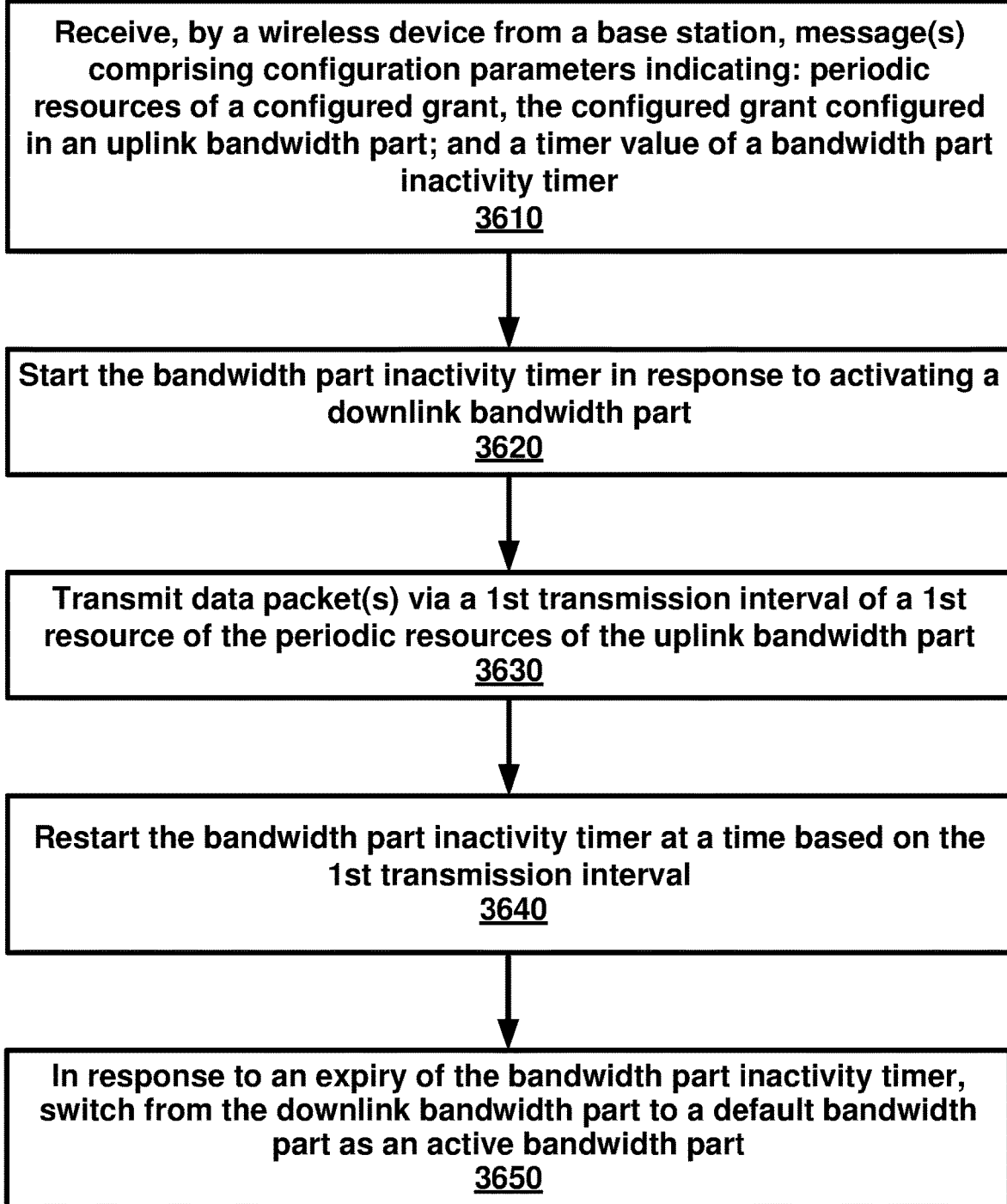
FIG. 36 may be an example flow diagram as per an aspect of an embodiment of the present disclosure.

FIG. 36 is an example flow diagram as per an aspect of an embodiment of the present disclosure. At 3610, a wireless device may receive at least one message from a base station. The at least one message may comprise configuration parameters. The configuration parameters may indicate periodic resources of a configured grant. The configured grant may be configured in an uplink bandwidth part. The configuration parameters may indicate a timer value of a bandwidth part inactivity timer. At 3620, the bandwidth part inactivity timer may be started in response to activating a downlink bandwidth part. At 3630, one or more data packets may be transmitted via a first transmission interval of a first resource of the periodic resources of the uplink bandwidth part. At 3640, the bandwidth part inactivity timer may be restarted at a time based on the first transmission interval. At 3650, in response to an expiry of the bandwidth part inactivity timer, the wireless device may switch from the downlink bandwidth part to a default bandwidth part as an active bandwidth part.

According to an example embodiment, the downlink bandwidth part may be paired with the uplink bandwidth part. According to an example embodiment, the switching the active bandwidth part from the downlink bandwidth part to the default bandwidth part may comprise an activation of the default bandwidth part. According to an example embodiment, the switching of the active bandwidth part from the downlink bandwidth part to the default bandwidth part may comprise a deactivation of the downlink bandwidth part. According to an example embodiment, the configured grant may be a configured grant Type 1. According to an example embodiment, the configured grant may be a configured grant Type 2. According to an example embodiment, the downlink bandwidth part may be a non-default bandwidth part. According to an example embodiment, the configuration parameters may indicate a first subcarrier spacing of the uplink bandwidth part. The configuration parameters may indicate a first cyclic prefix of the uplink bandwidth part. The configuration parameters may indicate a first number of first contiguous physical radio resource blocks of the uplink bandwidth part. The configuration parameters may indicate a first offset of a first physical radio resource block of the first contiguous physical radio resource blocks.

According to an example embodiment, he configured grant of the uplink bandwidth part may be deactivated in response to deactivating the uplink bandwidth part. According to an example embodiment, the configuration parameters may indicate a second subcarrier spacing of the default bandwidth part. The configuration parameters may indicate a second cyclic prefix of the default bandwidth part. The configuration parameters may indicate a second number of second contiguous physical radio resource blocks of the default bandwidth part. The configuration parameters may indicate a second offset of a second physical radio resource block of the second contiguous physical radio resource blocks.

According to an example embodiment, a first downlink control information may be received. The first downlink control information may comprise an uplink grant. According to an example embodiment, the first downlink control information may comprise a first identifier indicating the uplink bandwidth part. According to an example embodiment, the uplink grant may indicate a second resource of the uplink bandwidth part. According to an example embodiment, a second downlink control information may be received. The second downlink control information may comprise a second identifier indicating the downlink bandwidth part. According to an example embodiment, the second downlink control information may comprise a downlink assignment.

According to an example embodiment, the active bandwidth part may be switched to the downlink bandwidth part. According to an example embodiment, the switching of the active bandwidth part to the downlink bandwidth part may comprise the activating the downlink bandwidth part.

According to an example embodiment, the configuration parameters may indicate a radio network temporary identifier of the configured grant. The configuration parameters may indicate a periodicity of the periodic resources. According to an example embodiment, the configuration parameters may indicate a time offset of a resource of the periodic resources with respect to a first system frame number. According to an example embodiment, the first system frame number may be zero.

FIG. 37 is an example flow diagram as per an aspect of an embodiment of the present disclosure. At 3710, a wireless device may receive at least one message from a base station. The at least one message may comprise configuration parameters indicating periodic resources of a configured grant. The configured grant may be configured for an uplink bandwidth part. At 3720, a bandwidth part inactivity timer may be started in response to activation of a downlink bandwidth part. At 3730, one or more data packets may be transmitted via a first transmission interval of a first resource of the periodic resources of the uplink bandwidth part. At 3740, the bandwidth part inactivity timer may be restarted at a time based on the first transmission interval. According to an example embodiment, further comprising switching an active bandwidth part from the downlink bandwidth part to a default bandwidth part in response to an expiry of the bandwidth part inactivity timer.

Figure 38:
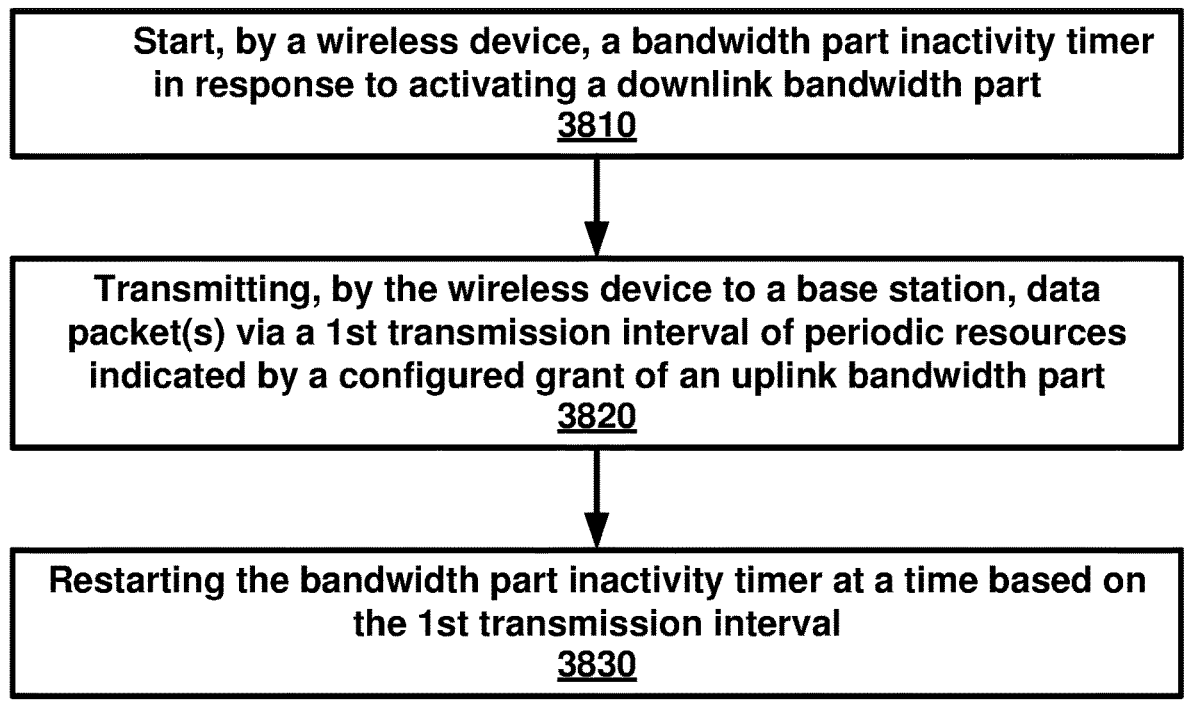
FIG. 38 may be an example flow diagram as per an aspect of an embodiment of the present disclosure.

FIG. 38 may be an example flow diagram as per an aspect of an embodiment of the present disclosure. At 3810, a wireless device may start a bandwidth part inactivity timer in response to activating a downlink bandwidth part. At 3820, the wireless device may transmit one or more data packets to a base station via a first transmission interval of periodic resources indicated by a configured grant of an uplink bandwidth part. At 3830, the bandwidth part inactivity timer may be restarted at a time based on the first transmission interval. According to an example embodiment, the wireless device may receive at least one message from the base station. The at least one message may comprise configuration parameters of the periodic resources of the configured grant. According to an example embodiment, an active bandwidth part may be switched from the downlink bandwidth part to a default bandwidth part in response to an expiry of the bandwidth part inactivity timer.

FIG. 39 is an example flow diagram as per an aspect of an embodiment of the present disclosure. At 3910, a base station may start a bandwidth part inactivity timer for a wireless device in response to a downlink bandwidth part being an active bandwidth part for the wireless device. At 3920, the base station may receive one or more data packets from the wireless device via a first transmission interval of periodic resources indicated by a configured grant of an uplink bandwidth part. At 3930, the bandwidth part inactivity timer may be restarted at a time based on the first transmission interval.

According to an example embodiment, a second state of the downlink bandwidth part may be switched to an active state for the wireless devices. According to an example embodiment, the downlink bandwidth part may be paired with the uplink bandwidth part. According to an example embodiment, the configured grant may be a configured grant Type 1. According to an example embodiment, the configured grant may be a configured grant Type 2. According to an example embodiment, the downlink bandwidth part may be a non-default bandwidth part. According to an example embodiment, the configured grant may be switched to a deactivation state in response to switching the uplink bandwidth part to an inactive state.

According to an example embodiment, device in response to an expiry of the bandwidth part inactivity timer, a state of a default bandwidth part may be switched to an active state for the wireless. According to an example embodiment, the state of the default bandwidth part switching to the active state may comprise switching a second state of the downlink bandwidth part to an inactive state.

According to an example embodiment, a first downlink control information may be transmitted to the wireless device. The first downlink control information may comprise an uplink grant for the wireless device. According to an example embodiment, the first downlink control information may comprise a first identifier indicating the uplink bandwidth part. According to an example embodiment a second downlink control information may be transmitted to the wireless device. The second downlink control information may comprise a second identifier indicating the downlink bandwidth part. According to an example embodiment, the second downlink control information may comprise a downlink assignment. According to an example embodiment, in response to the transmitting the second downlink control information, a second state of the downlink bandwidth part may be switched to an active state for the wireless device.

According to an example embodiment, the base station may transmit at least one message to the wireless device. The at least one message may comprise configuration parameters of the periodic resources of the configured grant for the wireless device. According to an example embodiment, the configuration parameters may indicate a first subcarrier spacing of the uplink bandwidth part. The configuration parameters may indicate a first cyclic prefix of the uplink bandwidth part. The configuration parameters may indicate a first number of first contiguous physical radio resource blocks of the uplink bandwidth part. The configuration parameters may indicate a first offset of a first physical radio resource block of the first contiguous physical radio resource blocks. The configuration parameters may indicate a radio network temporary identifier of the configured grant. The configuration parameters may indicate a periodicity of the periodic resources. The configuration parameters may indicate a time offset of a resource of the periodic resources with respect to a first system frame number. According to an example embodiment, the first system frame number may be zero. According to an example embodiment, The configuration parameters may indicate a second subcarrier spacing of a default bandwidth part. The configuration parameters may indicate a second cyclic prefix of the default bandwidth part. The configuration parameters may indicate a second number of second contiguous physical radio resource blocks of the default bandwidth part. The configuration parameters may indicate a second offset of a second physical radio resource block of the second contiguous physical radio resource blocks.

Figure 40:
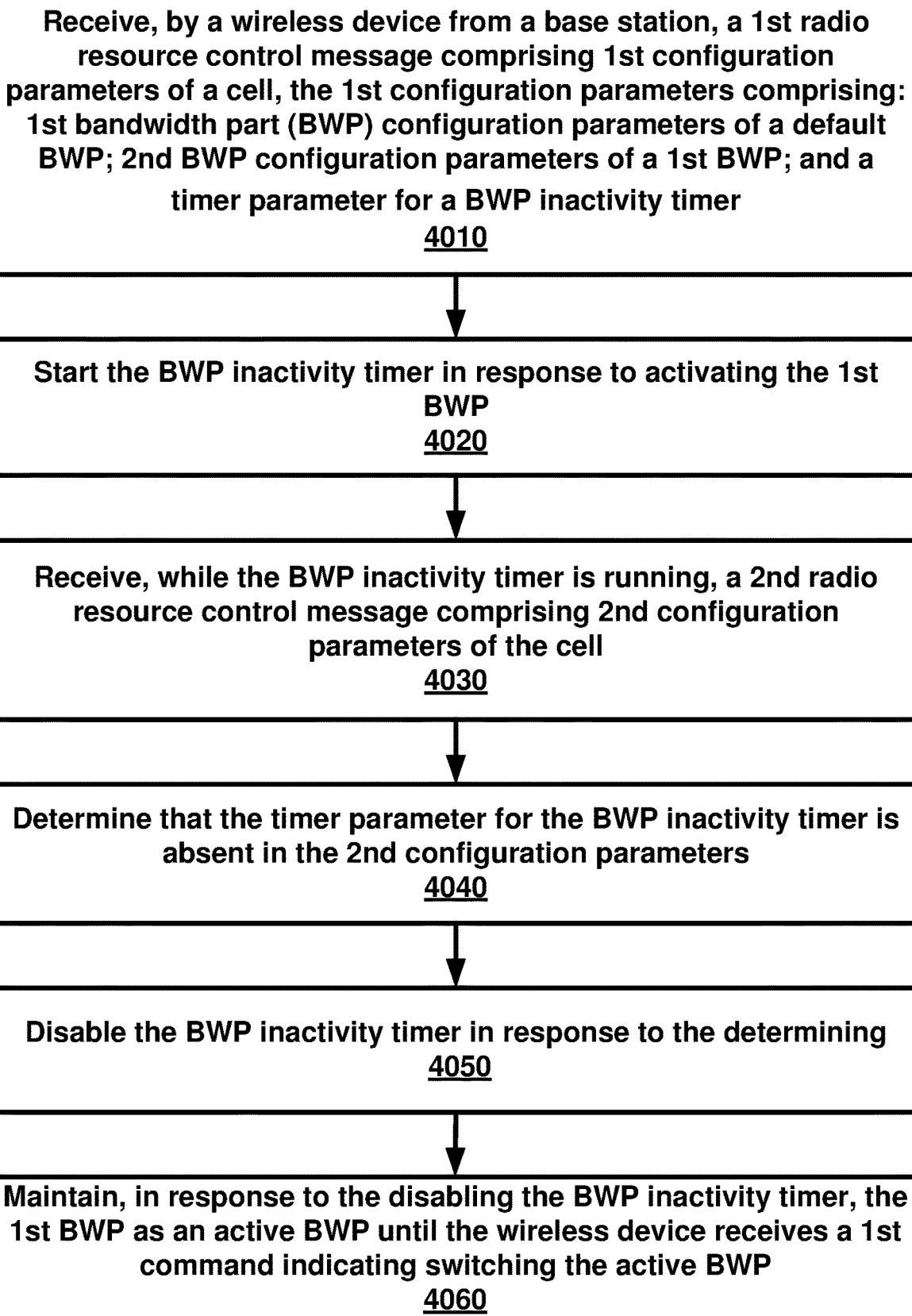
FIG. 40 may be an example flow diagram as per an aspect of an embodiment of the present disclosure.

FIG. 40 is an example flow diagram as per an aspect of an embodiment of the present disclosure. At 4010, a wireless device may receive a first radio resource control message from a base station. The first radio resource control message may comprise first configuration parameters of a cell. The first configuration parameters may comprise first bandwidth part (BWP) configuration parameters of a default BWP. The first configuration parameters may comprise second BWP configuration parameters of a first BWP. The first configuration parameters may comprise a timer parameter for a BWP inactivity timer. At 4020, the BWP inactivity timer may be started in response to activating the first BWP. At 4030, may receive a second radio resource control message while the BWP inactivity timer is running. The second radio resource control message may comprise second configuration parameters of the cell. At 4040, a determination may be made that the timer parameter for the BWP inactivity timer is absent in the second configuration parameters. At 4050, the BWP inactivity timer may be disabled in response to the determination. At 4060, in response to the disabling the BWP inactivity timer, the first BWP may be maintained as an active BWP until the wireless device receives a first command indicating switching the active BWP.

According to an example embodiment, the cell may be a primary cell of a plurality of cells. According to an example embodiment, the cell may be a secondary cell of a plurality of cells. According to an example embodiment, the first BWP configuration parameters may indicate a frequency location. The first BWP configuration parameters may indicate a bandwidth. The first BWP configuration parameters may indicate a value of subcarrier spacing. The first BWP configuration parameters may indicate a cyclic prefix. The first BWP configuration parameters may indicate one or more reference signal resource configuration. According to an example embodiment, a first downlink control information (DCI) may be received. The first DCI may indicate downlink assignments or uplink grants on the first BWP. The first BWP may be activated in response to receiving the first DCI. According to an example embodiment, the activating of the first BWP may comprise monitoring a downlink control channel of the first BWP. According to an example embodiment, the maintaining of the first BWP as the active BWP may comprise monitoring a downlink control channel of the first BWP. The maintaining of the first BWP as the active BWP may comprise receiving data packets based on a downlink control information received on a downlink control channel. According to an example embodiment, data packets may be received on the first BWP without switching to the default BWP. According to an example embodiment, a downlink control channel may be monitored on the first BWP in response to maintaining the first BWP as the active BWP. According to an example embodiment, the disabling of the BWP inactivity timer may comprise stopping the BWP inactivity timer.

According to an example embodiment, the wireless device may activate the first BWP in response to receiving a second command indicating an activation of the cell. According to an example embodiment, the second command may comprise a medium access control control element. The second command may comprise a downlink control information.

According to an example embodiment, the first command may comprise a downlink control information. According to an example embodiment, the downlink control information may indicate switching from the first BWP to a second BWP as an active BWP. According to an example embodiment, the second BWP may be different from the default BWP.

According to an example embodiment, the wireless device may activate the first BWP in response to receiving one or more signals. According to an example embodiment, the one or more signals may comprise a power control command parameter. The one or more signals may comprise a CSI reporting indication. According to an example embodiment, the one or more signals may comprise downlink control resource set parameters. The one or more signals may comprise uplink control channel resource set parameters. According to an example embodiment, the one or more signals may comprise sounding reference signal transmission commands. The one or more signals may comprise beam management parameters. According to an example embodiment, the one or more signals may comprise a downlink control information indicating an activation of a secondary cell.

Figure 41:
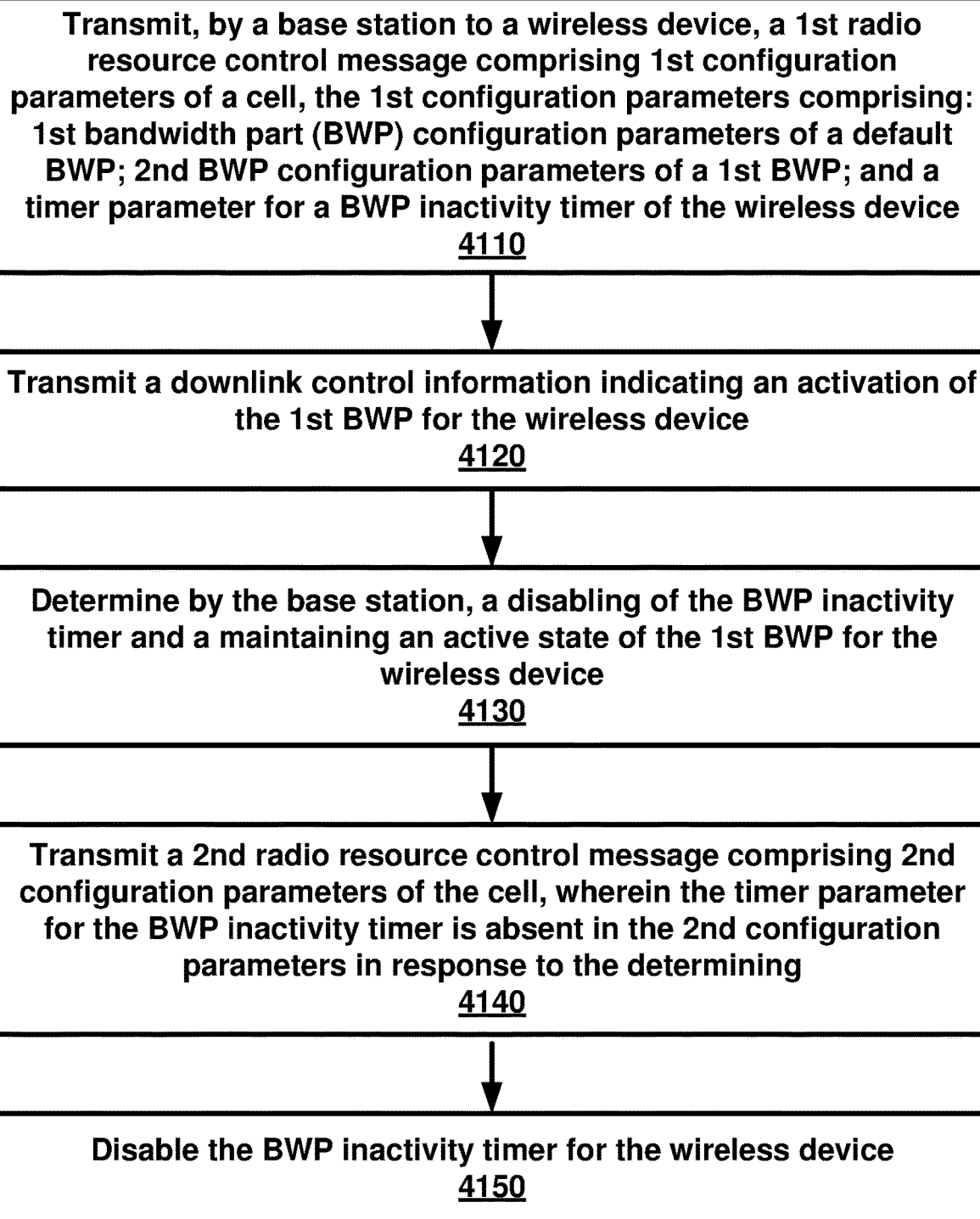
FIG. 41 may be an example flow diagram as per an aspect of an embodiment of the present disclosure.

FIG. 41 is an example flow diagram as per an aspect of an embodiment of the present disclosure. At 4110, a base station may transmit a first radio resource control message to a wireless device. The first radio resource control message may comprise first configuration parameters of a cell. The first configuration parameters comprise first bandwidth part (BWP) configuration parameters of a default BWP. The first configuration parameters comprise second BWP configuration parameters of a first BWP. The first configuration parameters comprise a timer parameter for a BWP inactivity timer of the wireless device. At 4120, a downlink control information may be transmitted. The downlink control information may indicate an activation of the first BWP for the wireless device. At 4130, the base station may determine a disabling of the BWP inactivity timer and a maintaining an active state of the first BWP for the wireless device. At 4140, a second radio resource control message may be transmitted. The second radio resource control message may comprise second configuration parameters of the cell. The timer parameter for the BWP inactivity timer may be absent in the second configuration parameters in response to the determination. At 4150, the BWP inactivity timer for the wireless device may be disabled.

Figure 42:
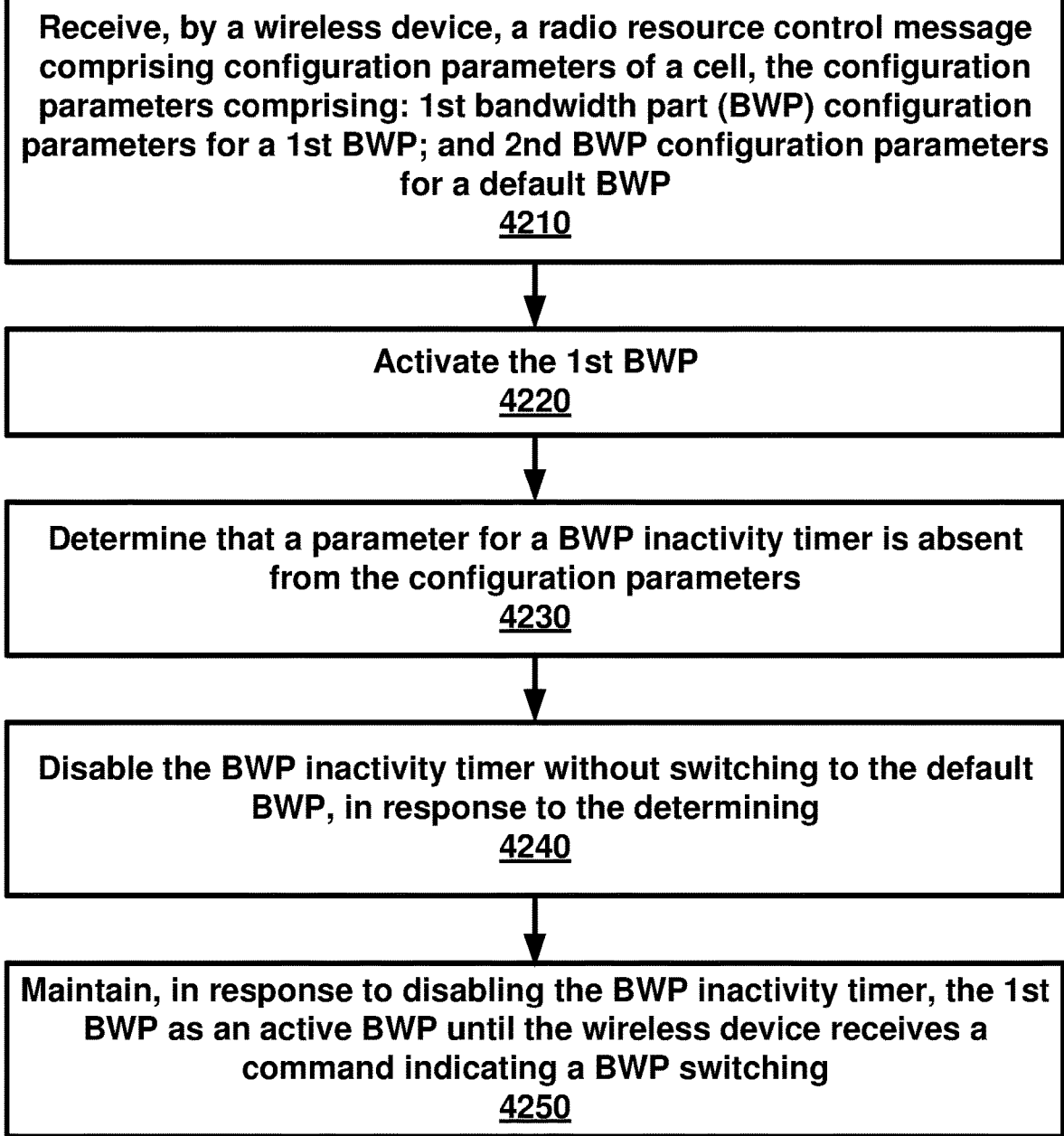
FIG. 42 may be an example flow diagram as per an aspect of an embodiment of the present disclosure.

FIG. 42 is an example flow diagram as per an aspect of an embodiment of the present disclosure. At 4210, a wireless device may receive a radio resource control message. The radio resource control message may comprise configuration parameters of a cell. The configuration parameters may comprise first bandwidth part (BWP) configuration parameters for a first BWP. The configuration parameters may comprise second BWP configuration parameters for a default BWP. At 4220, the first BWP may be activated. At 4230, a determination may be made that a parameter for a BWP inactivity timer is absent from the configuration parameters. At 4240, in response to the determination, the BWP inactivity timer may be disabled without switching to the default BWP. At 4250, in response to disabling the BWP inactivity timer, the first BWP may be maintained as an active BWP until the wireless device receives a command indicating a BWP switching.

Figure 43:
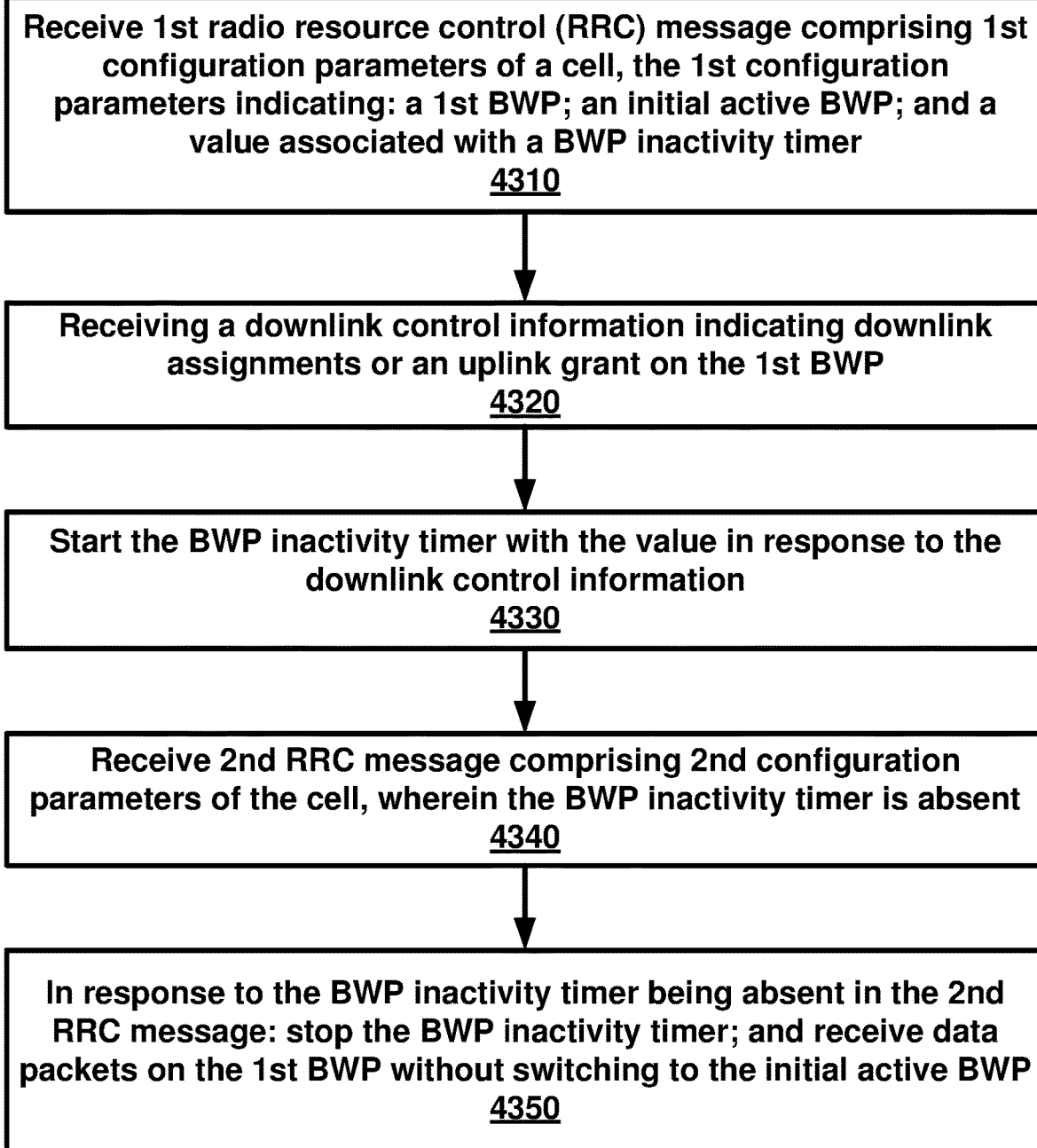
FIG. 43 may be an example flow diagram as per an aspect of an embodiment of the present disclosure.

FIG. 43 is an example flow diagram as per an aspect of an embodiment of the present disclosure. At 4310, a first radio resource control (RRC) message may be received. The first RRC message may comprise first configuration parameters of a cell. The first configuration parameters may indicate a first BWP. The first configuration parameters may indicate an initial active BWP. The first configuration parameters may indicate a value associated with a BWP inactivity timer. At 4320, a downlink control information may be received. The downlink control information may indicate downlink assignments or an uplink grant on the first BWP. At 4330, the BWP inactivity timer may be started with the value in response to the downlink control information. At 4340, a second RRC message may be received. The second RRC message may comprise second configuration parameters of the cell where the BWP inactivity timer is absent. At 4350, in response to the BWP inactivity timer being absent in the second RRC message the BWP inactivity timer may be stopped. In response to the BWP inactivity timer being absent in the second RRC message, data packets may be received on the first BWP without switching to the initial active BWP.

Figure 44:
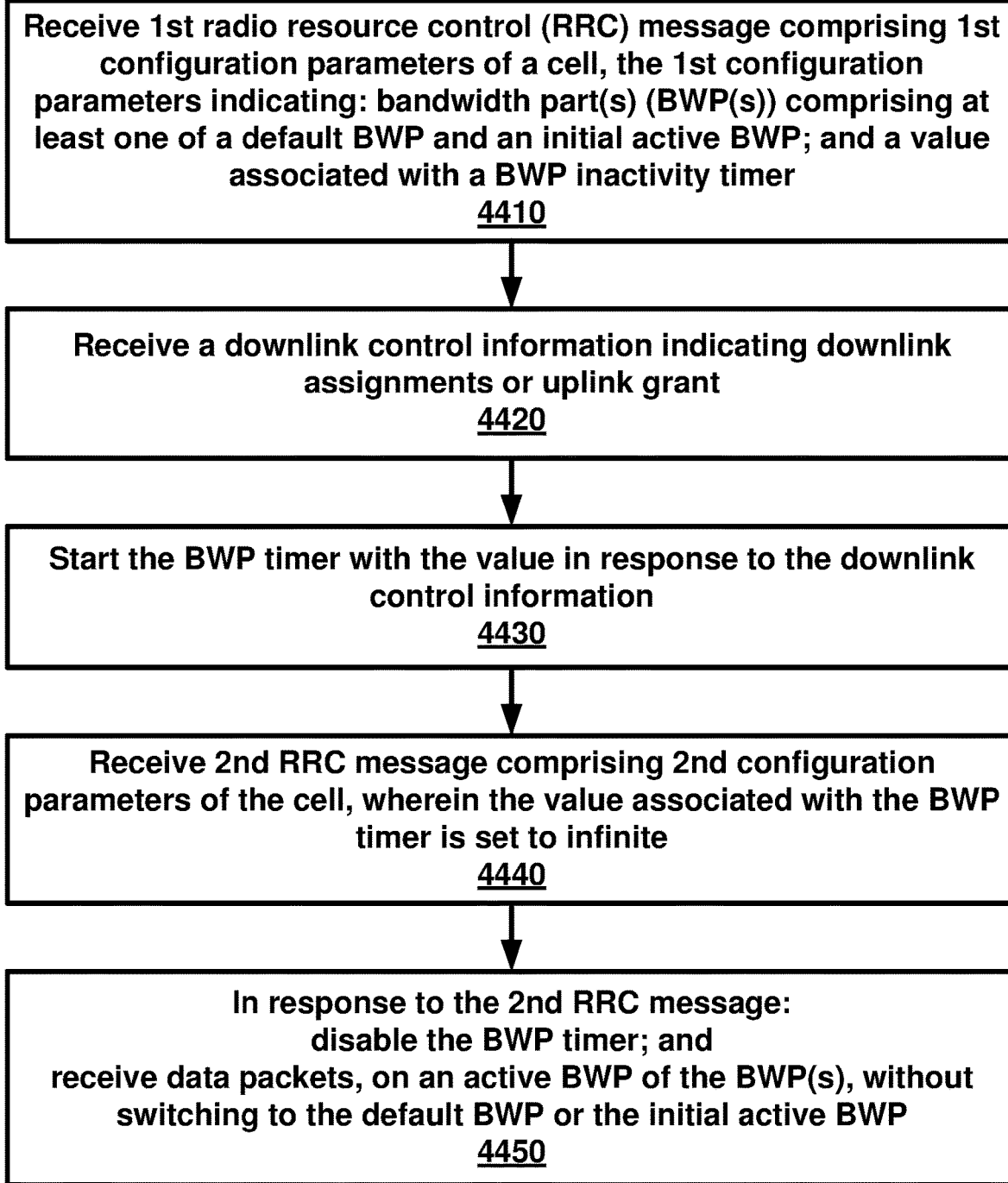
FIG. 44 may be an example flow diagram as per an aspect of an embodiment of the present disclosure.

FIG. 44 is an example flow diagram as per an aspect of an embodiment of the present disclosure. At 4410, a first radio resource control (RRC) message may be received. The first RRC message may comprise first configuration parameters of a cell. The first configuration parameters may indicate one or more bandwidth parts (BWPs) comprising at least one of a default BWP and an initial active BWP. The first configuration parameters may indicate a value associated with a BWP inactivity timer. At 4420, a downlink control information may be received. The downlink control information indicating downlink assignments or uplink grant. At 4430, the BWP timer may be started with the value in response to the downlink control information. At 4440, a second RRC message may be received. The second RRC message may comprise second configuration parameters of the cell, where the value associated with the BWP timer is set to infinite. At 4450, in response to the second RRC message, the BWP timer may be disabled. In response to the second RRC message, data packets may be received on an active BWP of the one or more BWPs without switching to the default BWP or the initial active BWP.

FIG. 45 is an example flow diagram as per an aspect of an embodiment of the present disclosure. At 4510, a wireless device may receive radio resource control messages from a base station. The radio resource control messages may comprise configuration parameters of a cell. The configuration parameters may comprise first radio resource parameters of bandwidth parts (BWPs) comprising a first BWP. The configuration parameters may comprise second radio resource parameters of reference signals. At 4520, a downlink control information may be received. The downlink control information may indicate switching to the first BWP as an active BWP. At 4530, the first BWP may be activated in response to the downlink control information. At 4540, in response to activating the first BWP, one or more reference signal received power (RSRP) reports for the first BWP may be transmitted. The one or more RSRP reports may comprise a reference signal index indicating one of the reference signals.

According to an example embodiment, the cell may be a primary cell of a plurality of cells. According to an example embodiment, the cell may be a secondary cell of a plurality of cells. According to an example embodiment, the first radio resource parameters of the BWPs may comprise a frequency location. The first radio resource parameters of the BWPs may comprise a bandwidth. The first radio resource parameters of the BWPs may comprise a value of subcarrier spacing. The first radio resource parameters of the BWPs may comprise a cyclic prefix. According to an example embodiment, the downlink control information may indicate switching from a second BWP to the first BWP as the active BWP. According to an example embodiment, the activating of the first BWP may comprise monitoring a downlink control channel on the first BWP. According to an example embodiment, the one or more RSRP reports may be obtained based on measurements of the reference signals. According to an example embodiment, the reference signals may comprise one or more channel state information reference signals. The reference signals may comprise one or more synchronization signal blocks.

FIG. 46 is an example flow diagram as per an aspect of an embodiment of the present disclosure. At 4610, a wireless device may activate a first bandwidth part in response to switching to the first bandwidth part as an active bandwidth part. At 4620, in response to the activating the first bandwidth part, one or more reference signal received power reports for the first bandwidth part may be transmitted. The one or more reference signal received power reports may comprise a reference signal index indicating reference signals. The one or more reference signal received power reports may comprise a value of reference signal received power of the reference signals.

Figure 47:
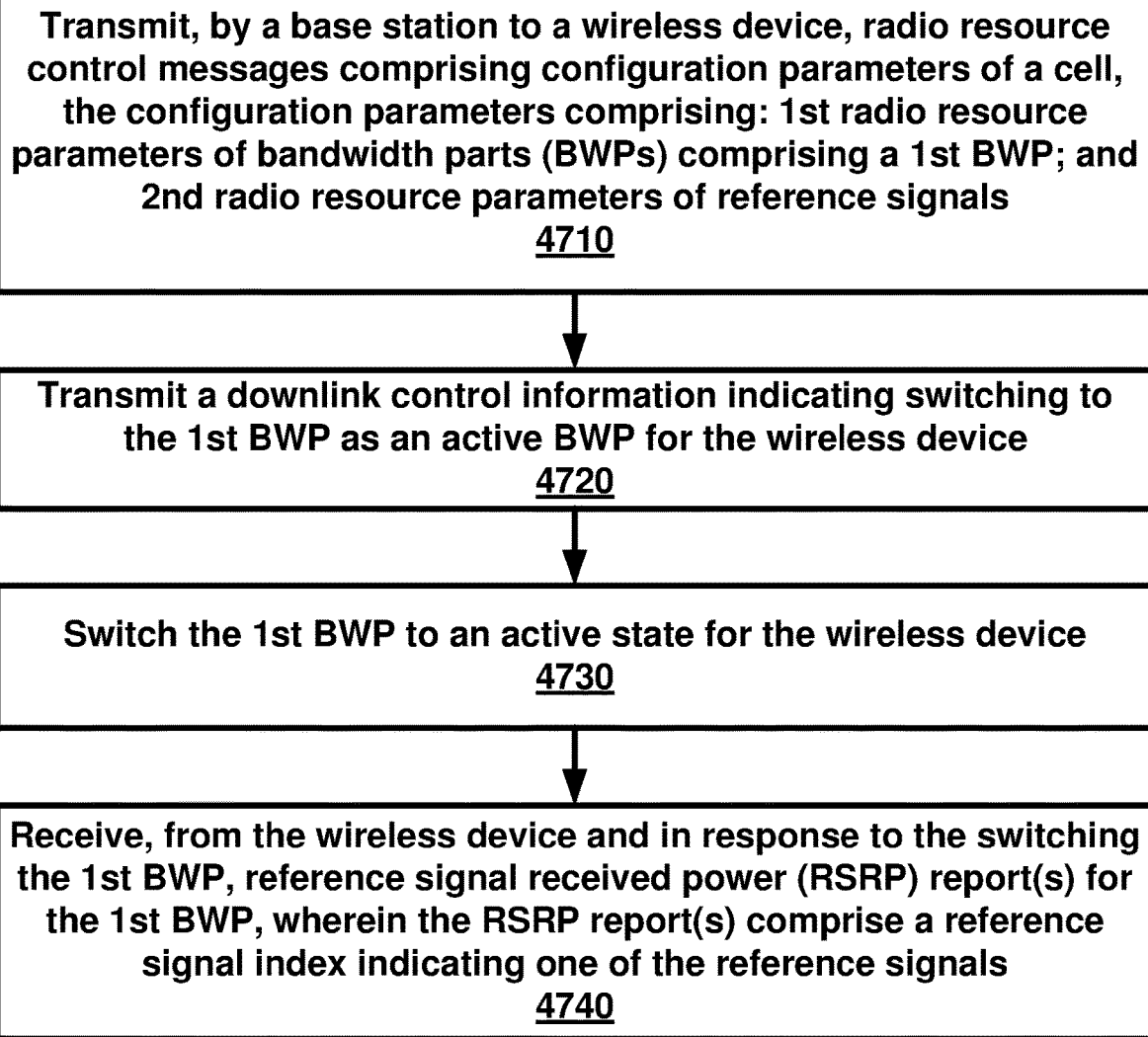
FIG. 47 may be an example flow diagram as per an aspect of an embodiment of the present disclosure.

FIG. 47 is an example flow diagram as per an aspect of an embodiment of the present disclosure. At 4710, a base station may transmit radio resource control messages to a wireless device. The radio resource control messages may comprise configuration parameters of a cell. The configuration parameters may comprise first radio resource parameters of bandwidth parts (BWPs) comprising a first BWP. The configuration parameters may comprise second radio resource parameters of reference signals. At 4720, a downlink control information may be transmitted. The downlink control information may indicate switching to the first BWP as an active BWP for the wireless device. At 4730, the first BWP may be switched to an active state for the wireless device. At 4740, in response to the switching the first BWP, one or more reference signal received power (RSRP) reports for the first BWP may be received from the wireless device. The one or more RSRP reports may comprise a reference signal index indicating one of the reference signals.

FIG. 48 is an example flow diagram as per an aspect of an embodiment of the present disclosure. At 4820, a base station may switch a first bandwidth part to an active state for a wireless device. At 4820, in response to the switching to the first bandwidth part, one or more reference signal received power reports for the first bandwidth part may be received from the wireless device. The one or more reference signal received power reports may comprise a reference signal index indicating reference signals. The one or more reference signal received power reports may comprise a value of reference signal received power of the reference signals.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to."

In this disclosure and the claims, differentiating terms like "first," "second," "third," identify separate elements without implying an ordering of the elements or functionality of the elements. Differentiating terms may be replaced with other differentiating terms when describing an embodiment.

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   transmitting, by a base station to a wireless device via a physical downlink control channel (PDCCH), a downlink control information (DCI) indicating for the wireless device to switch from a second bandwidth part (BWP) to a first BWP as an active BWP; and
   receiving, in response to the first BWP being activated, a reference signal received power (RSRP) report for the first BWP, wherein the RSRP report comprises:
   a reference signal index indicating a reference signal of the first BWP; and
   a value of an RSRP of the reference signal.

2. The method of claim 1, further comprising transmitting, to the wireless device, one or more radio resource control (RRC) messages indicating parameters of:
   a first PDCCH and the reference signal, both corresponding to the first BWP; and
   the PDCCH and a second reference signal, both corresponding to the second BWP.

3. The method of claim 2, wherein the parameters are configuration parameters of a primary cell of a plurality of cells.

4. The method of claim 2, wherein the parameters are configuration parameters of a secondary cell of a plurality of cells.

5. The method of claim 2, wherein the one or more RRC messages further indicate BWP parameters comprising at least one of:
   a frequency location;
   a bandwidth;
   a value of subcarrier spacing; or
   a cyclic prefix.

6. The method of claim 2, further comprising receiving, from the wireless device and in response to the one or more RRC messages, a radio resource management (RRM) report based on a measurement of a synchronization signal/physical broadcast channel (SS/PBCH) block or a channel state information reference signal (CSI-RS).

7. The method of claim 1, further comprising:
transmitting a first DCI via a first PDCCH; and
transmitting a first transport block, based on the first DCI, via the first BWP.

8. The method of claim 1, wherein the value of the RSRP of the reference signal is based on a measurement of the reference signal.

9. The method of claim 1, wherein the reference signal comprises at least one of:
one or more channel state information reference signals; or
one or more synchronization signal blocks.

10. The method of claim 1, further comprising transmitting, to the wireless device, a first PDCCH via the first BWP based on the first BWP being activated.

11. A base station comprising:
one or more processors; and
memory storing instructions that, when executed by the one or more processors, cause the base station to:
transmit, to a wireless device via a physical downlink control channel (PDCCH), a downlink control information (DCI) indicating for the wireless device to switch from a second bandwidth part (BWP) to a first BWP as an active BWP; and
receive, in response to the first BWP being activated, a reference signal received power (RSRP) report for the first BWP, wherein the RSRP report comprises:
a reference signal index indicating a reference signal of the first BWP; and
a value of an RSRP of the reference signal.

12. The base station of claim 11, wherein the instructions, when executed by the one or more processors, further cause the base station to transmit, to the wireless device, one or more radio resource control (RRC) messages indicating parameters of:
a first PDCCH and the reference signal, both corresponding to the first BWP; and
the PDCCH and a second reference signal, both corresponding to the second BWP.

13. The base station of claim 12, wherein the parameters are configuration parameters of a primary cell of a plurality of cells.

14. The base station of claim 12, wherein the parameters are configuration parameters of a secondary cell of a plurality of cells.

15. The base station of claim 12, wherein the one or more RRC messages further indicate BWP parameters comprising at least one of:
a frequency location;
a bandwidth;
a value of subcarrier spacing; or
a cyclic prefix.

16. The base station of claim 12, wherein the instructions, when executed by the one or more processors, further cause the base station to receive, from the wireless device and in response to the one or more RRC messages, a radio resource management (RRM) report based on a measurement of a synchronization signal/physical broadcast channel (SS/PBCH) block or a channel state information reference signal (CSI-RS).

17. The base station of claim 11, wherein the instructions, when executed by the one or more processors, further cause the base station to:
transmit a first DCI via a first PDCCH; and
transmit a first transport block, based on the first DCI, via the first BWP.

18. The base station of claim 11, wherein the value of the RSRP of the reference signal is based on a measurement of the reference signal.

19. The base station of claim 11, wherein the reference signal comprises at least one of:
one or more channel state information reference signals; or
one or more synchronization signal blocks.

20. The base station of claim 11, wherein the instructions, when executed by the one or more processors, further cause the base station to transmit, to the wireless device, a first PDCCH via the first BWP based on the first BWP being activated.

* * * * *